United States Patent
Egashira et al.

(10) Patent No.: US 6,492,475 B1
(45) Date of Patent: Dec. 10, 2002

(54) ETHYLENE/α-OLEFIN COPOLYMER

(75) Inventors: Toshiaki Egashira, Kawasaki (JP); Reiji Higuchi, Kawasaki (JP); Kazuyuki Sakamoto, Kawasaki (JP); Kimiya Miyoshi, Kawasaki (JP); Masahiro Wakayama, Kawasaki (JP); Tatsuo Yamaguchi, Kawasaki (JP); Fumio Asada, Kawasaki (JP); Sinji Miwa, Kawasaki (JP); Kenichi Hiraki, Kawasaki (JP); Masaaki Ikeda, Kawasaki (JP); Yoshimi Shimizu, Kawasaki (JP)

(73) Assignee: Japan Polyolefins Co., Ltd., Tokyo (JP)

( * ) Notice: Subject to any disclaimer, the term of this patent is extended or adjusted under 35 U.S.C. 154(b) by 0 days.

(21) Appl. No.: 09/719,981
(22) PCT Filed: Jun. 18, 1999
(86) PCT No.: PCT/JP99/03252
§ 371 (c)(1),
(2), (4) Date: Dec. 19, 2000
(87) PCT Pub. No.: WO99/65957
PCT Pub. Date: Dec. 23, 1999

(30) Foreign Application Priority Data

| Jun. 19, 1998 | (JP) | 10-173594 |
| Jul. 13, 1998 | (JP) | 10-197879 |
| Jul. 13, 1998 | (JP) | 10-197880 |
| Aug. 10, 1998 | (JP) | 10-226229 |
| Aug. 10, 1998 | (JP) | 10-226231 |

(51) Int. Cl.$^7$ .................. C08F 210/16; C08L 23/08; C08L 23/26; H01B 7/00; B32B 27/08
(52) U.S. Cl. .......... 526/153; 526/148; 526/159; 526/172; 526/348; 526/348.1; 526/348.6; 525/240; 525/101; 525/191; 525/242; 525/277; 525/326.1; 428/36.8; 428/516; 428/500; 428/523; 428/511; 428/513; 174/110 R; 174/110 SR
(58) Field of Search ............... 526/148, 153, 526/159, 172, 348, 348.1, 348.6; 525/240, 101, 191, 242, 277, 326.1; 428/36.8, 516, 500, 523, 511, 513; 174/110 R, 110 SR

(56) References Cited

U.S. PATENT DOCUMENTS

| 4,243,619 A | 1/1981 | Fraser et al. | 264/40.6 |
| 4,540,753 A | 9/1985 | Cozewith et al. | 526/88 |
| 5,246,783 A | 9/1993 | Spenadel et al. | 428/461 |
| 5,250,612 A | 10/1993 | Hazlitt et al. | 525/53 |
| 5,272,236 A | 12/1993 | Lai et al. | 526/348.5 |
| 5,376,439 A | 12/1994 | Hodgson et al. | 428/220 |
| 5,382,630 A | 1/1995 | Stehling et al. | 525/240 |
| 5,420,220 A | 5/1995 | Cheruvu et al. | 526/348.1 |
| 5,451,555 A | 9/1995 | Tajima et al. | 502/103 |
| 5,530,065 A | 6/1996 | Farley et al. | 525/240 |
| 5,562,958 A | 10/1996 | Walton et al. | 428/34.9 |
| 5,594,071 A | 1/1997 | Takahashi et al. | 525/240 |
| 5,594,082 A | 1/1997 | Tajima et al. | 526/160 |
| 5,674,945 A | 10/1997 | Takahashi et al. | 525/240 |
| 5,798,427 A | 8/1998 | Foster et al. | 526/352 |
| 5,824,618 A | * 10/1998 | Tajima et al. | 502/108 |
| 5,874,513 A | * 2/1999 | Watanabe et al. | 526/348.1 |

FOREIGN PATENT DOCUMENTS

| CA | 2105889 | 3/1994 | C08F/10/00 |
| EP | 0 587 440 | 3/1994 | C08F/4/655 |
| EP | 587 440 A2 * | 3/1994 | |
| EP | 0 520 816 | 12/1995 | C08F/10/00 |
| EP | 0 735 059 | 10/1996 | C08F/210/16 |
| EP | 0 735 060 | 10/1996 | C08F/210/16 |
| EP | 0 781 789 | 7/1997 | C08F/210/16 |
| JP | 60-35009 | 2/1985 | C08F/210/16 |
| JP | 3-502710 | 6/1991 | C08L/23/04 |
| JP | 5-194638 | 8/1993 | C08F/10/00 |
| JP | 5-59831 | 9/1993 | B32B/27/32 |
| JP | 6-14952 | 3/1994 | A61J/1/10 |
| JP | 6-65442 | 3/1994 | C08L/23/08 |
| JP | 6-65443 | 3/1994 | C08L/23/04 |
| JP | 6-136194 | 5/1994 | C08L/23/08 |
| JP | 6-136196 | 5/1994 | C08L/23/04 |
| JP | 6-199926 | 7/1994 | C08F/4/658 |
| JP | 6-206946 | 7/1994 | C08F/255/02 |
| JP | 6-206947 | 7/1994 | C08F/255/02 |
| JP | 6-207058 | 7/1994 | C08L/23/08 |
| JP | 6-207062 | 7/1994 | C08L/23/08 |

(List continued on next page.)

OTHER PUBLICATIONS

International Search Report PCT/JP99/03252, Aug. 1999.

Primary Examiner—David W. Wu
Assistant Examiner—R. Rabago
(74) Attorney, Agent, or Firm—Sughrue Mion, PLLC

(57) ABSTRACT

The present invention relates to an ethylene-α-olefin copolymer; a composition thereof; a film thereof; a polar group-containing resin material; and productions and use of the ethylene-α-olefin copolymer. The ethylene-α-olefin copolymer of the present invention is characterized in satisfying the following conditions (A) to (E): (A) a density in the range of 0.92 to 0.96 g/cm$^3$; (B) a melt flow rate (MFR) in the range of 0.01 to 200 g/10 min; (C) a molecular weight distribution (Mw/Mn) in the range of 1.5 to 5.0; (D) possessing only one peak in terms of the number of peaks observed in an elution temperature-eluted amount curve as measured by the continuous temperature raising elution fractionation (TREF) method, from the integrated elution curve obtained by the elution temperature-eluted amount curve, the difference $T_{75}-T_{25}$ in the temperature and density d respectively satisfy a specific relationship, wherein $T_{25}$ is the temperature where 25% of the total elution is obtained, and $T_{75}$ is the temperature where 75% of the total elution is obtained; and (E) possessing one or two melting point peaks, and among these the highest melting point $T_{m1}$ and the density d satisfy a specific relationship. Accordingly, this ethylene-α-olefin copolymer exhibits a superior thermal resistance, heat sealability, and processability.

37 Claims, 3 Drawing Sheets

FOREIGN PATENT DOCUMENTS

| | | | | |
|---|---|---|---|---|
| JP | 6-509528 | 11/1994 | ........... | B32B/27/32 |
| JP | 6-509905 | 11/1994 | ........... | H01B/3/44 |
| JP | 7-26079 | 1/1995 | ........... | C08L/23/08 |
| JP | 7-26080 | 1/1995 | ........... | C08L/23/08 |
| JP | 7-500131 | 1/1995 | ........... | C08L/23/08 |
| JP | 7-500622 | 1/1995 | ........... | C08F/4/656 |
| JP | 8-501812 | 2/1996 | ........... | C08L/23/04 |
| JP | 8-502532 | 3/1996 | ............ | C08J/5/18 |
| JP | 8-111121 | 4/1996 | ........... | H01B/3/30 |
| JP | 8-111125 | 4/1996 | ........... | H01B/7/02 |
| JP | 8-157611 | 6/1996 | ............. | C08J/5/18 |
| JP | 8-505174 | 6/1996 | ........... | C08L/23/04 |
| JP | 8-222026 | 8/1996 | ........... | H01B/3/30 |
| JP | 8-311260 | 11/1996 | ........... | C08L/23/06 |
| JP | 8-325333 | 12/1996 | ......... | C08F/210/16 |
| JP | 9-17235 | 1/1997 | ........... | H01B/3/44 |
| JP | 9-29868 | 2/1997 | ............. | B32B/1/02 |
| JP | 9-57916 | 3/1997 | ........... | B32B/27/32 |
| JP | 9-59440 | 3/1997 | ........... | C08L/23/06 |
| JP | 9-59442 | 3/1997 | ........... | C08L/23/08 |
| JP | 9-71614 | 3/1997 | ......... | C08F/210/16 |
| JP | 9-99035 | 4/1997 | ............. | A61J/1/10 |
| JP | 9-137132 | 5/1997 | ............. | C09J/7/00 |
| JP | 9-505094 | 5/1997 | ......... | C08L/101/00 |
| JP | 9-142455 | 6/1997 | ............ | B65D/5/56 |
| JP | 9-155996 | 6/1997 | ............. | B32B/1/02 |
| JP | 9-169068 | 6/1997 | ............. | B32B/1/02 |
| JP | 9-176391 | 7/1997 | ........... | C08L/23/02 |
| JP | 9-183816 | 7/1997 | ......... | C08F/210/16 |
| JP | 9-187900 | 7/1997 | ........... | B32B/27/32 |
| JP | 9-193323 | 7/1997 | ........... | B32B/27/32 |
| JP | 9-235319 | 9/1997 | ............. | C08F/8/46 |
| JP | 9-255724 | 9/1997 | ............. | C08F/10/02 |
| JP | 9-278953 | 10/1997 | ........... | C08L/23/04 |
| JP | 9-511003 | 11/1997 | ......... | C08F/210/02 |
| JP | 9-511273 | 11/1997 | ........... | C08L/23/06 |
| JP | 10-80972 | 3/1998 | ............. | B32B/7/06 |
| WO | 86/02044 | 4/1986 | ........... | B32B/27/32 |
| WO | 93/03093 | 2/1993 | ........... | C08L/23/04 |
| WO | 95/26372 | 10/1995 | ......... | C08F/210/14 |
| WO | 95/27005 | 10/1995 | ........... | C08L/23/06 |

* cited by examiner

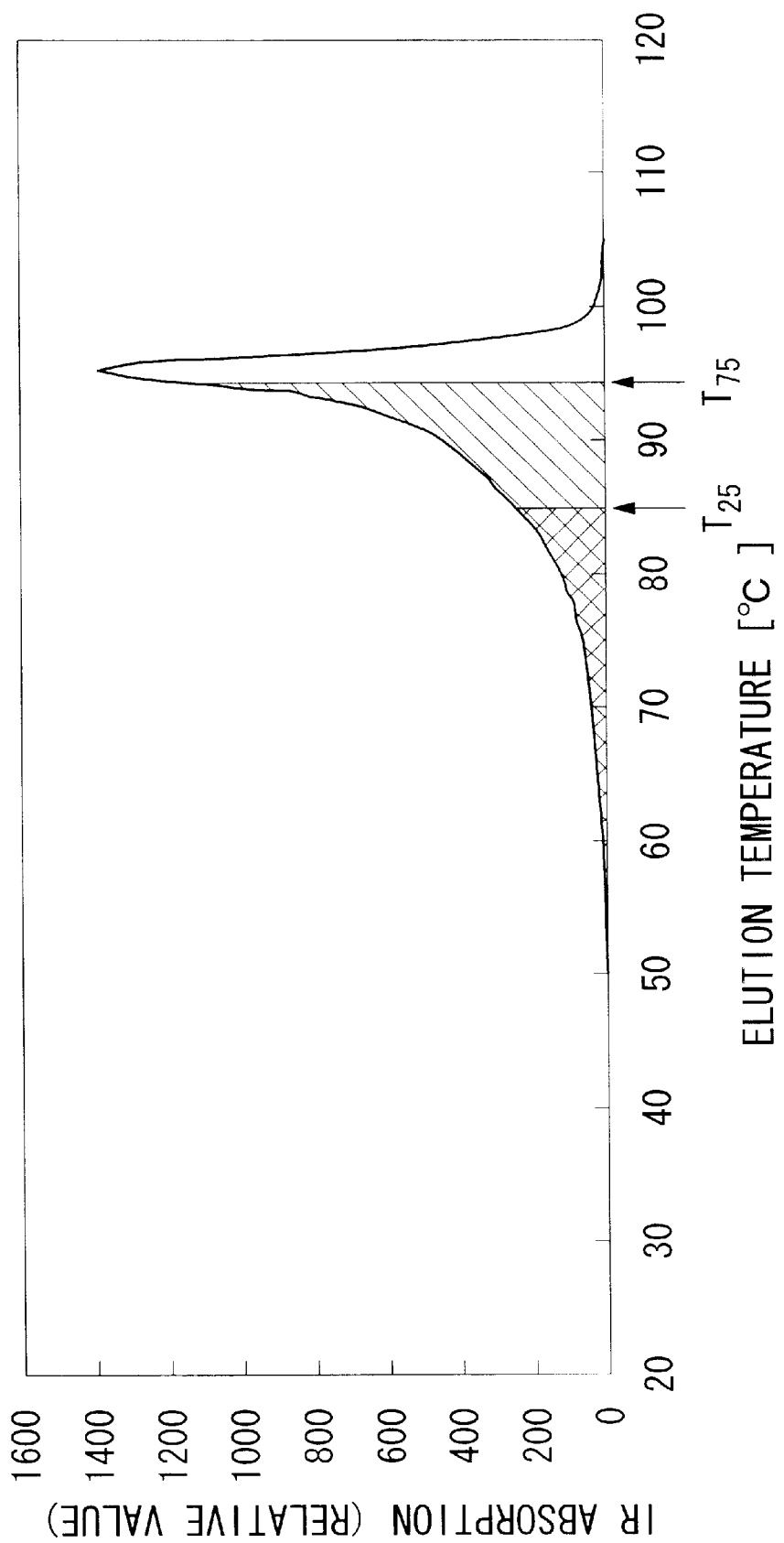

ETHYLENE/α-OLEFIN COPOLYMER

DESCRIPTION

1. Technical Field

The present invention relates to an ethylene-α-olefin copolymer which possesses various superior properties and a superior processability; a composition of the same; a film and a polar group-containing resin material of the same; and products and uses of the same. More concretely, the present invention relates to an ethylene-α-olefin copolymer suitable for various packaging films manufacturing by means of T-die technique, inflation techniques, and the like, molded films such as a film for lamination, blow-molded products such as various containers manufactured by means of blow molding, injection-molded products such as various vessels, lids, containers, and the like, manufactured by means of injection molding, covering for electric wires, cables, steel pipes, and the like; a composition thereof; and a film and a polar group-containing resin material thereof. The present application is based on Japanese Patent Application No. Hei 10-173594, Japanese Patent Application No. Hei 10-197879, Japanese Patent Application No. Hei 10-197880, Japanese Patent Application No. Hei 10-226229, and Japanese Patent Application No. Hei 10-226231, the contents of which are incorporated herein by reference.

2. Background Art

The conventional, linear low density polyethylene (LLDPE) having a density of 0.89 to 0.94 g/cm$^3$ comprises an ethylene-α-olefin copolymer produced by means of using a Ziegler catalyst. This conventional LLDPE is superior in strength and toughness to a high pressure process low density polyethylene (HpLDPE) obtained according to a high pressure radical polymerization, and applied to various uses such as films, sheets, blow-molded products, injection-molded products, and the like.

However, the conventional LLDPE possesses a distinct disadvantage in that it is inferior with respect to its processability. Therefore, in the field of films such as packaging materials, improvements in the gap width of the die in a processing device, as disclosed in U.S. Pat. No. 4,243,619 (Union Carbide Chemicals and Plastics Technology Corporation, hereinafter referred to as UCC), in addition to blending of the aforementioned HpLDPE into a LLDPE, have been developed.

More recently, it has become highly desirable to improve the both the overall strength and the sealing strength (i.e., low temperature heat sealability) of an LLDPE, in order to increase the speed of the processing cycle, by means of high-speed filling, and also reduce the weight of the molded products.

In recent years, an ethylene-α-olefin copolymer which exhibits an improved low temperature heat sealability and strength has been developed. This ethylene-α-olefin copolymer is obtained by means of using a metallocene catalyst, the molecular weight distribution and composition distribution of which are extremely narrow, which serves to impart high strength. Such an ethylene-α-olefin copolymer is disclosed in, for example, Japanese Patent Application, First Publication Laid Open No. Sho 60-35009 (WPI: 85-001577, U.S. Pat. No. 4,540,753/Exxon Chemical Patents Inc., hereinafter referred to as Exxon), Japanese Patent Application, First Publication No. Hei 3-502710 (WPI: 90-132257, U.S. Pat. No. 5,382,630/Exxon), Japanese Patent Application First Publication No. Hei 7-500131 (WPI: 90-134412, U.S. Pat. No. 5,250,612/The Dow Chemical Company, hereinafter referred to as Dow), Japanese Patent Application, First Publication No. Hei 7-500622 (WPI: 93-152427, U.S. Pat. No. 5,272,236, WO930822/Dow), Japanese Patent Application, First Publication Laid Open No. Hei 8-311260 (WPI: 96-507707, U.S. Pat. No. 5,798,427/UCC), Japanese Patent Application, First Publication Laid Open No. Hei 9-255724 (WPI: 96-435560, EP735060/UCC), Japanese Patent Application, First Publication No. Hei 8-505174 (U.S. Pat. No. 5,420,220/Mobil Oil Corporation, hereinafter referred to as Mobil), Japanese Patent Application, First Publication No. Hei 9-511003 (WPI: 95-351300, EP751967, WO95/26372/Mobil), and the like.

However, these conventional, ethylene-α-olefin copolymers obtained by means of using a metallocene catalyst, (mLLDPE), possesses several disadvantages. For example, since their composition distribution and molecular weight distribution are extremely narrow, and their properties of viscosity and strength change dramatically according to the temperature, these copolymers pose the problems of having only a limited applicable range for the temperature, extrusion conditions, and the like during the processing process, in addition to an inferior processability. In addition, the aforementioned mLLDPE is inferior both with respect to its properties of thermal resistance, even after being processed to a molded product, and with respect to its heat sealability, due to the narrow range of temperatures which can impart the appropriate heat sealing strength.

Japanese Patent Application, First Publication No. Hei 6-509528, (WO93/03093/Exxon) discloses a heat-sealed product wherein the heat sealing initiation temperature is less than 93° C., by means of using a polymer which possesses a narrow composition distribution of at least 50 on the composition distribution breadth index (CDBI). However, this heat-sealed product possesses improved properties of a low temperature heat sealability, but exhibits an inferior thermal resistance, and an inferior heat-sealing strength.

A blended composition of mLLDPE obtained by means of using a metallocene catalyst and HpLDPE, and film thereof are disclosed, for example, in Japanese Patent Application, First Publication No. Hei 9-511273, (WO95/27005/Mobil), Japanese Patent Application, First Publication Laid Open No. Hei 6-65442, (WPI: 93-407455, U.S. Pat. No. 5,594,071/Mitsui Petrochemicals Ind., Ltd.), Japanese Patent Application, First Publication Laid Open No. Hei 6-65443, (WPI: 93-407455, U.S. Pat. No. 5,674,945/Mitsui Petrochemicals Ind., Ltd.), Japanese Patent Application First Publication Laid Open No. Hei 6-136194, (WPI: 94-197254/Mitsui Petrochemicals Ind., Ltd.), Japanese Patent Application, First Publication Laid Open No. Hei 6-136196, (WPI: 94-197255/Mitsui Petrochemicals Ind., Ltd.), Japanese Patent Application, First Publication laid Open No. Hei 9-183816, (EP781789A2, WPI: 97-334856/Mitsui Petrochemicals Ind., Ltd.), Japanese Patent Application, First Publication Laid Open No. Hei 9-59440, (WPI: 97-248282/Toso Corporation), Japanese Patent Application, First Publication No. Hei 8-502532, (WPI: 94-151264, U.S. Pat. No. 5,562,958/Dow), and the like. Composition and films disclosed therein are superior in their processability, however, possess disadvantages such as having a narrow applicable range for the temperature at which an adequate heat sealing strength is exhibited, due to their narrow molecular weight distribution and composition distribution.

An ethylene-60-olefin copolymer, which improves on the aforementioned problems, is disclosed in Japanese Patent Application, First Publication No. Hei 8-325333, (WPI:

96-435559, U.S. Pat. No. 5,874,513/Nippon Petrochemicals Co., Ltd., a joint venture partner of the applicant of the present invention). This ethylene-α-olefin copolymer is superior in low temperature heat sealability, hot tacking properties, and the like, but also displays an insufficient thermal resistance, processability, and the like.

In general, the thermal resistance of a polyethylene resin can be improved by means of increasing its density and the amount of components possessing high melting points. However, since the amount of components having a low melting point simultaneously decreases, the heat sealing initiation temperature also rises, and a deterioration in the clarity and reduction in flexibility, due to an increased elasticity, unavoidably result.

In order to solve the aforementioned problem, Japanese Patent Application, First Publication No. Hei 8-501812, (WPI: 94-118420, U.S. Pat. No. 5,376,439/Exxon), and Japanese Patent Application, First Publication No. Hei 9-505094, (WPI: 95-194055, U.S. Pat. No. 5,530,065/ Exxon), disclose a method for mixing a polyethylene resin obtained by means of using a conventional, Ziegler catalyst, which exhibits a superior thermal resistance, and a polyethylene resin obtained by means of using a conventional, metallocene catalyst, which exhibits a superior mechanical strength and possesses a low heat sealing inhibition temperature.

However, the polyethylene resin obtained by means of using a Ziegler catalyst possesses a high heat-sealing initiation temperature, and exhibits an inferior mechanical strength. On the other hand, the polyethylene resin obtained by means of using a metallocene catalyst exhibits both an inferior thermal resistance and processability. Accordingly, the simple mixture of these two resins possesses a wider molecular weight distribution than the conventional, polyethylene resin obtained by means of using a metallocene catalyst, thus leading to an inferior mechanical strength. Similarly, the aforementioned mixture also exhibits both an inferior thermal resistance and processability compared to the polyethylene resin obtained by means of a using Ziegler catalyst.

On the other hand, in the field of sealant films molded according to extrusion processing, and the like, a film which exhibits a superior clarity, impact strength, low temperature heat sealability, heat sealing strength, anti-blocking properties, and the like, is highly desirable. Such a film is superior with respect to its gas-barrier properties, and is applicable to various packaging materials for pickles, dairy products, retort pouch foods, frozen foods, and the like; packing materials for pharmaceutical drugs, medical container, various liquid transporter, and the like; bottles; containers; and the like. Examples of the sealant film used in this field may include sealant films comprising a mLLDPE, obtained by means of using a metallocene catalyst. Such sealant films are disclosed in Japanese Patent Application, First Publication Laid Open No. Hei 8-157611, (WPI: 96-339289/Sekisui Chemical Co., Ltd.), a specific LLDPE obtained by means of using a single site catalyst is disclosed in Japanese Patent Application, First Publicatoin Laid Open No. Hei 9-137132, (WPI: 97-337244/Sekisui Chemical Co., Ltd.), Japanese Patent Application, First Publication Laid Open No. Hei 9-59442, (WPI: 96-435559/ Nippon Petrochemicals Co., Ltd.), and the like. In addition, there is also a great demand to increase the speed of the processing cycle, thermal resistance, and the like, in this field as well. The present invention relates an improved version of the invention disclosed in Japanese Patent Application, First Publication Laid Open No. Hei 9-59442.

In addition, in the field of extrusion lamination processing, dry lamination processing, and the like, wherein a resin is coated onto a substrate, it is highly desirable to improve the productivity, adhesive strength, and thermal resistance. A composition for extrusion lamination, a multilayered film, and the like, which comprise a mLLDPE obtained by means of a using metallocene catalyst, are disclosed in Japanese Patent Application, First Publication Laid Open No. Hei 7-26079, (WPI: 95-102014/Mitsubishi Chemical Corporation), Japanese Patent Application, First Publication Laid Open No. Hei 7-26080, (WPI: 95-102015/ Mitsubishi Chemical Corporation), and Japanese Patent Application, First Publication Laid Open No. Hei 9-57916, (WPI: 97-208082/Mitsubishi Chemical Corporation).

In addition, one of the uses of molded products manufactured by means of lamination processing includes a release member. The release member may be used as an adhesive sheet, binder sheet, adhesive tape substrate, process sheet, and the like. Such a release member is disclosed in detail in Japanese Patent Application, First Publication Laid Open No. Hei 10-80972, (WPI: 98-254960/Nippon Petrochemicals Co., Ltd.). However, a release member possessing a higher productivity, adhesive strength, and thermal resistance, is highly desired. The present invention relates to an improved version of the invention disclosed in Japanese Patent Application, First Publication Laid Open No. Hei 10-80972.

Other uses of the molded product manufactured by means of extrusion lamination processing may include a paper-laminated member, and paper container using the aforementioned. Paper containers using mLLDPE obtained by means of using a metallocene catalyst are disclosed in Japanese Patent Application, First Publication Laid Open No. Hei 9-29868, (WPI: 97-160443/Dai Nippon Printing Co., Ltd.), Japanese Patent Application, First Publication Laid Open No. Hei 9-169068, (WPI: 97-388884/Dai Nippon Printing Co., Ltd.), Japanese Patent Application, First Publication Laid Open No. Hei 9-187900, (WPI: 97-419926/Dai Nippon Printing Co., Ltd.), Japanese Patent Application, First Publication Laid Open No. Hei 9-142455, (WPI: 97-346826/ Toppan Printing Co., Ltd.), Japanese Patent Application, First Publication Laid Open No. Hei 9-193323, (WPI: 97-430480/Toppan Printing Co., Ltd.), and the like. However, a laminate and paper container, which possess a superior productivity, adhesive strength, and thermal resistance to these of the laminates and paper containers disclosed therein, are desired.

In addition, as a retort container, a medical container comprising LLDPE is disclosed in Japanese Patent Application, Second Publication No. Hei 5-59831, (WO86/ 002044/Baxter International Incorporated), and Japanese Patent Application, Second Publication No. Hei 6-14952, (WPI: 87-208701/Sinsozai Sogo Kenkyusho K. K.). In addition, a medical container comprising mLLDPE obtained by means of using a metallocene catalyst is disclosed in Japanese Patent Application, First Publication Laid Open No. Hei 9-99035, (WPI: 97-275661/Terumo Corporation), Japanese Patent Application, First Publication Laid Open No. Hei 9-155996, (WPI: 97-368349/Toso Corporation), and the like. In the field of retort containers, it is necessary that deformation and peeling of the heat-sealed portion not occur during the retort sterilization process of the films or containers, and the like, which are to be used. Accordingly, a thermal resistance of at least 110° C. is desired for a retort container.

An electric insulating material used for electric wires and cables, comprising an mLLDPE obtained by means of using a metallocene catalyst, is disclosed in Japanese Patent Application, First Publication Laid Open No. Hei 8-111121, (WPI: 96-26550/Hitachi Cable, Ltd.), Japanese Patent Application, First Publication Laid Open No. Hei 8-111125, (WPI: 96-265524/Hitachi Cable, Ltd.), Japanese Patent Application, First Publication Laid Open No. Hei 8-222026, (WPI: 96-448060/Hitachi Cable, Ltd.), Japanese Patent Application, First Publication No. Hei 6-509905, (U.S. Pat. No. 5,246,783/Exxon), and the like.

However, these mLLDPE obtained by means of using a metallocene catalyst disclosed therein, possesses a limited range of appropriate temperatures and ejection conditions during the processing process due to their extremely narrow composition distribution and molecular weight distribution, in addition to the dramatic fluctuations in their properties of viscosity and strength depending on the temperature, which in turn leads to an inferior processability.

Known methods for improving such problems includes a method wherein a component with a different molecular weight is blended in the mLLDPE; and a method wherein the mLLDPE is obtained by means of multi-step polymerization, and the like. However, even if these means for improvement are used, the processability of the mLLDPE obtained by means of using a metallocene catalyst is not necessarily at a sufficient level. Another known method for improving the aforementioned includes one in which an ethylene polymer, obtained by means of using a metallocene, is blended with an ethylene polymer obtained by means of using a Ziegler catalyst or Phillips catalyst possessing a different molecular weight, which is disclosed in, for example, Japanese Patent Application, First Publication No. Hei 9-505094. However, the electric insulating material obtained according to this method possesses an insufficient dispersability, which leads to melt fractures and a decreased mechanical strength.

The inventors of the present invention disclose an electric insulating material possessing a low electrical activation energy, appropriate for an electric insulating material, by means of improving the aforementioned mLLDPE obtained by means of using a metallocene catalyst, in Japanese Patent Application, First Publication No. Hei 9-17235, (Nippon Petrochemicals Co., Ltd.). However, this electric insulating material also exhibits an insufficient processability. The present invention relates to an improved version of the invention disclosed in Japanese Patent Application, First Publication Laid Open No. Hei 9-17235.

In addition, non-polar polyethylene resins such as LLDPE, high density polyethylene, and the like, are basically inferior with respect to their adhesive properties to substrates such as other resins, metals and the like, and with respect to their compatibility with other resins, and the like. In order to impart adhesive properties to and improve the compatibility with polyethylene resins, a method is known for introducing a polar group of unsaturated carbonic acids and derivatives thereof into a polyethylene resin by means of polymerization, or grafting.

A modified-LLDPE using mLLDPE obtained by mean of using a metallocene catalyst is disclosed in Japanese Patent Application, First Publication Laid Open No. Hei 6-206947, (WPI: 94-275906/Mitsui Petrochemicals Ind., Ltd.), Japanese Patent Application, First Publication Laid Open No. Hei 6-207062, (WPI: 94-275961/Mitsui Petrochemicals Ind., Ltd.), Japanese Patent Application, First Publication Laid Open No. Hei 6-206946, (WPI: 94-275905/Mitsui Petrochemicals Ind., Ltd.), Japanese Patent Application, First Publication Laid Open No. Hei 6-207058, (WPI: 94-275960/Mitsui Petrochemicals Ind., Ltd.), Japanese Patent Application, First Publication Laid Open No. Hei 9-176391, (WPI: 97-399677), and a modified-specific ethylene-α-olefin copolymer is disclosed in Japanese Patent Application, First Publication Laid Open No. Hei 9-235319, (WPI: 97-498357/Japan Polyolefins Co., Ltd.), and the like. However, the modified-LLDPE disclosed therein exhibits an inferior adhesive strength, and thermal resistance. The present invention relates to an improved version of the invention disclosed in Japanese Patent Application, First Publication Laid Open No. Hei 9-235319, (WPI: 97-498357/Nippon Petrochemicals Co., Ltd.).

Accordingly, the first object of the present invention is to provide a specific ethylene-α-olefin copolymer, which exhibits a superior mechanical strength, optic properties, thermal resistance, and the like, compared with a LLDPE obtained by means of using a Ziegler catalyst; an equally favorable low temperature heat sealability, and clarity compared with the conventional, ethylene-α-olefin copolymer obtained by means of using a metallocene catalyst; and a superior thermal resistance, heat sealing strength, and processability compared with the conventional ethylene-α-olefin copolymer obtained by means of using a metallocene catalyst.

It is a second object of the present invention to provide a composition of said particular ethylene-α-olefin copolymer, and other polyolefin.

It is a third object of the present invention to provide a molded product that is molded from said specific ethylene-α-olefin copolymer, or composition thereof.

Examples of the molded product may include films, laminates comprising said film, release members using said laminate, containers, retort containers used for foods and medicine, paper containers, electric insulating materials, electric wires, cables, and the like. In particular, the present invention provides a superior processability, mechanical strength, and electric insulating properties to the aforementioned electric insulating material, electric wire, and cable.

It is a fourth object of the present invention to provide a resin material containing a polar group, which exhibits a superior thermal resistance, heat sealing strength, and processability, and imparts a superior adhesive properties to various substrates, and a superior affinity to various resins; and a laminate using the same.

DISCLOSURE OF INVENTION

In consideration of the aforementioned, the inventors of the present invention, after intense research, have disclosed an ethylene-α-olefin copolymer possessing a relatively broad composition distribution, despite having a narrow molecular weight distribution, which exhibits a favorable tensile strength, impact resistance, low temperature heat sealability, and thermal resistance, and thereby achieves the aforementioned objectives.

in other words, the ethylene-α-olefin copolymer of the present invention is obtained by means of polymerizing an ethylene and a $C_{4-12}$ α-olefin, and is characterized in satisfying the following conditions (A) to (E):

(A) a density in the range of 0.92 to 0.96 g/cm$^3$;

(B) a melt flow rate (MFR) in the range of 0.01 to 200 g/10 min;

(C) a molecular weight distribution (Mw/Mn) in the range of 1.5 to 5.0;

(D) possessing only one peak in terms of the number of peaks observed in an elution temperature-eluted amount curve as measured by the continuous temperature raising elution fractionation (TREF) method, and from the integrated elution curve obtained by said elution temperature-eluted amount curve, the temperature difference $T_{75}-T_{75}$ and said density d both satisfy the relationship shown by formula a and formula b, wherein $T_{25}$ is the temperature at which 25% of the total elusion is obtained, and $T_{75}$ is temperature at which 75% of the total elution is obtained; and $T_{75}-T_{25} \geq -300 \times d + 285$ (for $d < 0.950$ g/cm³)

$T_{75}-T_{25} \geq 0$ (for $d \geq 0.950$ g/cm³)   (Formula a)

$T_{75}-T_{25} \leq -670 \times d + 644$   (Formula b)

(E) possessing one or two melting point peaks, and among these the highest melting point $T_{m1}$ and said density d satisfy the relationship shown by formula c.

$T_{m1} \geq 150 \times d - 17$   (Formula c)

This ethylene-α-olefin copolymer possesses superior optical characteristics, mechanical strength, and thermal resistance over the LLDPE obtained by means of using a Ziegler catalyst. Moreover, while possessing the same low temperature heat sealability and transparency as an ethylene-α-olefin copolymer obtained by means of using a conventional metallocene catalyst, this ethylene-α-olefin copolymer in addition exhibits a superior thermal resistance, heat sealing strength, and processability when compared with the ethylene-α-olefin copolymer obtained by means of using a conventional metallocene catalyst.

In addition, the resin composition according the present invention is characterized in comprising 1 to 99% by weight of the ethylene-α-olefin copolymer described in the aforementioned, and 1 to 99% by weight of another polyolefin.

Accordingly, this resin composition exhibits superior optical characteristics, mechanical strength, thermal resistance, heat sealing strength, and processability.

In addition, a molded product comprising the ethylene-α-olefin copolymer according to the present invention or composition thereof also exhibits superior optical characteristics, mechanical strength, thermal resistance, heat sealing strength, and productivity.

In addition, a film comprising the ethylene-α-olefin copolymer according to the present invention or composition thereof also exhibits superior optical characteristics, mechanical strength, thermal resistance, heat sealing strength, and productivity.

In addition, the laminate, release member, container, retort container and paper container using the ethylene-α-olefin copolymer according to the present invention or composition thereof exhibits a superior productivity, adhesive strength, and thermal resistance.

In addition, the electrical insulating material comprising the ethylene-α-olefin copolymer according to the present invention or composition thereof exhibits a superior processability, mechanical strength, and electrical insulating properties.

Furthermore, the polar group-containing resin material according to the present invention is characterized in comprising one type of monomer unit selected from among (a) to (e) below in the resin component which comprises the ethylene-α-olefin copolymer, wherein the concentration of the monomer unit ranges from $10^{-8}$ to $10^{-3}$ mol per one gram of resin component:

(a) a carbonic acid group or acid anhydride group-containing monomer;

(b) an epoxy group-containing monomer;

(c) a hydroxyl group-containing monomer;

(d) an amino group-containing monomer; and (e) silane group-containing monomer.

The polar group-containing resin material formed in this manner displays a superior thermal resistance, heat sealing strength, processability, and exhibits a superior adhesiveness with respect to various substrates, in addition to a superior affinity for various types of resins.

BRIEF DESCRIPTION OF DRAWINGS

FIG. 1 is a graph showing an example of a TREF curve of the ethylene copolymer of the present invention.

FIG. 2 is a diagram showing an electrode system for measuring the Volume resistivity.

PREFERRED EMBODIMENT OF THE INVENTION

Figure 2A:
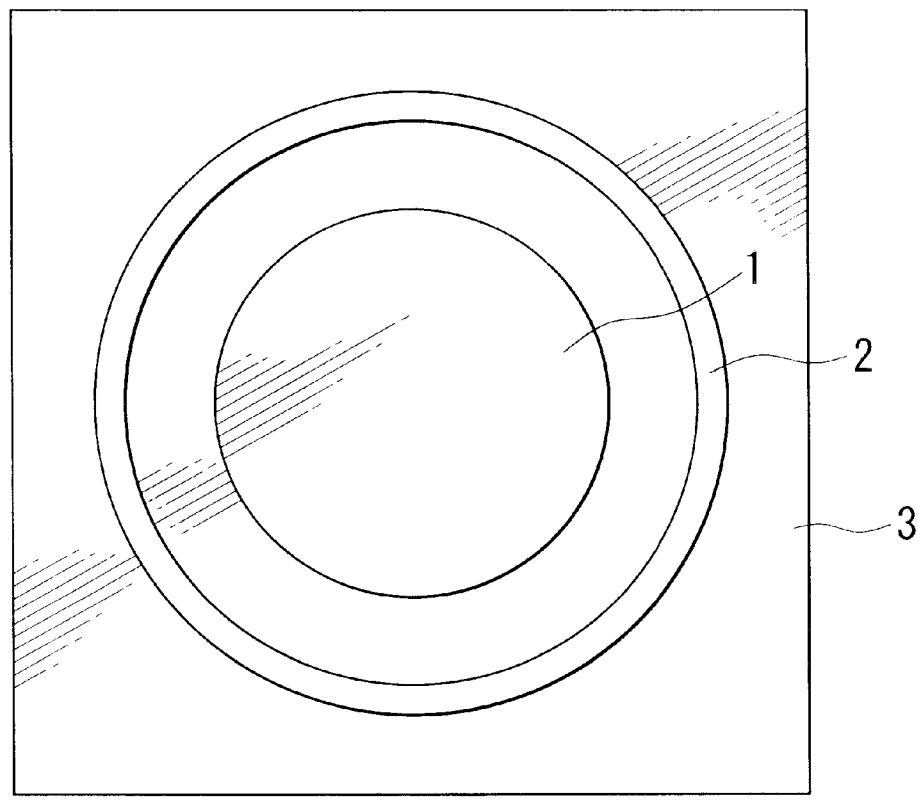
FIG. 2A shows a plane view.

In the following, the present invention is further described.

The $C_{4-12}$ α-olefin in the ethylene-$C_{4-12}$ α-olefin copolymer of the present invention (hereinafter, referred to as ethylene copolymer), comprises an α-olefin containing 4 to 12 carbon atoms, and preferably 5 to 10 carbon atoms. Concrete examples of the α-olefin may include 1-butene, 1-pentene, 4-methyl-1-pentene, 1-hexane, 1-octene, 1-decene, 1-dodecene, and the like.

In addition, the content amount of the α-olefin is usually no greater than 30 mol % in total, and preferably 3 to 20 mol %.

The density of the ethylene copolymer of the present invention is in the range of 0.92 to 0.96 g/cm³ (A), preferably in the range of 0.92 to 0.94 g/cm³, and more preferably in the range of 0.925 to 0.935 g/cm³. A density of less than 0.92 g/cm³ leads to both an inferior rigidity and inferior thermal resistance. On the other hand, a density exceeding 0.96 g/cm³ leads to a decreased mechanical strength including stretching strength, impact strength, and the like, due to an excessively hard ethylene copolymer.

The melt flow rate, (hereinafter, referred to as MFR), of the ethylene copolymer of the present invention is in the range of 0.01 to 200 g/10 minutes (B), preferably in the range of 0.05 to 50 g/10 minutes, and more preferably in the range of 0.1 to 30 g/10 minutes. An MFR of less than 0.01 g/10 minutes leads to an undesirable processability. On the other hand, a MFR exceeding 200 g/10 minutes leads to a decreased mechanical strength.

The molecular weight distribution (Mw/Mn) of the ethylene copolymer of the present invention is in the range of 1.5 to 5.0 (C), preferably in the range of 2.0 to 4.0, more preferably in the range of 2.3 to 4.0, or most preferably in the range of 2.5~3.5. An Mw/Mn of less than 1.5 leads to an inferior processability. An Mw/Mn exceeding 5.0 leads to an inferior impact resistance.

In general, the molecular weight distribution (Mw/Mn) of the ethylene copolymer can be obtained by means of obtaining the weight average molecular weight (Mw) and number average molecular weight (Mn) measured by gel permeation chromatography (GPC), and then calculating the ratio (Mw/Mn) therefrom.

The ethylene copolymer of the present invention, as shown in FIG. 1, possesses only one peak in terms of the number of peaks observed in an elution temperature-eluted amount curve as measured by the continuous temperature raising elution fractionation (TREF) method; and from the integrated elution curve obtained by said elution temperature-eluted amount curve, the temperature difference $T_{75}-T_{25}$ and said density d both satisfy the relationships shown by formula a and formula b, wherein $T_{25}$ is the temperature at which 25% of the total elution is obtained, and $T_{75}$ is the temperature at which 75% of the total elution is obtained.

$T_{75}-T_{25} \geq -300 \times d + 285$ (for $d<0.950$ g/cm$^3$) $T_{75}-T_{25} \geq 0$ (for $d \geq 0.950$ g/cm$^3$) \hfill (Formula a)

$T_{75}-T_{25} \leq -670 \times d + 644$ \hfill (Formula b)

When $T_{75}-T_{25}$ and density d do not satisfy the relationship expressed by the aforementioned formula a, the heat sealing strength and thermal resistance become inferior. When $T_{75}-T_{25}$ and density d do not satisfy the relationship expressed by the aforementioned formula b, the low temperature heat sealability become inferior.

The method for measuring the TREF in the present invention is described as follows. A test sample is initially added to orthodichlorobenzene (ODCB) which is mixed with anti-oxidant (such as butylhydroxy toluene) such that the test sample concentration becomes 0.10% by weight, and thermally dissolved at 140° C. 5 ml of the resultant test sample solution is injected to a column filled with glass beads, and cooled to 25° C. at a cooling speed of 4° C./hr, to deposit the test sample on the surfaces of glass beads. Subsequently, ODCB is poured into the column at a constant flow rate, and then the column temperature is increased at a constant heating speed of 50° C./hr, to successively elute the test sample. Herein, the concentration of the test sample eluted in the solvent is consecutively detected by means of measuring the absorption at a wavenumber of 2925 cm$^{-1}$ of the asymmetric stretching vibration of the methylene by means of an infrared detector. From this value, the concentration of the ethylene-α-olefin copolymer in the solution is quantitatively analyzed, to establish the relationship between the elution temperature and elution speed. Accordingly to the TREF analysis, it is possible to continuously analyze the change of the elution speed to the changes in temperature, with an extremely small amount of test sample, and thus to detect relatively fine peaks which cannot be detected according to the fractionation method.

In addition, the ethylene copolymer of the present invention possesses one or two melting point peak(s), and among these the highest melting point $T_{m1}$ and the density d satisfy the relationship shown by the following formula c (E).

$T_{m1} \geq 150 \times d - 17$ \hfill (Formula c)

If the aforementioned melting point $T_{m1}$ and the density d do not satisfy the relationship shown by the aforementioned formula c, the thermal resistance becomes inferior.

The ethylene-α-olefin copolymer of the present invention is an improved version with an different polymer structure than the ethylene-α-olefin copolymer disclosed in the Japanese Patent Application, First Publication No. Hei 8-325333. Concretely, the ethylene-α-olefin copolymer of the present invention possesses only one peak in terms of the number of peaks observed in an elution temperature-eluted amount curve, as measured by the continuous temperature raising elution fractionation (TREF) method. In contrast, the ethylene-α-olefin copolymer disclosed in the Japanese Patent Application, First Publication No. Hei 8-325333 possesses multi-peaks. In addition, the ethylene-α-olefin copolymer disclosed in the Japanese Patent Application, First Publication No. Hei 8-325333 does not satisfy the aforementioned condition (E) that relates to the thermal resistance properties, and is also inferior with respect to its thermal resistance and the like, compared to the ethylene-α-olefin copolymer of the present invention.

In addition, the ethylene copolymer of the present invention preferably satisfies the following condition (F).

(F) Melt tension (MT) and melt flow rate (MFR) satisfy the relationship shown by the following formula d:

Log MT $\leq -0.572 \times$ log MFR + 0.3 \hfill (Formula d)

An MT and MFR which satisfy the relationship shown by the aforementioned formula d, results in a favorable processability, e.g., film moldability, and the like.

The ethylene copolymer of the present invention possesses a relatively wide composition distribution, despite its narrow molecular weight distribution, and thus exhibits an excellent mechanical strength, e.g., stretching strength, impact strength, and the like, in addition to superior heat sealing strength, anti-blocking properties and thermal resistance.

The ethylene copolymer of the present invention possesses a wider molecular weight distribution than an ethylene copolymer obtained in the presence of the conventional, typical metallocene catalyst, i.e., at least one catalyst containing a ligand with a cyclopentadienyl structure, and a compound containing transition metal from group IV of the periodic table. Furthermore, the ethylene copolymer of the present invention exhibits a superior low temperature heat sealability compared to a low density ethylene-α-olefin copolymer obtained by means of using a Ziegler catalyst. Accordingly, the ethylene copolymer of the present invention is clearly distinguishable from these ethylene copolymers.

The catalyst, manufacturing method, and the like for the ethylene copolymer of the present invention are not particularly limited, as long as the aforementioned specific conditions are satisfied. The ethylene copolymer of the present invention is preferably an ethylene copolymer obtained by means of copolymerizing ethylene and $C_{4-12}$ α-olefin in the presence of a catalyst containing at least an organic cyclic compound having conjugated double bonds, and compound containing transition metal from group IV of the periodic table. Such an ethylene copolymer exhibits a great mechanical strength, e.g., stretching strength, impact strength, and the like, in addition to a superior heat sealing strength, anti-blocking properties, and thermal resistance.

In particular, the ethylene copolymer of the present invention is preferably polymerized with a catalyst obtained by means of mixing the following compounds (a1) to (a4). Such an ethylene copolymer can be manufactured easily by the means of using the aforementioned catalyst.

(a1): Compound expressed by the general formula, $Me_1R^1_p R^2_q (OR^3)_r X^1_{4-p-q-r}$

[wherein, $Me^1$ represents a zirconium, titanium, or hafnium; $R^1$ and $R^3$ each represent a $C_{1-24}$ hydrocarbon group; $R^2$ represents 2,4-pentanedionate ligand, derivatives thereof, benzoylmethanate ligand, benzoylacetone ligand, or derivatives thereof; $X^1$ represents a halogen atom; p, q, and r each represent an integer that satisfies the following conditions: $0 \leq p \leq 4$; $0 \leq q \leq 4$; $0 \leq r \leq 4$; and $0 \leq q+p+r \leq 4$].

(a2): Compound expressed by the general formula, $Me_2R^4_m (OR^5)_n X^2_{z-m-n}$

[wherein, $M^2$ represents an element from the groups I to III of the periodic table; $R^4$ and $R^5$ each represent a $C_{1-24}$ hydrocarbon group; $X^2$ represents a halogen atom or hydrogen atom (provided that when $X^2$ represents a hydrogen atom, $Me^2$ is limited to an element from the group III of the periodic table); z represents the valence of $Me^2$; and m, and n each represent an integer that satisfies the following conditions: $0 \leq m \leq z$; $0 \leq n \leq z/$ and $0 \leq m+n \leq z$].

(a3): An organic cyclic compound containing conjugated double bonds (a4): A modified organoaluminumoxy compound containing a Al—O—Al bond, and/or a boron compound In the following the catalytic components is further described in detail.

In the formula of the compound expressed by the general formula $Me^1R^1{}_pR^2{}_q(OR^3){}_pX^1{}_{4-p-q-r}$ of the aforementioned catalyst component (a1), $Me^1$ represents a zirconium, titanium, or hafnium. The kind of such a transition metal is not limited, and a plurality of these transition metals may be used. However, zirconium, which imparts a superior weather resistance to the copolymer, is particularly preferred. $R^1$ and $R^3$ each represent a $C_{1-24}$ hydrocarbon group, preferably $C_{1-12}$ hydrocarbon group, and more preferably $C_{1-8}$ hydrocarbon group. Concrete examples of the aforementioned hydrocarbon include an alkyl group such as a methyl group, ethyl group, propyl group, isopropyl group, butyl group, and the like, alkenyl group such as vinyl group, allyl group, and the like; aryl group such as phenyl group, tolyl group, xylyl group, mesityl group, indenyl group, naphtyl group, and the like; aralkyl group such a benzyl group, trityl group, phenetyl group, styryl group, benzhydryl group, phenylbutyl group, neophyl group, and the like; and the like. The aforementioned hydrocarbon may also be branched. $R^2$ represents 2,4-pentanedionate ligand, or derivatives thereof, benzoylmethanate ligand, or benzoylacetonate ligand, or derivatives thereof. $X^1$ represents a halogen atom such as fluorine, iodine, chlorine, bromine, and the like. p, q and r each represent an integer that satisfies the following conditions: $0 \leq p \leq 4$; $0 \leq q \leq 4$; $0 \leq r \leq 4$; and $0 \leq q+p+r \leq 4$.

Examples of the compounds expressed by the general formula of the aforementioned catalyst component (a1) may include tetramethyl zirconium, teraethyl zirconium, tetrabenzyl zirconium, tetrapropoxy zirconium, tripropoxy monochloro zirconium, tetraethoxy zirconium, tetrabutoxy zirconium, tetrabutoxy titanium, tetrabutoxy hafnium, and the like. Among the aforementioned, $Zr(OR)_4$ compounds such as tetrapropoxy zirconium, tetrabutoxy zirconium, and the like, are particularly preferred. The aforementioned may be used in combination of two or more types. In addition, examples of the aforementioned 2,4-pentanedionate ligand, or derivatives thereof, benzoylmethanate ligand, and benzoylacetonate ligand, or derivatives thereof, may include zirconium tetra(2,4-pentanedionate), zirconium tri(2,4-pentanedionate) chloride, zirconium di(2,4-pentanedionate) dichloride, zirconium 2,4-pentanedionate trichloride, zirconium di(2,4-pentanedionate) diethoxide, zirconium di(2,4-pentanedionate) di-n-propoxide, zirconium di(2,4-pentanedionate) di-n-butoxide, zirconium di(2,4-pentanedionate) dibenzyl, zirconium di(2,4-pentanedionate) dineophyl, zirconium tetra(dibenzoylmethanate),zirconium di(dibenzoylmethanate) diethoxide, zirconium di(dibenzoylmethanate) di-n-propoxide, zirconium di(dibenzoylmethanate) di-n-butoxide, zirconium di(benzoylacetonate) diethoxide, zirconium di(benzoylacetonate) di-n-propoxide, zirconium di(benzoylacetonate) di-n-butoxide, and the like.

In the formula of the compound expressed by the general formula $Me^2R^4{}_m(OR^5){}_nX^2{}_{z-m-n}$ of the aforementioned catalyst component (a2), $Me^2$ represents an element from groups I to III of the periodic table, examples of which include lithium, sodium, potassium, magnesium, calcium, zinc, boron, aluminum, and the like. $R^4$ and $R^5$ each represent a $C_{1-24}$ hydrocarbon group, preferably $C_{1-12}$ hydrocarbon group, and more preferably $C_{1-8}$ hydrocarbon group. Concrete examples may include an alkyl group such as a methyl group, ethyl group, propyl group, isopropyl group, butyl group, and the like; an alkenyl group such as vinyl group, allyl group, and the like; aryl group such as phenyl group, tolyl group, xylyl group, mesityl group, indentyl group, naphtyl group, and the like; an aralkyl group such as benzyl group, trityl group, phenetyl group, styryl group, benzhydryl group, phenylbutyl group, neophyl group, and the like; and the like. The aforementioned hydrocarbon may also be branched. $X^2$ represents a halogen atom such as fluorine, iodine, chlorine, bromine, and the like, or hydrogen atom. The aforementioned is under the proviso that when $X^2$ is a hydrogen atom, $Me^2$ is limited to an element from group III of the periodic table, such as boron, aluminum, and the like. z represents the valence of $Me^2$. m and n each represent an integer that satisfies the following conditions: $0 \leq m \leq z$; $0 \leq n \leq z$; and $0 \leq m+m \leq z$.

Examples of the compound expressed by the general formula of the aforementioned catalyst component (a2) may include n organic lithium compound such as methyl lithium, ethyl lithium, and the like; an organic magnesium compound such as dimethyl magnesium, diethyl magnesium, methyl magnesium chloride, ethyl magnesium chloride, and the like; an organic zinc compound such as dimethyl zinc, diethyl zinc, and the like; an organic boron compound such as trimethyl boron, triethyl boron, and the like; and derivatives of an organic aluminum compound and the like, such as trimethyl aluminum, triethyl aluminum, tripropyl aluminum, triisobutyl aluminum, trihexyl aluminum, tridecyl aluminum, diethyl aluminum chloride, ethyl aluminum dichloride, ethyl aluminum sesquichloride, diethyl aluminum ethoxide, diethyl aluminum hydride, and the like.

Examples of the organic cyclic compound having conjugated double bonds of the aforementioned catalyst component (a3) may include a cyclic hydrocarbon compound containing at least one ring having two or more conjugated double bonds, preferably two to four conjugated double bonds, and more preferably two or three conjugated double bonds, the total number of carbon atoms of which is 4 to 24, and preferably 4 to 12; a cyclic hydrocarbon compound, wherein a portion of the aforementioned cyclic hydrocarbon compound is substituted with one to six hydrocarbon residues (typically with an $C_{1-12}$ alkyl group or aralkyl group); an organic silicon compound having a cyclic hydrocarbon group containing at least one rig that contains two or more conjugated double bonds, preferably two to four conjugated double bonds, and more preferably two or three conjugated double bonds, the total number of carbon atoms of which is 4 to 24, and preferably 4 to 12; and an organic silicon compound, wherein a portion of the aforementioned cyclic hydrocarbon group is substituted with one to six hydrocarbon residues, or an alkali metal salt (such as a sodium or lithium salt). Among the aforementioned, organic cyclic compounds having a cyclopentadiene structure anywhere in its molecule is preferred.

Preferred examples of the aforementioned compound may include cyclopentadiene; indene; azulene; alkyl, aryl, aralkyl, alkoxy, or aryloxy derivatives thereof; and the like. In addition, compounds wherein these compounds are bonded (crosslinked) via an alkylene group (normally $C_{2-8}$, preferably $C_{2-3}$ alkylene group), are also preferred.

The organic silicon compound having a cyclic hydrocarbon group may be expressed by the following general formula.

Herein, A represents the aforementioned cyclic hydrogen group such as a cyclopentadienyl group, substituted cyclopentadienyl group, indenyl group, and a substituted indenyl group. R represents a hydrogen atom or $C_{1-24}$, preferably $C_{1-12}$ hydrocarbon residue, examples of which may include an alkyl group such as a methyl group, ethyl group, propyl group, isopropyl group, butyl group, and the like; an alkoxyl group such as a methoxy group, ethoxy group, propoxy group, butoxy group, and the like; an aryl group such as a phenyl group, and the like; an aryloxy group such as a phenoxy group, and the like; or an aralkyl group such as a benzyl group, and the like. L satisfies $1 \leq L \leq 4$, and preferably $1 \leq L \leq 3$.

Concrete examples of the organic cyclic hydrocarbon compound of the aforementioned component (a3) may include a $C_{5-24}$ cyclopolyene or substituted cyclopolyene, such as cyclopentadiene, methylcyclopentadiene, ethylcyclopentadiene, 1,2-dimethylcyclopentadiene, indene, 4-methyl-1-indene, 4,7-dimethylindene, cyclopeptatriene, methylcycloheptariene, cyclooctatetraene, azulene, fluolene, and methylfluorene; monocyclopentadienylsilane; biscyclopentadienylsilane; triscyclopentadienylsilane; monoindenylsilane; bisindenylsilane; trisindenylsilane; and the like.

The modified organoaluminumoxy compound containing an Al—O—Al bond of the catalyst component (a4) is a modified organoaluminumoxy compound generally referred to as "aluminoxane", which may be obtained by means of reacting an alkyl aluminum compound with water. This modified organoaluminumoxy compound generally contains 1 to 100 Al—O—Al bonds, and preferably 1 to 50 Al—O—Al bonds, in its molecular structure. In addition, the modified organoaluminumoxy compound may comprise either a linear- or ring-structure.

Reacting the organic aluminum to water is usually performed in an inactive hydrocarbon. Preferred examples of the inactive hydrocarbon include aliphatic, alicyclic, or aromatic hydrocarbons such as pentane, hexane, heptane, cyclohexane, benzene, toluene, xylene, and the like.

The reaction ratio of water and organic aluminum compound (water/Al mol ratio) is usually in the range of 0.25/1 to 1.2/1, and preferably in the range of 0.5/1 to 1/1.

Examples of the aforementioned boron compound may include triethylaluminum tetra(pentafluorophenyl)borate, triethylammonium tetra(pentafluorophenyl)borate, dimethylaluminum tetra(pentafluorophenyl)borate, dimethylanilinium tetra(pentafluorophenyl) borate, butylammonium tetra(pentafluorophenyl)borate, N,N-dimethylanilinium tetra(pentafluorophenyl)borate, N,N-dimethylanilinium tetra(3,5-difluorophenyl)borate, and the like.

The aforementioned catalyst components (a1)–(a4) may be used in combination and in contact with each other; however, these components are preferably supported on an inorganic carrier, and/or particulate polymer carrier (a5), and used.

Examples of the aforementioned inorganic carrier, and/or particulate polymer carrier (a5) may include carbon material, metal, metallic oxide, metallic chloride, metallic carbonate, mixtures thereof, thermoplastic resins, thermosetting resins, and the like. Preferred examples of the metal that can be used as the aforementioned inorganic carrier may include iron, aluminum, nickel, and the like.

Concrete examples may include $SiO_2$, $Al_2O_3$, $MgO$, $ZrO_2$, $TiO_2$, $B_2O_3$, $CaO$, $ZnO$, $BaO$, $ThO_2$, and the like, and mixtures thereof such as $SiO_2$—$Al_2O_3$, $SiO_2$—$V_2O_5$, $SiO_2$—$TiO_2$, $SiO_2$—$V_2O_5$, $SiO_2$—$MgO$, $SiO_2$—$Cr_2O_3$, and the like. Among the aforementioned, preferred examples include those compounds which comprise a main component of at least one component selected from among the group consisting of $SiO_2$ and $Al_2O_3$.

In addition, as the organic compound, either a thermoplastic resin, or thermosetting resin may be used. Concrete examples may include a particulate polyolefin, polyester, polyamide, poly(vinyl chloride), poly(methyl(meth) acrylate), polystyrene, polynorbornene, various natural high polymers, mixtures thereof, and the like.

The aforementioned inorganic carrier and/or particulate polymer carrier may be used "as is"; however, these compounds are preferably used as the component (a5) after treating the carrier in advance via contact treatment with an organic aluminum compound, modified organoaluminumoxy compound containing Al—O—Al bond, or the like.

The ethylene copolymer of the present invention may have a maximum halogen concentration of no greater than 10 ppm, preferably no greater 5 ppm, and more preferably substantially no halogen concentration (i.e., 2 ppm or lower), by means of using a catalyst that is free of halogen, e.g., chlorine, and the like, in the aforementioned catalyst components.

By means of using such a ethylene copolymer that is free of halogen, such as chlorine, it is unnecessary to use a conventional, acid neutralizer, and thus it is possible to provide films that are particularly useful in fields such as food packaging, medical supplies and equipment, and the like, which exhibit a superior chemical stability and sanitation.

The ethylene copolymer of the present invention is manufactured in the presence of the aforementioned catalyst according to a gas-phase polymerization wherein no substantial solvent is present, slurry polymerization, solution polymerization, and the like. In other words, the ethylene copolymer of the present invention is manufactured with no substantial oxygen and water, and the like, in the presence or absence of an inactive hydrocarbon solvent, e.g., aliphilic hydrocarbons such as butane, pentane, hexane, heptane, and the like, aromatic hydrocarbons such as benzene, toluene, xylene, and the like, alicyclic hydrocarbons such as cyclohexane, methylcyclohexane, and the like. The polymerization conditions are not particularly limited, however, the polymerization temperature is usually in the range of 15 to 350° C., preferably 20 to 200° C., and more preferably 50 to 110° C. The polymerization pressure is usually in the range of a normal pressure to 70 kg/cm²G in the case of a low or medium pressure process, and preferably in the range of a normal pressure to 20 kg/cm²G, and usually 1500 kg/cm²G or less in the case of a high pressure process. The polymerization duration is usually in the range of 3 minutes to 10 hours in the case of a low or medium pressure process, and preferably in the range of 5 minutes to 5 hours. In the case of a high pressure process, polymerization duration is usually in the range of 1 minute to 30 minutes, and preferably in the range of 2 minutes to 20 minutes. In addition, a one-step polymerization method, or multi-step polymerization method, wherein the polymerization conditions such as the hydrogen concentration, monomer concentration, polymerization pressure, polymerization temperature, catalyst, and the like, differ at each step, may be used as the polymerization method, which is not particularly limited.

The resin composition of the present invention contains 99 to 1% by weight of the ethylene copolymer that satisfies the aforementioned specific conditions (hereinafter, referred to as "ethylene copolymer (I)"), and 1 to 99% by weight of another polyolefin that differs from the aforementioned ethylene copolymer (I) (hereinafter, referred to as "the other polyolefin (II)"). The resin composition of the present invention contains preferably 5 to 99% by weight of the ethylene copolymer (I), and 95 to 1% by weight of the other polyolefin (II), and more preferably 10 to 99% by weight of the ethylene copolymer (I), and 90 to 1% by weight of the other polyolefin (II).

Examples of the other polyolefin (II) according to the present invention may include all polyolefin resins that differ from the aforementioned ethylene copolymer (I). In particular, preferred examples may include an ethylene homopolymer or copolymer (IIa) of ethylene and an α-olefin possessing a density of 0.86 to 0.97 g/cm$^3$; an ethylene polymer (IIb) produced according to a high pressure radical polymerization; a polypropylene resin (IIc); and an ethylene-α-olefin copolymer rubber (IId).

The aforementioned ethylene homopolymer or copolymer (IIa) of ethylene and an α-olefin possessing a density of 0.86 to 0.97 g/cm$^3$ comprises an ethylene-α-olefin copolymer that does not satisfy the specific conditions described above for the aforementioned ethylene copolymer (I). Said ethylene homopolymer or copolymer (IIa) of ethylene and an α-olefin is polymerized by means of using a conventional Ziegler catalyst, Phillips catalyst (hereinafter, both collectively referred to as a "conventional catalyst"), Kaminsky catalyst, or metallocene catalyst. Such as ethylene (co) polymer by conventional catalyst generally possesses a wider molecular weight distribution, or composition distribution than the ethylene copolymer (I). This ethylene (co)polymer comprises an ethylene homopolymer or a copolymer of ethylene and a $C_{3-12}$ α-olefin, obtained according to a high, medium, or low pressure process, or other conventional method, and contains a very low density polyethylene possessing a density of 0.86 to less than 0.91 g/cm$^3$ (hereinafter, referred to as "VLDPE"), linear low density polyethylene possessing a density of 0.91 to less than 0.94 g/cm$^3$ (hereinafter, referred to as "LLDPE"), and a medium, or high density polyethylene possessing a density of 0.94 to 0.97 g/cm$^3$, (hereinafter referred to as "MDPE" or "HDPE", respectively).

The high density polyethylene (HDPE) and medium density polyethylene (MDPE) obtained by means of using the aforementioned conventional catalyst each comprises a density in the range of 0.94 to 0.97 g/cm$^3$. The density of the linear low density polyethylene (LLDPE) is in the range of 0.91 to 0.94 g/cm$^3$, and preferably in the range of 0.91 to 0.93 g/cm$^3$. The MFR for the aforementioned is in the range of 0.005 to 100 g/10 minutes, preferably 0.05 to 50 g/10 minutes, and more preferably 0.08 to 30 g/10 minutes. The Mw/Mn is in the range of 2.5 to 13, and preferably 3 to 8.

The very low density polyethylene (VLDPE) obtained by means of using the aforementioned conventional catalyst comprises a density of 0.86 to less than 0.91 g/cm$^3$, and preferably 0.88 to 0.905 g/cm$^3$; the MFR is in the range of 0.01 to 20 g/10 minutes, and preferably 0.1 to 10 g/10 minutes.

The very low density polyethylene (VLDPE) is a polyethylene which exhibits an intermediate nature between that of a linear low density polyethylene (LLDPE) and an ethylene-α-olefin copolymer rubber (EPR, EPDM). In addition, the VLDPE has a maximum peak temperature $T_m$ of at least 60° C., and preferably at least 100° C. as measured by differential scanning calorimetry (DSC), and is also characterized by a boiled n-hexane insoluble component of 10% by weight or greater. The VBLDPE is polymerized by using a catalyst comprising a solid catalyst component containing at least titanium and/or vanadium, and an organic aluminum compound. This VLDPE is a resin comprising a combination of a highly crystalline portion displayed by the linear low density polyethylene (LLDPE), and a non-crystalline portion displayed by the ethylene-α-olefin copolymer rubber. As the VLDPE, a VLDPE in which the characteristics of the LLDPE, i.e., mechanical strength, thermal resistance and the like, and the characteristics of the ethylene-α-olefin copolymer rubber, i.e., rubber elasticity, low temperature shock resistance, and the like, coexist in a balanced manner, is preferably used.

Concrete examples of the aforementioned α-olefin may include propylene, 1-butene, 4-methyl-1-pentene, 1-hexene, 1-octene, 1-dodecene, and the like. Among these aforementioned examples, 1-butene, 4-methyl-1-pentene, 1-hexene, and 1-octene are preferred, with 1-butene and 1-hexene being particularly preferred. The amount of the α-olefin contained in the ethylene copolymer is preferably no greater than 40 mol %.

Examples of the aforementioned (IIb) ethylene polymer obtained by means of a high pressure radical polymerization include an ethylene homopolymer having a density of 0.91 to 0.94 g/cm$^3$, an ethylene-vinyl ester copolymer, an ethylene-α, β-unsaturated carbonic acid ester copolymer, a copolymer of ethylene and an unsaturated dicarbonic acid or anhydride thereof, a copolymer of ethylene, α,β-unsaturated carbonic acid ester, and an unsaturated dicarbonic acid or anhydride thereof, and the like.

The aforementioned ethylene homopolymer having a density of 0.91 to 0.94 g/cm$^3$, obtained by means of a high pressure radical polymerization, is a low density polyethylene obtained by means of a conventional high pressure radical polymerization. The MFR of this low density polyethylene (LDPE) is in the range of 0.05 to 100 g/10 minutes, and preferably 0.1 to 50 g/10 minutes. In film processing, as long as the MFR is in the range of 0.05 to 20 g/10 minutes, the melt tension falls within the appropriate range, and the processability is improved. In addition, the density is in the range of 0.91 to 0.94 g/cm$^3$, and preferably 0.912 to 0.935 g/cm$^3$. As long as the density is in this aforementioned range, the melt tension falls within the appropriate range, and the processability is improved. The melt tension is in the range of 1.5 to 25 g, preferably 3 to 20 g, and more preferably 3 to 15 g. In addition, the molecular weight distribution Mw/Mn is 3.0 to 12, and preferably 4.0 to 8.0. The melt tension comprises an elastic item of the resin, such that a favorable processability results as long as it lies within the aforementioned range.

The aforementioned ethylene-vinyl ester copolymer is manufactured according to a conventional high pressure radical polymerization, and comprises a copolymer comprising ethylene as its main component, in addition to a vinyl ester monomer such as vinyl propionate, vinyl acetate, vinyl caproate, vinyl caprylate, vinyl laurate, vinyl stearate, vinyl trifluoroacetate, and the like, plus another unsaturated monomer. Among the aforementioned, an ethylene-vinyl acetate copolymer is particularly preferred. In other words, a copolymer comprising 50 to 99.5% by weight of ethylene, 0.5 to 50% by weight of vinyl acetate and 0 to 25% by weight of another unsaturated monomer is preferred.

The other unsaturated monomer mentioned above comprises at least one compound selected from the group consisting of $C_{3-10}$ olefins such as propylene, 1-butene, 1-hexene, 4-methyl-1-pentene, 1-ocetene, 1-dodecene, and the like; vinyl esters such as $C_{2-3}$ alkane carbonates; (meth) acrylate esters such as methyl (meth)acrylate, ethyl(meth) acrylate, propyl (meth)acrylate, glycidyl (meth)acrylate, and the like; ethylenic unsaturated carbonic acids such a (meth) acrylic acid, maleic acid, fumaric acid, maleic anhydride and/or anhydrides thereof, and the like.

Examples of the aforementioned copolymer of ethylene and α,β-unsaturated carbonic acid ester, copolymer of ethylene and an unsaturated dicarbonic acid or anhydride thereof, and copolymer of ethylene, α,β-unsaturated carbonic acid ester, and an unsaturated dicarbonic acid or anhydride thereof, include an ethylene-methyl (meth) acrylate copolymer, ethylene-ethyl (meth)acrylate copolymer, ethylene-methyl (meth)acrylate-maleic anhydride copolymer, ethylene-ethyl (meth)acrylate-maleic anhydride copolymer, ethylene-maleic anhydride copolymer, and the like. Specifically, a copolymer comprising 50 to 99.5% by weight of ethylene, 0.5 to 50% by weight of a (meth)acrylate ester, and 0 to 25% by weight of an unsaturated dicarbonic acid or anhydride thereof is preferred.

Examples of the aforementioned unsaturated dicarbonic acid or anhydride thereof include maleic acid, fumaric acid, maleic anhydride, and the like. In addition, it is also possible to copolymerize another monomer, as long as this does not decrease the adhesiveness of the aforementioned.

The MFR of the aforementioned is generally in the range of 0.1 to 100 g/10 minutes, preferably 0.1 to 70 g/10 minutes, and more preferably 1 to 50 g/10 minutes. An MFR less than 0.01 g/10 minutes results in a poor processability, while, on the other hand, an MFR exceeding 100 g/10 minutes produces an insufficient strength.

Examples of the aforementioned polypropylene resin (IIc) include propylene homopolymers, random and block copolymers of propylene and an α-olefin, and the like.

Examples of the aforementioned ethylene-α-olefin copolymer rubber (IId) include random copolymers comprising ethylene and propylene as the main components (EPM), random copolymer comprising the aforementioned plus a diene (e.g., dicyclopentadiene, ethylidenenorbornene, etc.) as a third component (EPDM).

The type of the other polyolefin (II) to be blended into the resin composition of the present invention differ respectively depending on the characteristics and usage required thereof. For example, in the case when a high thermal resistance is required, an HDPE or LLDPE is selected. In addition, in the case when transparency is desirable, use of a low density polyethylene or polypropylene is preferred.

It is also possible to add a lubricant such as a saturated or unsaturated fatty acid amide, a saturated or unsaturated higher fatty acid metal salt, and the like; an anti-blocking agent such as silica, calcium carbonate, talc, zeolite, magnesium carbonate, alkylene bis- saturated or unsaturated higher fatty acid amide; and the like, to the ethylene copolymer (I) of the present invention and composition thereof, to the extent that aforementioned properties are not degraded or lost. However, since the ethylene copolymer (I) of the present invention possesses remarkably superior anti-blocking properties, it is not always necessary to add these lubricants and anti-blocking agents. In addition, in the case when a saturated or unsaturated higher fatty acid metal salt is not added as the lubricant, it is not necessary to add a neutralizing agent. In particular, with regard to foodstuff and medicines, from the standpoint of sanitation, it is preferable to avoid adding these lubricant, anti-blocking agent and neutralizing agent.

In addition, it is also possible to add a phenol type anti-oxidant and/or phosphite type anti-oxidant to the ethylene copolymer (I) of the present invention and composition thereof, to the extent that aforementioned properties are not degraded or lost. However, since the ethylene copolymer (I) of the present invention can degrade the temperature at the processing than a conventional ethylene copolymer, it is not always necessary to add these anti-oxidants. In particular, with regard to foodstuff and medicines, from the standpoint of sanitation and impurity, it is preferable to avoid adding these anti-oxidants.

Furthermore, is also possible to mix another thermoplastic resin with the ethylene copolymer (I) and composition thereof according to the present invention, to the extent that aforementioned objects of the present invention are not degraded or lost. In addition, it is also possible to add conventional additives such as an anti-static agent, weather resistant agent, UV absorber, anti-fogging agent, organic or inorganic pigment, dispersing agent, nucleating agent, flame retardant, foaming agent, crosslining agent, and the like, as necessary to the ethylene copolymer (I) of the present invention and composition thereof.

The molded products of the present invention are manufactured from the ethylene copolymer (I) of the present invention or composition thereof. The preferred form of the molded product of the present invention is a film. The film of the present invention may be formed by means of processing using a conventional air-cooled inflation technique, air-cooled two-stage cooling inflation technique, T-die technique, water-cooled inflation technique, and the like.

In general, the thickness of the film of the present invention is 10 to 200 $\mu$m, and preferably 30 to 100 $\mu$m from the standpoint of ease of handling.

One example of the film fabricating process according to the present invention includes a fabricating process for a blown film performed by means of inflation technique.

The inflation processing comprises the steps of extrusion, which is performed by means of an extruder at a temperature of 120 to 250° C. passing through a circular die; rapid cooling via contact with air ejected from an air cooling-type air ring; taking-up by means of a pinch roll following solidification; and subsequent winding around a rod. In addition, in the case when additives such as an anti-oxidant, stabilizing agent or the like are not used, low temperature processing in a temperature range of 120 to 180° C. is preferred. This low temperature processing capability is one characteristic of the ethylene copolymer (I) of the present invention and composition thereof.

The speed at which the film is taken up is 20 to 120 m/minute, and the blow up ratio is in the range of 1.5 to 4.0, and preferably 1.7 to 3.0.

When the blow up ratio is less than 1.5, it is not possible to achieve superior strength, and strength balance between machine direction and transverse direction. On the other hand, blow up ratio of greater than 4.0 results in an increase in the oscillation of a bubble at the time of processing, which in turn results in degradation of the processability.

In addition, the frost line height at the time of inflation fabricating is in the range of 100 mm to 700 mm, and preferably 300 mm to 600 mm. When the frost line height is less than 100 mm, a large gas quantity of the cooled air is required, which generates an increase in the oscillation of a bubble at the time of processing, and results in degradation of the processing stability. On the other had, a frost line height exceeding 700 mm results in an inability to achieve the aforementioned strength due to the sequential cooling of a bubble using a small gas quantity.

Furthermore, in the case of low temperature processing, the processing is performed at a temperature range of 120 to 180° C., preferably 140 to 170° C., and more preferably 150 to 160° C. A processing temperature of lower than 120° C. is associated with the occurrence of melt fractures and surging (extrusion fluctuations). On the other hand, processing temperature exceeding 180° C. in the absence of an anti-oxidant, thermal stabilizing agent or the like results in the generation of gelling and fish eyes from oxidation degradation.

The film of the present invention possesses impact strength, tear strength, transparency, low-temperature heat sealability, hot tacking properties, thermal resistance, and the like. As a result, this film of the present invention is suitable in packaging films for various uses such as in standard bags, sugar sacks, oil product packaging, liquid packaging, agricultural materials and inner bags for bag-in-box, and the like.

In addition, the film of the present invention may be laminated onto another substrate, and used in various packaging, containers and the like as a sealant film. Such laminates may be formed laminating the aforementioned onto a substrate by means of a extrusion coating method, dry lamination method, sandwich lamination method, co-extrusion T-die method, co-extrusion inflation method and the like. Such methods are concretely disclose din Japanese Patent Application, First Publication Laid Open No. Hei 9-59442, to which the execution of the present invention may conform.

Examples of the substrate used in the present invention may include resin films or sheets such as polypropylene, polyamide, polyester, ethylene-vinyl acetate copolymer saponification compounds, poly(vinylidene chloride), and the like (including films or sheets formed by secondary processing of these films or sheets, such as oriented products, printed products and metal-deposited products); metal foil and metal sheets of aluminum, iron, copper and alloys using these metals, as principal components; cellophane, paper, woven fabrics, nonwoven fabrics and the like.

Concrete examples of substrates that are generally used in packaging materials include cellophane; nylon substrates such as oriented nylon, cast nylon, specific nylon (e.g., MXD 6), K-nylon (poly(vinylidene chloride) coat), and the like; PET (polyethylenetetephthalate) substrates such as oriented PET, cast PET, K-PET and the like; polypropylene substrates such as oriented PP (OPP), cast PP (CPP), K-PP, co-extrusion film PP, and the like; synthetic resin films such as oriented HDPE films, polystyrene films, and the like; aluminum-deposited PET, aluminum-deposited PP, paper materials, LDPE laminated paper materials, and the like. The aforementioned may also be used even with printing thereof.

Furthermore, it is also possible to pre-treat these substrates using various processes such as corona discharge treatment, flame treatment, plasma treatment, ultraviolet ray treatment, anchor coat treatment, ozone treatment, and the like.

Among the aforementioned laminates, preferred examples include those laminates comprising a layer formed from the ethylene copolymer (I) of the present invention or composition thereof, a barrier layer and/or a layer formed from the other polyolefin (II).

Concrete examples of the aforementioned include SLLDPE/paper, SLLDPE+LDPE/paper/SLLDPE+LDPE, SLLDPE+LDPE/OPP, SLLDPE+LDPE/OPP/SLLDPE+LDPE, SLLDPE/PA, SLLDPE/PA/SLLDPE, SLLDPE/PEs, SLLDPE/PEs/SLLDPE, SLLDPE/EVOH, SLLDPE/EVOH/SLLDPE, SLLDPE/nonwoven fabric, SLLDPE/Al foil, SLLDPE+HDPE/paper/SLLDPE, and the like.

(in the aforementioned, SLLDPE represents the ethylene copolymer (I) of the present invention; LDPE represents a low density polyethylene obtained by means of a high pressure radical polymerization; OPP represents a biaxially oriented polypropylene; PA represents a polyamide; EVOH represents an ethylene-vinyl acetate copolymer saponification compound; PEs represents a polyester; and Al foil represents aluminum foil).

According to an embodiment of the present invention, a release member is provided as an example of molded products according to the present invention. The release member (release paper) of the present invention comprises a layer formed from the ethylene copolymer (I) of the present invention or composition thereof, and a release agent layer. The release member of the present invention may be used as an adhesive sheet, bonding sheet, adhesive tape substrate, process sheet, and the like.

The release paper comprises a release agent layer incorporated onto a substrate such as paper or the like. In order to improve the coating properties and release properties of the release agent, a so-called "filling layer" is inserted between the substrate and release agent layer.

In this type of filling layer, normally an economical compound such as a low density polyethylene alone, obtained by means of a high pressure radical polymerization; or a mixture formed by mixing a linear low density polyethylene, which is a copolymer of ethylene and another α-olefin, and a high density polyethylene, i.e., an ethylene homopolymer obtained by means of using a Ziegler catalyst, into a low density polyethylene, obtained by means of a high pressure radical polymerization.

In particular, recently, with respect to the manufacturing process of the aforementioned release member, in order to even further reduce costs, the production process of the release agent layer is being shortened. The production process of the release agent layer, in general, comprises a coating process, in which the release agent is coated, and a drying process. In order to shorten the aforementioned, it is necessary to reduce the duration of the drying process. Hence, it is desirable to further increase the drying temperature. However, when increasing the drying temperature, compounds having a low melting point, such as the low density polyethylene, obtained by means of a high pressure radical polymerization, which are used in the filling layer are melted during the drying process. This aspect, in turn, poses problems due to the generation of multiple pin holes.

In order to solve this problem, a process had been employed in which a linear low density polyethylene and/or a high density polyethylene possessing a higher melting point was blended into a low density polyethylene, obtained by means of a high pressure radical polymerization. However, a drying temperature exceeding the melting point of the aforementioned resulted in the melting of these blended compounds, such that the possibility of pin hole generation existed due to the inadequate thermal resistance. As a result, it was not possible to reduce costs any further. At this point, the inventors of the present invention proposed a release member which solved the aforementioned problems in Japanese Patent Application, First Publication Laid Open No. Hei 10-80972 (WPO 98/254960/Nippon Petrochemicals Co., Ltd.). The present invention builds on and further improves the invention disclosed in the aforementioned Japanese Patent Application, First Publication Laid Open No. Hei 10-80972.

The release member of the present invention may be formed by means of applying the conventional technology disclosed in the aforementioned Japanese Patent Application, First Publication Laid Open No. Hei 10-80972. However, a release member formed by means of constructing the filling layer using the ethylene copolymer (I) of the present invention, which possesses an even greater thermal resistance, results in a product with superior properties of thermal resistance, pin hole resistance, and glossiness after heating, in addition to a greater than normal durability (i.e., increasing the number of usage) from the high thermal resistance, favorable glossiness (i.e., smooth surface layer), and strong adhesion to paper (i.e., sticks readily to paper) imparted by the aforementioned. The use of a release member formed in this manner affords the additional merit of being able to obtain a product, e.g., synthetic leather or the like, with a favorable surface.

The substrate of the release member according to the present invention may be optionally selected based on use: appropriate examples of the substrate may include, but are not limited to, paper, woven fabric, non-woven fabric, and the like. Examples of the aforementioned paper include woodfree paper, kraft paper, glassine paper, inorganic fiber-mixed paper, synthetic resin-mixed paper, and the like.

Examples of other molded products according to the present invention include: containers formed by means of performing direct injection molding, blow molding or the like, on the ethylene copolymer (I) of the present invention or composition thereof; containers or bag comprising film or sheet formed into a bag, which formed by means of extrusion processing or the like; and containers formed with a multi-layered structure comprising suitably combined laminates, as described above. Containers formed with such multi-layered structures exhibit superior low temperature heat sealability and thermal resistance imparted from the ethylene copolymer (I) of the present invention, composition thereof, or film thereof as an inner layer. In addition, when compared with the conventional LLDPE, the ethylene copolymer (I) of the present invention and composition thereof can be obtained as one which does not contain halogen and a low molecular weight component, and comprises a superior processability, which in turn allows for processing in the absence of additives. Consequently, containers made from the ethylene copolymer (I) of the present invention or composition thereof provides additional merits for fields which demand a high sanitation level since there exist no components that could be transferred onto the contents of the container.

One example among the suitable uses for containers include retort containers. A retort container refers to a container which has been carried out retorting sterilization. Concrete examples include retort food containers, retort food bag, containers for blood and medical fluids, medical container, etc. The retort containers according to the present invention are formed by means of performing direct injection molding, blow molding or the like, on the ethylene copolymer (I) of the present invention or composition thereof.

In addition, the retort container according to the present invention may also comprise a multi-layered member formed by means of appropriately combining the aforementioned laminate comprising a film or sheet obtained by means of extrusion processing. In particular, with respect to a medical container, by means of forming multi-layered structure comprising at least three layers, and setting respective inner and outer layer densities of at least 0.93 g/cm$^3$, and an intermediate layer density of no greater than 0.92 g/cm$^3$, it is possible to form a bag which exhibits superior properties of thermal resistance, transparency, flexibility, drop strength and the like.

Due to its excellent processability and the fact that the ethylene copolymer (I) of the present invention can be made free of halogen, it is possible to form a container that is free of additives. Consequently, by means of using the ethylene copolymer (I) of the present invention in the inner layer, it is possible to provide a medical container possessing a superior stability in which micro-granules are extremely rare.

A paper container represents another suitable use of the present invention. The aforementioned paper container conventionally has been made from a laminate comprising paper and a low density polyethylene (HPLDPE) obtained by means of a high-pressure radical polymerization method. However, there exists a great demand for improvement such as increasing the thermal resistance, and adding a down gauge and the like. On the other hand, the ethylene copolymer (I) of the present invention or a composition in which an HPLDPE is blended into the ethylene copolymer (I) of the present invention comprises a superior processability and can also be obtained free of halogen, which in turn allows for processing without the use of additives. As a result, the aforementioned the ethylene copolymer (I) of the present invention and composition thereof can be easily applied to a paper container for use in the food field, which demands a high level of sanitation.

The paper container according to the present invention comprises a laminate formed from at least two layers including a paper layer and a layer comprising the ethylene copolymer (I) of the present invention or composition thereof. Since the paper container possesses high thermal resistance, excellent glossiness (i.e., smooth surface layer), and strong adhesion to paper (i.e., sticks readily to paper), in the same of the aforementioned release member, it is possible to provide a product that exhibits a superior thermal resistance and pin hole resistance, in addition to a greater than normal durability. This type of paper container can be utilized as a container for dairy products such as milk, juices, water, soy sauce, liquor and the like. In addition, the container according to the present invention has additional merits in that it is possible to perform heat sterilization thereon due to its superior thermal resistance properties, and also fill the container with hot liquids without having to cool them.

According to another aspect of the present invention, an electrical insulating material, and electric wire and cable comprising the same are provided which comprise the ethylene copolymer (I) of the present invention or composition thereof, and hence possess both a superior processability and electrical insulating properties without exhibiting a reduction in mechanical strength.

The ethylene copolymer (I) for use in the electrical insulating material according to the present invention also preferably satisfies condition (G) below.

(G) possessing an electrical activation energy of no greater than 0.4 eV

The electrical activation energy of the ethylene copolymer (I) for use in the electrical insulating material according to the present invention is preferably no greater than 0.3 eV, and more preferably no greater than 0.25 eV. If the electrical activation energy exceeds 0.4 eV, the quantity and mobility of charged carriers such as ion or electron dramatically increase with increases in the temperature, resulting in a degradation of the thermal and chemical stability thereof.

This value is extremely small compared to that of conventional polyethylene materials, such that it can be considered that the ethylene copolymer (I) according to the present invention possesses a specific structure that enables the quantity and mobility of charged carriers incorporated therein to be resistant to the influences of temperature.

Here, the electrical activation energy is considered to be one of the constants incorporated into the Arrhenius' equation for expressing the change of the rate constant with temperature during the process of the transport phenomenon. This electrical activation energy corresponds to the difference in energy between the transition state and original system in the process toward the produced system from the original system via the transitions state. In particular, the electrical activation energy is used in the Arrhenius' equation for expressing the temperature dependence of the electric current. Here, a small electrical activation energy indicates that the temperature dependence of the electric current is small.

The electrical activation energy (U) according to the present invention can be determined from the following equation (i.e., the Arrhenius' equation).

$$I \propto \exp(-U/kT)$$

(wherein I represents the electric current, k is the Boltzmann's constant, and T is the absolute temperature).

In the above equation, by means of substituting the temperature (20° C.) and the electric current at 90° C., it is possible to obtain the electrical activation energy.

With respect to the ethylene copolymer (I) in the electrical insulating material according to the present invention, the catalyst, manufacturing method, and the like are not particularly limited, so long as the ethylene copolymer satisfies the aforementioned specific conditions. The ethylene copolymer in the electrical insulating material according to the present invention is preferably obtained by means of copolymerizing ethylene and a $C_{4-12}$ α-olefin under the presence of a catalyst containing an organic cyclic compound having at least a conjugated double bond, and a compound containing transition metal from group IV of the periodic table. By means of using this type of catalyst, it is possible to maintain the electrical activation energy of the ethylene copolymer (I) at a value of no greater than 0.4 eV.

In particular, the ethylene copolymer (I) in the electrical insulating material according to the present invention is preferably obtained by preparing a catalyst by means of selecting components which do not contain a halogen from the aforementioned compounds (a1) to (a4), and mixing thereof. The ethylene copolymer formed in this manner does not require a halogen acceptor, and hence this aspect prevents degradation of the electrical properties. In addition, the ethylene copolymer (I) that uses a catalyst, prepared by means of mixing the aforementioned compounds (a1) to (a4), can satisfy the aforementioned condition (G) of possessing an electrical activation energy of no greater than 0.4 eV.

By means of using a catalyst which does not contain a halogen, e.g., chlorine, in the aforementioned catalyst component, to form the ethylene copolymer (I) in the electrical insulating material according to the present invention, it is possible to maintain a halogen concentration of no greater than 10 ppm, preferably no greater than 5 ppm, and more preferably no greater than 2 ppm (i.e., essentially no halogen). In addition, due to the superior processability of the aforementioned, it is possible to perform low temperature processing and avoid the addition of stabilizing agents which adversely affect the dielectric dissipation factor.

By means of using this type of ethylene copolymer, which is free of both halogens, e.g., chlorine, and additives, it is possible to dramatically improve the electrical properties of the electrical insulating material.

The aforementioned electrical insulating material according to the present invention is formed from the aforementioned ethylene copolymer (I), or a resin composition comprising the aforementioned ethylene copolymer (I) and the other polyolefin (II).

In other words, in the case of a resin composition, the electrical insulating material according to the present invention comprises 1 to 99% by weight of an ethylene copolymer (I), and 1 to 99% by weight of the other polyolefin (II). In particular when using a low density polyethylene (IIb), the electrical insulating material comprising 1 to 40% by weight of the ethylene copolymer (I), and 60 to 99% by weight of low density polyethylene (IIb), can be maintained halogen free, and also exhibits excellent electrical insulating properties.

In addition, an ethylene-vinyl ester copolymer (IIb) and/or a copolymer, obtained from ethylene and an α,β-unsaturated carbonic acid or derivative thereof, further improves the resistance to water-treeing, and thus these compounds are preferred in the case when such properties are specifically required.

In addition, the type of the other polyolefin (II) to be blended differs depending on the specific characteristics in demand. More concretely, in the case when the processability garners primary consideration, then an ethylene (co)polymer obtained by means of a high pressure radical polymerization is used; on the other hand, in the case when primary consideration is being given to the handling at the time of cable manufacturing, affordability, and thermal resistance, then a linear low density polyethylene, medium density polyethylene or high density polyethylene obtained by means of low, medium or high pressure process, respectively, is used.

The electrical insulating material of the present invention may also use the resin composition of the present invention "as is" without difficulty. However, in order to improve the thermal resistance and mechanical strength, it is preferable to crosslink the resin composition according to the present invention. The crosslinking method is not particularly limited, examples of which may include a crosslinking method in which crosslinking is performed by means of a radical generator such as an organic peroxide or the like; an electron ray crosslinking method; a silane crosslinking method; and the like. Among these aforementioned methods, from the standpoint of affordability, the crosslinking method in which crosslinking is performed by means of a radical generator such as an organic peroxide or the like is preferred.

Examples of the radical generator may include peroxides such as benzoyl peroxide, laurylperoxide, dicumylperoxide, t-butylhydroperoxide, α,α-bis(t-butylperoxydiisopropyl)benzene, di-t-butylperoxide, 2,5-dimethyl-2,5-di-(t-butylperoxy)hexane, di-t-butylperoxide, 2,5-dimethyl-2,5-di-(t-butylperoxy)hexane, azobisisobutyronitrile, and the like; 2,3-dimethyl-2,3-diphenylbutane, 2,3-diethyl-2,3-diphenylbutane, 2,3-diethyl-2,3-di(p-methylphenyl)butane, 2,3-diethyl-2,3-di(bromophenyl)butane, and the like.

In the aforementioned crosslinking, among these radical generator, use of dicumylperoxide, 2,5-dimethyl-2,5-di-(t-butylperoxy) hexane, 2,5-dimethyl-2,5-di-(t-butylperoxide) hexine, and the like are preferred. In addition, the usage amount of the radical generating agent is in the range of 0.01 to 5 parts by weight, preferably 0.1 to 3 parts by weight, per total 100 parts by weight of the electrical insulating material.

When necessary, it is also possible to add an inorganic filler, organic filler, anti-oxidant, lubricant, organic or inorganic pigment, UV absorber, light stabilizer, dispersing agent, copper inhibitor, neutralizer, plasticizer, nucleating agent, pigment and the like to the electrical insulating material of the present invention.

The electrical insulating material of the present invention may be used in electric wires and cables, insulating material for condensers, insulating material for high voltage portions of X-ray generating devices, distributor codes, and the like.

The electric wire and cable of the present invention comprises the aforementioned electrical insulating material, or from an insulating layer in which the aforementioned electrical insulating material is crosslinked.

In addition, the electric wire and cable of the present invention comprises an insulating layer formed by means of coating the electrical insulating material of the present invention onto at least a conductor by means of a conventional extrusion coating method. Furthermore, with respect to the electric wire and cable of the present invention, it is possible to form an aggregate wire using the conductor portion thereof, provide a semi-conducting layer between the conductor and insulating layer, and also form a flame resistant resin layer on the exterior of the insulating layer.

Concrete examples of the aforementioned electric wire and cable may include a cable comprising a wire which is formed from an aggregate of copper wires, a semi-conducting layer which is covering the wire and formed by a resin composition to which a conductive carbon or metal powder has been added, an insulating layer which is covering the semi-conducting layer and formed by the electrical insulating material of the present invention, a metal sheet layer or semi-conducting layer which is covering the insulating layer, and a flame retardant resin or rodent resistance resin which is provided on the outermost side. Another example of the aforementioned electric wire and cable may include a cable comprising an aggregate of several to several ten of covered-copper wires and a flame retardant resin or rodent resistance resin which is provided on the outermost side of said aggregate, wherein said covered-copper wire comprise a single copper wire, a semiconductor layer which is covering the wire and formed by a resin composition to which a carbon or metal powder is added, an insulating layer which is covering the semi-conducting layer and formed by the electrical insulating material of the present invention, and a metal film layer which is further provided onto said insulating layer; and the like. The electrical insulating material of the present invention provides remarkable effects against high voltage, and is preferably used as a large-capacity cable, and/or a direct current cable.

As described in the aforementioned, since the electrical insulating material of the present invention comprises an ethylene-α-olefin copolymer which satisfies the aforementioned specific conditions, the electrical insulating material of the present invention possesses a superior processability, in addition to superior electrical insulating properties without a reduction in the mechanical strength.

In addition, the electric wire and cable of the present invention uses the aforementioned electrical insulating material, and thus similarly exhibits superior mechanical and electrical insulating properties.

The polar group-containing resin material according to the present invention is characterized in containing one type of monomer unit selected from among (a) to (e) below in the resin component comprising the ethylene-α-olefin copolymer of the present invention, wherein the concentration of said monomer unit of ranges from $10^{-8}$~$10^{-3}$ mol per one gram of resin component:

[Monomer]

(a) a carbonic acid group or carbonic acid anhydride group-containing monomer;

(b) an epoxy group-containing monomer;

(c) a hydroxyl group-containing monomer;

(d) an amino group-containing monomer;

(e) a silane group-containing monomer;

In addition, the polar group-containing resin material of the present invention further comprises the other polyolefin (II) and rubber (IV), and preferably contains at least 5% by weight of the ethylene-α-olefin copolymer (I), no greater than 95% by weight of the other polyolefin (II), and no greater than 40% by weight of rubber (IV).

In addition, at least one of the ethylene-α-olefin copolymer (I), the other polyolefin (II) and rubber (IV) preferably comprises a resin or rubber containing at least one monomer unit selected from among the aforementioned (a) to (e) above.

In addition, the aforementioned other polyolefin (II) preferably comprises at least one compound selected from among an ethylene homopolymer or copolymer of ethylene and α-olefin (IIa) having a density of 0.86 to 0.97 g/cm$^3$; and an ethylene polymer (IIb) obtained by means of a high pressure radical polymerization.

The laminate according to the present invention comprises at least a layer formed from an aforementioned polar group-containing resin material, and a layer formed from a substrate.

In the case when the polar group-containing resin material according to the present invention is to be used as an adhesive resin material, it is preferable to use a modified ethylene-α-olefin copolymer to which a (a) carbonic acid group or carbonic acid anhydride group-containing monomer or (b) epoxy group-containing monomer has been grafted. In particular, use of a modified ethylene-α-olefin copolymer to which a (a) carbonic acid group or acid anhydride group-containing monomer has been grafted provides particularly favorable results.

In the following, the polar group-containing resin material and laminate according to the present invention will be described in greater detail.

The ethylene copolymer (I) and other polyolefin (II) used in the polar group-containing resin material according to the present invention may comprise the above described ethylene-α-olefin copolymer and other polyolefin, and are not in particular limited.

In addition, examples of the aforementioned rubber (IV) include ethylene-propylene type rubber, butadiene type rubber, ethylene-butene rubber, isobutylene rubber, isoprene type rubber, natural rubber, nitrile rubber, and the like. These rubber products may be used alone or as a mixture of two or more. Among the aforementioned, the ethylene-propylene type rubber and ethylene-butene rubber are preferred due to their favorable effects in improving the mechanical strength.

Examples of the ethylene-propylene type rubber include a random copolymer (EPR) comprising ethylene and propylene as essential components; and a random copolymer (EPDM) wherein a diene monomer is added as a third essential component (e.g., dicyclopentadiene, ethylidenenorbornene, etc.), and the like.

The butadiene type rubber refers to a copolymer possessing butadiene as an essential structural component. Examples of this butadiene type rubber include a styrene-butadiene block copolymer (SBS), and its hydrogenated or partially hydrogenated derivative styrene-butadiene-ethylene copolymer (SBES), 1,2-polybutadiene (1,2-PB), a maleic anhydride-butadiene-styrene copolymer, a modified butadiene rubber possessing a core-shell structure, and the like.

In the polar group-containing resin material according to the present invention, at least one compound among the ethylene copolymer (I), other polyolefin (II), and the aforementioned rubber (IV) comprises a resin or rubber containing at least one monomer unit selected from among the aforementioned (a) to (e) above. For example, it is possible to directly graft an aforementioned monomer onto at least one compound among the ethylene copolymer (I), other polyolefin (II), and the aforementioned rubber (IV); and/or also blend together either of the other polyolefin (II) and rubber (IV) containing an aforementioned monomer as a co-monomer.

The composition of the polar group-containing resin material according to the present invention comprises at least 5% by weight of the ethylene copolymer (I), no greater than 95% by weight of the other polyolefin (II), and no greater than 40% by weight of the rubber (IV). More preferably, the composition of the polar group-containing resin material according to the present invention comprises at least 10% by weight of the ethylene copolymer (I), no greater than 90% by weight of the other polyolefin (II), and no greater than 40% by weight of the rubber (IV).

A polar group-containing resin material according to the present invention comprising less than 5% by weight of the ethylene copolymer (I) results in an inability to achieve the aforementioned effects with respect to the mechanical properties, low-temperature heat sealing properties, transparency, thermal resistance, processability, adhesiveness, and the like. In addition, a rubber component exceeding 40% by weight results in a decrease in the mechanical strength, which is highly undesirable.

In addition, the concentration of the monomer unit in the resin material is in the range of $10^{-8}$ to $10^{-3}$ mol, and preferably $10^{-7}$ to $10^{-4}$ mol, per one gram of resin component. A concentration of the monomer unit less than $1 \times 10^{-8}$ mol results in an inadequate improvement of the adhesiveness, affinity, and chemical reactivity. On the other hand, a concentration of the monomer unit exceeding $1 \times 10^{-3}$ mol results in an inadequate heat stability, and is not economical as well.

An example of a method for introducing at least one monomer selected from among the aforementioned (a) to (e) into the polar group-containing resin material according to the present invention, includes a method in which a copolymer comprising a $C_{2-12}$ α-olefin and an aforementioned monomer is blended; and a method in which a $C_{2-12}$ α-olefin homopolymer or an alternative copolymer is modified by means grafting the aforementioned monomer, and then blended.

Examples of the Graft modification method include a melting method in which at least one monomer selected from among the aforementioned (a) to (e), and the ethylene copolymer (I), other polyolefin (II), or rubber (IV) are reacted within an extruder; or a solution method in which the aforementioned are reacted in solution.

Examples of the carbonic acid group or acid anhydride group-containing monomer (a) include α,β-unsaturated dicarbonic acids such as maleic acid, fumaric acid, citraconic acid, itaconic acid, and anhydrides thereof; unsaturated monocarbonic acids such as arcylic acid, methacrylic acid, furoic acid, crotonic acid, vinylacetic acid, pentenic acid, and the like.

Examples of the ester group-containing monomer (b) include methyl acrylate, methyl methacrylate, ethyl acrylate, ethyl methacrylate, butyl acrylate, butyl methacrylate, and the like. Among these compounds, methyl acrylate is preferred.

Examples of the hydroxyl group-containing monomer (c) include 2-hydroxyethyl (meth)acrylate, 2-hydroxypropyl (meth)acrylate, and the like.

Examples of the amino group-containing monomer (d) include 2-aminoethyl (meth)acrylate, dimethylaminoethyl (meth)acrylate, diethylaminoethyl (meth)acrylate, cyclohexylaminoethyl (meth)acrylate, and the like.

Examples of the silane group-containing monomer (e) include unsaturated silane compounds such as vinyl trimethoxysilane, vinyl triethoxysilane, vinyl triacetylsilane, vinyl trichlorosilane, and the like.

Among the aforementioned monomers, the carbonic acid group or carbonic acid anhydride group-containing monomers (a) of the α,β-unsaturated dicarbonic acids such as maleic acid, fumaric acid, citraconic acid, itaconic acid, and anhydrides thereof are preferred. Among these monomers, use of maleic anhydride is particularly preferred from the standpoint of its properties and affordability.

Examples of the radical initiator include organic peroxides, dihydro aromatic compounds, dicumyl compounds and the like.

Examples of the organic peroxide includes hydroperoxide, dicumrylperoxide, di-t-butylperoxide, t-butylcumrylperoxide, dialkyl(aryl)peroxide, diisopropylbenzenehydroperoxide, diproprionylperoxide, dioctanoylperoxide, benzoylperoxide, peroxysuccinic acid, peroxyketal, 2,5-dimethyl-2,5-di(t-butylperoxy)hexine, 2,5-dimethyl-2,5-di(t-butylperoxy)hexane, t-butyloxyacetone, t-butylperoxyisobutylate, and the like.

Examples of the dihydro aromatic compound includes dihydroquinoline and derivatives thereof, dihydrofuran, 1,2-dihydrobenzene, 1,2-dihydronaphthalene, 9,10-dihydrophenanthrene, and the like.

Examples of the dicumyl compound includes 2,3-dimethyl-2,3-diphenylbutane, 2,3-diethyl-2,3-diphenylbutane, 2,3-diethyl-2,3-di(p-methylphenyl)butane, 2,3-dimethyl-2,3-di(p-bromophenyl)butane, and the like. Among the aforementioned, in particular, use of 2,3-diethyl-2,3-diphenylbutane is preferred.

Concrete examples of preferred combinations of the polar group-containing resin material (including the random copolymer and graft copolymer) according to the present invention are described below.

<1> First preferred examples of the polar group-containing resin material include one type of polar group-containing resin material selected from the group consisting of (1) a polar group-containing ethylene copolymer (α); (2) a composition formed from an ethylene copolymer (I) and another polyolefin containing a polar group (β); (3) a composition formed from an ethylene copolymer (I) and a rubber containing a polar group (γ); and (4) a composition formed from a polar group-containing ethylene copolymer (α), another polyolefin containing a polar group (β), and a rubber containing a polar group (γ).

<2> Second preferred examples of the polar group-containing resin material include a polar group-containing resin material containing at least an ethylene copolymer (I), which is formed from at least one compound selected from among a polar group-containing ethylene copolymer (α), another polyolefin containing a polar group (β), and a rubber containing a polar group (γ); and at least one compound selected from among an ethylene copolymer (I), another polyolefin (II), and a rubber (IV).

<3> Third preferred examples of the polar group-containing resin material include a polar group-containing resin material containing at least an ethylene copolymer (I), which is formed from at least two compounds selected from among a polar group-containing ethylene copolymer (α), another polyolefin containing a polar group (β), and a rubber containing a polar group (γ); and at least one compound selected from among an ethylene copolymer (I), another polyolefin (II), and a rubber (IV).

Depending on the objective of use, it is possible to blend in an additive such as another thermoplastic resin, antioxidant, lubricant, pigment, UV absorber, nucleating agent, or the like into the polar group-containing resin material according to the present invention, so long as it does not adversely affect the properties of the polar group-containing resin material. In particular, an anti-oxidant is effective in suppressing the generation of burning and/or gelation.

Despite having a narrow molecular weight distribution, the ethylene copolymer (I) for use in the polar group-containing resin material according to the present invention possesses a relatively broad composition distribution, and thus the polar group-containing resin material according to the present invention has an excellent tensile strength and anti-shock properties, in addition to low temperature sealability and a high thermal resistance. Furthermore, the polar group-containing resin material according to the present invention exhibits an excellent adhesiveness, affinity, chemical reactivity, anti-static properties, and the like. The polar group-containing resin material formed in this manner may, for example, be used for an adhesive agent possessing an excellent adhesiveness to another substrate; compatibility agent for a engineering plastics; a resin modifying agent for modifying the printing, dyeing and coating properties of a resin; a coupling agent for improving the strength between a resin, filler or the like; or electrical material. In particular, the polar group-containing resin material according to the present invention may be used in adhesive layers in multi-layered films; chemically reactive films possessing excellent properties; anti-static films; and the like.

The laminate according to the present invention comprises a layer formed from the aforementioned the polar group-containing resin material, and a layer formed from a substrate.

Preferred examples of the aforementioned substrate include at least one material selected from the group consisting of polyolefins, ethylene-vinyl acetate copolymer saponification products, polyamides, polyesters, polyurethanes, polystyrenes, wood, fiber, metal foil, and the like.

The laminate according to the present invention comprises a laminated material possessing the properties of adhesiveness, affinity, chemical reactivity, and anti-static properties from the polar group-containing resin material; and an excellent processability, water resistance, chemical resistance, and flexibility from the polyolefin; or excellent gas-barrier properties from the ethylene-vinyl acetate copolymer saponification product, polyamide, polyester, metal foil, and the like; or an intrinsic hardness from the polystyrene and metal foil; or mechanical strength from wood and fabric.

Examples of the polyolefin used in the laminate according to the present invention include olefin homopolymers such as polyethylene, polypropylene, poly-1-butene, poly-4-methyl-1-pentene and the like; reciprocal copolymers such as ethylene, propylene, 1-butene, 4-methyl-1-pentene, 1-hexene, 1-octene, or the like; ethylene-vinyl ester copolymers such as a copolymer of ethylene and vinyl acetate; copolymers of ethylene and an unsaturated carbonic acid, unsaturated carbonic acid ester, or the like, such as an ethylene-methacrylic acid copolymer, ethylene-ethylacrylate copolymer, ethylene-ethylmethacrylate copolymer, and the like; and mixtures thereof.

Examples of the aforementioned polyamide include nylon 6, nylon 11, nylon 12, nylon 6-6, nylon 6-10, nylon 6-12, and the like. Examples of the aforementioned wood include veneer, plywood, ligneous fiber boards, particle boards, and the like. Examples of the aforementioned fiber include various fibers, woven fabric and nonwoven fabric made from carbon fiber and/or inorganic materials. Examples of the aforementioned metal foil include foils of aluminum, iron, zinc, copper and the like.

Among the aforementioned, in particular, a laminate comprising a layer formed from an ethylene-vinyl acetate copolymer saponification product, polyamide, polyester, or metal foil, exhibits superior gas-barrier properties, and is hence suitable as a food storage container, pharmaceutical storage container, packaging or the like. In addition these laminates exhibit very little degradation of their adhesive strength even at relatively high temperatures, and thus may also resist wear incurred from high temperatures such as during boiling for cooking and sterilization, in the outdoors, car interiors, and the like.

The actual form of the laminate according to the present invention is not particularly limited, and may include films, plates, tubes, foils, fabrics, bottles, containers, ejection molded products and the like.

The method for manufacturing the laminate of the present invention is not particularly limited, and may include a method in which other layers are laminated onto a pre-formed film or sheet by means of an extrusion lamination method, dry lamination method, sandwich lamination method, or the like; a co-extrusion processing method such as a multi-layer inflation method, multi-layer T-die method, or the like, in which a resin melted by means of an extruder is conjugated and formed into a multi-layered structure using a multi-layer die via the die head; or alternatively, a conventional processing method such as a multi-layer blow molding, ejection molding or the like.

In particular, due to the excellent processability of the polar group-containing resin material according to the present invention, the co-extrusion processing method is applicable as a method for manufacturing the laminate of the present invention, which comprises a layer formed from the polar group-containing resin material of the present invention, and a layer formed from an ethylene-vinyl acetate copolymer saponification product, polyamide, or polyester. The laminate formed in this manner exhibits heat sealability, anti-shock strength, water resistance, and chemical resistance from the polar group-containing resin material of the present invention, in addition to excellent gas-barrier properties from the ethylene-vinyl acetate copolymer saponification product, polyamide, or polyester. In addition, the lamination with metal foil is preferably performed by means of a lamination method.

A laminate of the present invention comprising an external layer formed from an ethylene-vinyl acetate copolymer saponification product or metal foil, and an inner layer formed from a polar group-containing resin material, results in the existence of properties of both the ethylene-vinyl acetate copolymer saponification product or metal foil and those of the polar group-containing resin material, and is thus particularly preferred. In addition, by means of forming another layer into this laminate, e.g., a layer made from a polyolefin on the inner side thereof, it is possible to obtain a laminate that is superior from the standpoint of affordability. Concrete examples of this laminated structure include an ethylene-vinyl acetate copolymer saponification product or metal foil layer (gas-barrier layer)/polar group-containing resin material layer; gas-barrier layer/polar group-containing resin material layer/polyolefin layer; polyolefin layer/polar group-containing resin material layer/gas-barrier layer/polar group-containing resin material/polyolefin layer, and the like.

As described in the aforementioned, according to the polar group-containing resin material of the present invention, an aforementioned specific monomer unit selected from (a) to (e) is included in the resin material comprising an ethylene copolymer (I) which satisfied the aforementioned specific conditions. As a result, the polar group-containing resin material of the present invention possesses an excellent adhesiveness, affinity, chemical reactivity, and anti-static properties, in addition to superior adhesiveness and affinity to other substrates which possess a superior mechanical properties, low temperature heat sealability, transparency, thermal resistance, and processability.

In addition, a polar group-containing resin material comprising a composition of at least 5% by weight of an ethylene copolymer (I), no greater than 95% by weight of another polyolefin (II), and no greater than 40% by weight of rubber (IV), wherein at least one component selected from aforementioned components (I), (II) and (IV) is a component containing at least one type of monomer unit selected from the aforementioned (a) to (e) above, results in an excellent adhesiveness, affinity, chemical reactivity, and anti-static properties, in addition to the properties held by the other polyolefin (II) and rubber (IV).

Furthermore, both an excellent processability and a superior mechanical strength result when the aforementioned other polyolefin (II) comprises at least one compound selected from the group consisting of an ethylene (co)polymer (IIa) possessing a density of 0.86 to 0.97 g/cm$^3$, and an ethylene copolymer (IIb) obtained by means of a high pressure radical polymerization.

EXAMPLES

In the following, the present invention will be explained in detail by means of examples. However, it should be noted that the present invention is not limited to these examples.
(Experimental Method)
[Density]

The measurement of the density was performed according to JIS K6760 as the standard.
[MFR]

The measurement of the MFR was performed according to JIS K6760 as the standard.
[Measurement of $T_{m1}$ by DSC]

After processing a sheet possessing a thickness of 0.2 mm by means of a heat press, an approximately 5 mg sample was stamped from the sheet as the test material. This test material was maintained at 230° C. for 10 minutes, followed by cooling to 0° C. at a rate of 2° C. per minute. Subsequently, while increasing the temperature once again of the test material to 170° C. at a rate of 10° C. per minute, differential scanning colorimetry (DSC) was performed, and the temperature of the peak of resulting the highest temperature carve was recorded as the maximum peak temperature ($T_{m1}$).
[Mw/Mn]

Using a GPC (model 150C, manufactured by Waters Corporation), the Mw and Mn of the test material was measured. ODCB was used as the solvent at a temperature of 135° C. A GMH$_{HR}$-H (S) manufactured by Toso Corporation was used as the column.
[TREF]

The test material was injected into a column maintained at 140° C., and the temperature was lowered to 25° C. at a rate of 4° C. per hour. After the polymer was deposited onto the glass beads, the temperature of the column was increased under the following conditions, and the polymer concentration of the eluted polymer at each temperature was detected using an infrared detector.

Solvent: ODCB, flow rate: 1 ml/min, rate of temperature increase: 50° C./hour, detector: infrared spectrometer (wavelength 2925 cm$^{-1}$), column: 0.8 cm$\phi$×12 cmL (filled with glass beads), test material concentration: 1 mg/ml.
[Melt Tension]

The melt tension is determined by means of measuring the stress at the time of drawing the melted polymer at a fixed rate using a strain gauge. The test material to be measured is granulated and formed into a pellet, and then measured using a MT measuring apparatus manufactured by Toyo Seiki Seisaku-Sho, Ltd. The orifice that was used had an opening diameter of 2.09 mm$\phi$ and length of 8 mm. The measuring conditions were a resin temperature of 190° C., extrusion speed of 20 mm/min, and a take-up speed of 15 m/min.

[Chlorine concentration]

The chlorine concentration is measured by means of a fluorescent X-ray method, and in the case when 10 ppm or greater of chlorine is detected, the detected value was determined as an analysis value. In the case when the chlorine is less than 10 ppm, the measurement is performed by means of a chlorine-sulfur analyzing device (model TOXZ-100, manufactured by Dia Instruments Co., Ltd.; and "ND" is shown in the case when the chlorine is 2 ppm or less, as this signifies that essentially no chlorine is contained therein.
(Evaluation of film properties)
[Film impact]

Measurement of the film impact was performed by means of using a film impact tester manufactured by Toyo Seiki Seisaku-Sho, Ltd.
[Haze (cloudiness)]

The measurement of haze was performed according to ASTM D 1003-61 as the standard.
[Clarity]

Measurement of the clarity was performed by means of shining light vertically onto the film and conducting the measurement using a transparency measuring device (model TM-1D, manufactured by Murakami Color Research Laboratory). The clarity was expressed as a proportional percent of the light rays passing through the film with respect to the incident light. The measurement of the clarity was performed with respect to only the blown film (lay-flat film).
[Low temperature heat sealability]

The test material was heat sealed under the conditions of a pressure of 2 kg/cm$^2$, seal bar width of 1 mm, and sealing time of one second using a heat sealing test apparatus (manufactured by Tester Sangyo, Co., Ltd.) at multiple temperature points. The sealing portion was then cut into strips of 15 mm in width, and a separation test was conducted on the sealing portion at a rate of 300 mm/minute using a tensile tester. The temperature at the separating strength of 500 g was calculated by interpolation from the separating strength at each of multiple temperature points, and the heat sealing temperature was expressed using said calculated temperature. Accordingly, lower temperature values reflected superior low temperature heat sealing properties.
[High temperature retort resistance]

The high temperature retort resistance was evaluated by manufacturing a container by means of heat sealing one end of a film; filling the interior of this container with distilled water; heat sealing the other end of the film; and then autoclaving for 20 minutes at predetermined temperatures (110° C., 121° C.). The presence of an opening, in addition to the cloudiness of the film were then evaluated by observation: ◎ indicates the absence of both an opening and film cloudiness; ○ indicates a small amount of cloudiness without an opening; Δ indicates a small amount of cloudiness with an opening; and X indicates severe cloudiness with an opening.

Examples 1 to 5
[Preparation of a solid catalyst]

Initially, 1000 ml of toluene purified under the presence of nitrogen, 22 g of tetraethoxy zirconium (Zr(OEt)$_4$) and 74 g of indene were added to a catalyst preparation device equipped with an electromagnetic induction stirrer. While maintaining the resultant mixture at 90° C., 100 g of tripropyl aluminum was then added in a dropwise manner over 10 minutes, and the mixture was allowed to react for two hours at the same temperature. After cooling the reaction mixture to 40° C., 3200 ml of a toluene solution of methyl aluminoxane (concentration 2.5 mmol/ml) was added thereto and stirred for 2 hours. Subsequently, 2000 g of silica (#952, surface area 300 m²/g, manufactured by W. R. Grace & Co.) which had been pre-baked for 5 hours at 450° C. was then added thereto, and after stirring at room temperature for 1 hour, the resultant mixture was dried under a nitrogen flow and reduced pressure at 40° C. to yield a solid catalyst possessing an excellent fluidity.

[Gas-phase polymerization]

Polymerization of ethylene and 1-hexene was performed using a continuous-type fluid bed, gas-phase polymerizing apparatus at a polymerization temperature of 80° C. and a total pressure of 20 kgf/cm²G. The various ethylene copolymers were then produced by means of providing a continuous supply of the aforementioned solid catalyst and also supplying the ethylene, 1-hexene and hydrogen to maintain a predetermined mol ratio. The properties of the resultant ethylene copolymers were measured using the aforementioned tests. These results are shown in Table 1.

[Cast film processing]

After granulating the resultant copolymer into a powder, a film comprising a thickness of 50 μm was formed using a T-die processing machine (extruder 65 φmm, 65 mm single-layer coat hanger die, 1 mm lip gap), under the conditions of a processing temperature of 230° C., extrusion amount of 40 kg/hr, take-up speed of 25 m/min, and a chilled roll temperature of 45° C. The resultant films were evaluated as described in the aforementioned. These results are shown in Table 1.

Comparative Example 5

The properties of a commercially available linear low density polyethylene (Brand name: Affinity HF 1030 manufactured by Dow Chemical, Ltd.) obtained by means of using a metallocene catalyst were measured, and a film was formed and evaluated in the same manner as in Example 1. These results are show in Table 3.

Comparative Example 6

The properties of a commercially available linear low density polyethylene (Brand name: Exact 3025 manufactured by Exxon Chemical, Ltd.) obtained by means of using a metallocene catalyst, were measured, and a film was formed and evaluated in the same manner as in Example 1. These results are show in Table 3.

Comparative Example 7

25 L of purified toluene were added to a nitrogen-substituted, 50 L pressure reactor equipped with a stirrer. Subsequently, 183 g of 1-butene was added, a mixed solution of bis (n-butylcyclopentane dienyl) zirconium chloride and methyl aluminoxane (MAO) (Al/Zr mol ratio=500) was then added thereto until the Zr concentration reached 0.33 mmol, and the temperature was raised to 80° C. Ethylene was then fed to achieve a pressure of 9 kg/cm²G, and polymerization was commenced. An ethylene copolymer

TABLE 1

|  |  | Examples | | | | |
| --- | --- | --- | --- | --- | --- | --- |
|  |  | 1 | 2 | 3 | 4 | 5 |
| Properties | Density (d) (g/cm³) | 0.926 | 0.925 | 0.930 | 0.936 | 0.934 |
|  | MFR (g/10 min) | 3.9 | 2.1 | 3.5 | 4.2 | 2.6 |
|  | Mw/Mn | 2.6 | 2.6 | 2.6 | 2.7 | 2.6 |
|  | TREF (peak number) | 1 | 1 | 1 | 1 | 1 |
|  | $T_{75}-T_{25}$ (° C.) | 17.7 | 13.2 | 12.4 | 8.0 | 7.8 |
|  | (−300 × d + 285) | 7.2 | 7.5 | 6.0 | 4.2 | 4.8 |
|  | (−670 × d + 644) | 23.6 | 24.3 | 20.9 | 16.9 | 18.2 |
|  | $T_{ml}$ (° C.) | 123 | 124 | 124 | 126 | 125 |
|  | (150 × d − 17) | 121.9 | 121.8 | 122.5 | 123.4 | 123.1 |
|  | Melt tension (g) | 0.5 | 0.8 | 0.6 | 0.4 | 0.8 |
|  | (logMT) | −0.30 | −0.10 | −0.22 | −0.40 | −0.10 |
|  | (−0.572 × logMFR + 0.3) | −0.04 | 0.12 | −0.01 | −0.06 | 0.06 |
|  | Chlorine concentration (ppm) | ND | ND | ND | ND | ND |
| Cast film | Film impact (kg-cm/mm) | 230 | 190 | 200 | 180 | 170 |
|  | Haze (%) | 5.5 | 7.8 | 7.9 | 7.8 | 8.0 |
|  | Heat sealing temperature (° C.) | 122 | 123 | 123 | 132 | 132 |
|  | High temperature retort resistance (110° C.) | ○ | ○ | ○ | ⊚ | ⊚ |
|  | High temperature retort resistance (121° C.) | × | × | Δ | ○ | ○ |

Comparative Example 1

Using a catalyst formed from titanium tetrachloride and thiethyl aluminum, ethylene and 1-hexene were copolymerized by means of the gas phase process to form a linear low density polyethylene. The properties of the linear low density polyethylene were measured, and a film was formed and evaluated in the same manner as in Example 1. These results are shown in Table 2.

Comparative Examples 2 to 4

Using a catalyst formed from titanium tetrachloride and diethyl aluminum chloride, ethylene and 4-methyl-1-pentene were copolymerized by means of solution polymerization to form a linear low density polyethylene. The properties of the linear low density polyethylene were measured, and a film was formed and evaluated in the same manner as in Example 1. These results are shown in Table 2.

was then obtained by means of continuously polymerizing ethylene while maintaining a total pressure of 9 kg/cm²G for one hours. The properties of the ethylene copolymer were measured, and a film was formed and evaluated in the same manner as in Example 1. These results are show in Table 3.

TABLE 2

|  |  | Comparative Examples | | | |
|---|---|---|---|---|---|
|  |  | 1 | 2 | 3 | 4 |
| Properties | Density (d) (g/cm$^3$) | 0.927 | 0.944 | 0.932 | 0.926 |
|  | MFR (g/10 min) | 2.0 | 32 | 2.0 | 2.1 |
|  | Mw/Mn | 4.5 | 3.2 | 2.7 | 2.7 |
|  | TREF (peak number) | 2 | 1 | 2 | 2 |
|  | $T_{75}$–$T_{25}$ (° C.) | 19.5 | 10.1 | 10.4 | 14.6 |
|  | (−300 × d + 285) | 6.9 | 1.8 | 5.4 | 7.2 |
|  | (−670 × d + 644) | 22.9 | 11.5 | 19.6 | 23.6 |
|  | $T_{ml}$ (° C.) | 125 | 128 | 125 | 124 |
|  | (150 × d − 17) | 122.1 | 124.6 | 122.8 | 121.9 |
|  | Melt tension (g) | 1.5 | Unmeasurable | 1 | 1 |
|  | (logMT) | 0.18 | — | 0 | 0 |
|  | (−0.572 × logMFR + 0.3) | 0.13 | — | 0.13 | 0.12 |
|  | Chlorine concentration (ppm) | 120 | 20 | 13 | 15 |
| Cast film | Film impact (kg-cm/mm) | 80 | — | 110 | 150 |
|  | Haze (%) | 20 | — | 8.1 | 5.8 |
|  | Heat sealing temperature (° C.) | 135 | 138 | 135 | 135 |
|  | High temperature retort resistance (110° C.) | ○ | Δ | Δ | Δ |
|  | High temperature retort resistance (121° C.) | × | × | × | × |

TABLE 3

|  |  | Comparative Examples | | |
|---|---|---|---|---|
|  |  | 5 | 6 | 7 |
| Properties | Density (d) (g/cm$^3$) | 0.935 | 0.911 | 0.918 |
|  | MFR (g/10 min) | 2.1 | 1.0 | 2.0 |
|  | Mw/Mn | 2.2 | 2.3 | 2.4 |
|  | TREF (peak number) | 1 | 1 | 2 |
|  | $T_{75}$–$T_{25}$ (° C.) | 3.0 | 6.4 | 19.0 |
|  | (−300 × d + 285) | 4.5 | 11.7 | 9.6 |
|  | (−670 × d + 644) | 17.6 | 33.6 | 28.9 |
|  | $T_{ml}$ (° C.) | 121 | 105 | 115.6 |
|  | (150 × d − 17) | 123.3 | 119.7 | 120.7 |
|  | Melt tension (g) | 2.1 | 1.6 | 1.2 |
|  | (logMT) | 0.32 | 0.20 | 0.08 |
|  | (−0.572 × logMFR + 0.3) | 0.12 | 0.18 | 0.25 |
|  | Chlorine concentration (ppm) | 15 | 15 | ND |
| Cast film | Film impact (kg-cm/mm) | 300 | — | — |
|  | Haze (%) | 4.0 | — | — |
|  | Heat sealing temperature (° C.) | 130 | — | — |
|  | High temperature retort resistance (110° C.) | Δ | × | Δ |
|  | High temperature retort resistance (121° C.) | × | × | × |

As seen from Examples 1 to 5, the ethylene copolymers of the present invention exhibit an excellent balance of properties in addition to containing no halogen. In contrast, the linear low density polyethylene of Comparative Example 1 comprises a high chlorine concentration, and an inferior film impact.

In addition, the linear low density polyethylene of Comparative Examples 2 to 4, despite having a relatively good film balance, exhibit an inferior thermal resistance in addition to showing deformation at the time of retort processing. Likewise, the linear low density polyethylene of Comparative Example 5 exhibits an inferior thermal resistance and similarly displays deformation at the time of retort processing.

Examples 6 to 10

[Blown film fabrication]

An ethylene copolymer, respectively produced by means of the gas-phase polymerization of Examples 1 to 5, and a commercially available low density polyethylene (Brand name: J-Rex LD F31N manufactured by Japan Polyolefins Co., Ltd.) obtained by means of a high pressure process, as the other polyolefin, were mixed according the blending ratios shown in Table 4, using a Henschel mixer for 5 minutes, then kneaded in a 40 mmφ extruder, and then pelletized to produce an ethylene-α-olefin copolymer composition.

Using the resultant ethylene-α-olefin copolymer composition, a film comprising a thickness of 30 μm was formed using a 50 mmφ LLDPE film-specific processing machine having a die with a diameter 100 mmφ and a 2 mm lip gap, under the condition of a blow ratio of 1.9, take-up speed of 20 m/min, and a processing temperature of 200° C. The resultant films were evaluated as described in the aforementioned. These results are shown in Table 4.

TABLE 4

|  |  | Examples | | | | |
|---|---|---|---|---|---|---|
|  |  | 6 | 7 | 8 | 9 | 10 |
| Ethylene copolymer | Blending ratio (% by weight) | 90 | 80 | 95 | 95 | 95 |
|  | Density (d) (g/cm$^3$) | 0.930 | 0.930 | 0.930 | 0.926 | 0.934 |
|  | MFR (g/10 min) | 3.8 | 3.8 | 3.8 | 3.9 | 2.6 |
|  | Mw/Mn | 2.6 | 2.6 | 2.6 | 2.6 | 2.6 |
|  | TREF (peak number) | 1 | 1 | 1 | 1 | 1 |
|  | $T_{75}$–$T_{25}$ (° C.) | 12.4 | 12.4 | 12.4 | 17.7 | 7.8 |
|  | (−300 × d + 285) | 6 | 6 | 6 | 7.2 | 4.8 |

TABLE 4-continued

|  |  | Examples | | | | |
| --- | --- | --- | --- | --- | --- | --- |
|  |  | 6 | 7 | 8 | 9 | 10 |
|  | (−670 × d + 644) | 20.9 | 20.9 | 20.9 | 23.6 | 18.2 |
|  | $T_{ml}$ (° C.) | 124 | 124 | 124 | 123 | 125 |
|  | (150 × d − 17) | 122.5 | 122.5 | 122.5 | 121.9 | 123.1 |
|  | Melt tension (g) | 0.5 | 0.5 | 0.5 | 0.5 | 0.8 |
|  | (logMT) | −0.30 | −0.30 | −0.30 | −0.30 | −0.10 |
|  | (−0.572 × logMFR + 0.3) | −0.03 | −0.03 | −0.03 | −0.04 | 0.06 |
|  | Chlorine concentration (ppm) | ND | ND | ND | ND | ND |
| Other polyolefin | Type | LDPE | LDPE | LDPE | LDPE | LDPE |
|  | Blending ratio (% by weight) | 10 | 20 | 5 | 5 | 5 |
|  | Density (g/cm³) | 0.924 | 0.924 | 0.924 | 0.924 | 0.924 |
|  | MFR (g/10 min) | 2.0 | 2.0 | 2.0 | 2.0 | 2.0 |
| Blown film | Haze (%) | 7.5 | 5.2 | 9.1 | 10.0 | 10.8 |
|  | Clarity (%) | 79 | 78 | 79 | 78 | 76 |
|  | Film impact (kg-cm/mm) | 165 | 160 | 170 | 200 | 160 |
|  | Heat sealing temperature (° C.) | 123 | 123 | 123 | 122 | 131 |
|  | High temperature retort resistance (110° C.) | ○ | ○ | ○ | ○ | ⊙ |
|  | High temperature retort resistance (121° C.) | Δ | Δ | Δ | × | ○ |

Example 11

Example 11 was conducted in the same manner as Example 6 with the exception of using a commercially available linear low density polyethylene (Brand name: J-Lex LL A807F, manufactured by Japan Polyolefins Co., Ltd.) obtained by means of using a Ziegler catalyst, as the other polyolefin. These results are shown in Table 5.

Examples 12 and 13

Examples 12 and 13 were conducted in the same manner as Example 6 with the exception of using a commercially available linear high density polyethylene (Brand name: J-Rex HD F5002M, manufactured by Japan Polyolefins Co., Ltd.) obtained by means of using a Ziegler catalyst, as the other polyolefin. These results are shown in Table 5.

Example 14

Example 14 was conducted in the same manner as Example 6 with the exception of using a commercially available random polypropylene (Brand name: J-Aromer, manufactured by Japan Polyolefins Co., Ltd.), as the other polyolefin. These results are shown in Table 5.

TABLE 5

|  |  | Examples | | | |
| --- | --- | --- | --- | --- | --- |
|  |  | 11 | 12 | 13 | 14 |
| Ethylene copolymer | Blending ratio (% by weight) | 70 | 70 | 30 | 95 |
|  | Density (d) (g/cm³) | 0.930 | 0.930 | 0.930 | 0.930 |
|  | MFR (g/10 min) | 3.8 | 3.8 | 3.8 | 3.8 |
|  | Mw/Mn | 2.6 | 2.6 | 2.6 | 2.6 |
|  | TREF (peak number) | 1 | 1 | 1 | 1 |
|  | $T_{75}-T_{25}$ (° C.) | 12.4 | 12.4 | 12.4 | 12.4 |
|  | (−300 × d + 285) | 6.0 | 6.0 | 6.0 | 6.0 |
|  | (−670 × d + 644) | 20.9 | 20.9 | 20.9 | 20.9 |
|  | $T_{ml}$ (° C.) | 124 | 124 | 124 | 124 |
|  | (150 × d − 17) | 122.5 | 122.5 | 122.5 | 122.5 |
|  | Melt tension (g) | 0.5 | 0.5 | 0.5 | 0.5 |
|  | (logMT) | −0.30 | −0.30 | −0.30 | −0.30 |
|  | (−0.572 × logMFR + 0.3) | −0.03 | −0.03 | −0.03 | −0.03 |
|  | Chlorine concentration (ppm) | ND | ND | ND | ND |
| Other polyolefin | Type | LLDPE | HDPE | HDPE | PP |
|  | Blending ratio (% by weight) | 30 | 30 | 70 | 5 |
|  | Density (g/cm³) | 0.925 | 0.952 | 0.952 | — |
|  | MFR (g/10 min) | 0.7 | 0.21 | 0.21 | 9.0 |
| Blown film | Haze (%) | 15.2 | 11.5 | 11.9 | 44.8 |
|  | Clarity (%) | 73 | 73 | 73 | 59 |
|  | Film impact (kg-cm/mm) | 205 | 350 | 250 | 190 |
|  | Heat sealing temperature (° C.) | 124 | 125 | 127 | 123 |
|  | High temperature retort resistance (110° C.) | ○ | ⊙ | ⊙ | ○ |
|  | High temperature retort resistance (121° C.) | Δ | ○ | ○ | Δ |

Comparative Examples 8 to 10

Comparative Examples 8 to 10 were conducted in the same manner as Examples 6 to 10 with the exception of using a commercially available linear low density polyethylene (Brand name: J-Rex LL A820F, manufactured by Japan Polyolefins Co., Ltd.) obtained by means of using a Ziegler catalyst, instead of the ethylene copolymer. These results are shown in Table 6. As seen from the Table, this resulted in an inferior film impact and low temperature heat sealability.

TABLE 6

|  |  | Comparative Examples | | |
|---|---|---|---|---|
|  |  | 8 | 9 | 10 |
| Ethylene copolymer | Type | LLDPE | LLDPE | LLDPE |
|  | Blending ratio (% by weight) | 90 | 80 | 95 |
|  | Density (d) (g/cm$^3$) | 0.929 | 0.929 | 0.929 |
|  | MFR (g/10 min) | 1.8 | 1.8 | 1.8 |
|  | Mw/Mn | 5.0 | 5.0 | 5.0 |
|  | TREF (peak number) | 2 | 2 | 2 |
|  | $T_{75}$–$T_{25}$ (° C.) | 17.8 | 17.8 | 17.8 |
|  | (–300 × d + 285) | 6.3 | 6.3 | 6.3 |
|  | (–670 × d + 644) | 21.6 | 21.6 | 21.6 |
|  | $T_{ml}$ (° C.) | 125 | 125 | 125 |
|  | (150 × d – 17) | 122.4 | 122.4 | 122.4 |
|  | Melt tension (g) | 1.7 | 1.7 | 1.7 |
|  | (logMT) | 0.23 | 0.23 | 0.23 |
|  | (–0.572 × logMFR + 0.3) | 0.15 | 0.15 | 0.15 |
|  | Chlorine concentration (ppm) | 120 | 120 | 120 |
| Other polyolefin | Type | LDPE | LDPE | LDPE |
|  | Blending ratio (% by weight) | 10 | 20 | 5 |
|  | Density (g/cm$^3$) | 0.924 | 0.924 | 0.924 |
|  | MFR (g/10 min) | 2.0 | 2.0 | 2.0 |
| Blown film | Haze (%) | 7.5 | 5.2 | 9.1 |
|  | Clarity (%) | 79 | 78 | 79 |
|  | Film impact (kg-cm/mm) | 165 | 160 | 170 |
|  | Heat sealing temperature (° C.) | 123 | 123 | 123 |
|  | High temperature retort resistance (110° C.) | ○ | ○ | ○ |
|  | High temperature retort resistance (121° C.) | Δ | Δ | Δ |

Comparative Example 11

Comparative Example 11 was conducted in the same manner as Example 6 with the exception of using a commercially available linear low density polyethylene (Brand name: J-Rex LL BF3350, manufactured by Japan Polyolefins Co., Ltd.) obtained by means of using a Ziegler catalyst, instead of the ethylene copolymer. These results are shown in Table 7. As seen from the Table, this resulted in an inferior film impact and low temperature heat sealability.

Comparative Example 12

Comparative Example 12 was conducted in the same manner as Example 6 with the exception of using a commercially available linear low density polyethylene (Brand name: Affinity HF1030, manufactured by Dow Chemicals, Ltd.) obtained by means of using a metallocene catalyst, instead of the ethylene copolymer. These results are shown in Table 7. As seen from the Table, this resulted in an inferior low temperature heat sealability and thermal resistance.

Comparative Example 13

Comparative Example 13 was conducted in the same manner as Example 11 with the exception of using a commercially available linear low density polyethylene (Brand name: J-Rex LL A820F, manufactured by Japan Polyolefins Co., Ltd.) obtained by means of using a Ziegler catalyst, instead of the ethylene copolymer. These results are shown in Table 7. As seen from the Table, this resulted in an inferior low temperature heat sealability.

Comparative Example 14

Comparative Example 14 was conducted in the same manner as Comparative Example 13 with the exception that the other polyolefin was omitted from blending. These results are shown in Table 7. As seen from the Table, this resulted in an inferior film impact and low temperature heat sealability.

TABLE 7

|  |  | Comparative Examples | | | |
|---|---|---|---|---|---|
|  |  | 11 | 12 | 13 | 14 |
| Ethylene copolymer | Type | LLDPE | LLDPE | LLDPE | LLDPE |
|  | Blending ratio (% by weight) | 95 | 95 | 70 | 100 |
|  | Density (d) (g/cm$^3$) | 0.922 | 0.935 | 0.929 | 0.929 |
|  | MFR (g/10 min) | 2.0 | 2.1 | 1.8 | 1.8 |
|  | Mw/Mn | 4.5 | 2.2 | 5.0 | 5.0 |
|  | TREF (peak number) | 2 | 1 | 2 | 2 |
|  | $T_{75}$–$T_{25}$ (° C.) | 19.5 | 3.0 | 17.8 | 17.8 |
|  | (–300 × d + 285) | 8.4 | 4.5 | 6.3 | 6.3 |
|  | (–670 × d + 644) | 26.3 | 17.6 | 21.6 | 21.6 |
|  | $T_{ml}$ (° C.) | 125 | 121 | 125 | 125 |
|  | (150 × d – 17) | 121.3 | 123.3 | 122.4 | 122.4 |
|  | Melt tension (g) | 1.9 | 2.1 | 1.7 | 1.7 |
|  | (logMT) | 0.28 | 0.32 | 0.23 | 0.23 |
|  | (–0.572 × logMFR + 0.3) | 0.13 | 0.12 | 0.15 | 0.15 |
|  | Chlorine concentration (ppm) | 120 | 15 | 120 | 120 |
| Other polyolefin | Type | LDPE | LDPE | LLDPE | — |
|  | Blending ratio (% by weight) | 5 | 5 | 30 | — |
|  | Density (g/cm$^3$) | 0.924 | 0.924 | 0.925 | — |
|  | MFR (g/10 min) | 2.0 | 2.0 | 0.7 | — |
| Blown film | Haze (%) | 10.0 | 10.8 | 18.8 | 18.0 |
|  | Clarity (%) | 78 | 76 | 76 | 75 |
|  | Film impact (kg-cm/mm) | 200 | 160 | 190 | 60 |
|  | Heat sealing temperature (° C.) | 122 | 131 | 135 | 135 |
|  | High temperature retort | ○ | ⊚ | ○ | ○ |

TABLE 7-continued

| | Comparative Examples | | | |
|---|---|---|---|---|
| | 11 | 12 | 13 | 14 |
| resistance (110° C.) | | | | |
| High temperature retort resistance (121° C.) | × | ○ | Δ | Δ |

Comparative Examples 15 and 16

Comparative Examples 15 and 16 were conducted in the same manner as Examples 12 and 13 with the exception of using a commercially available linear low density polyethylene (Brand name: J-Rex LL A820F, manufactured by Japan Polyolefins Co., Ltd.) obtained by means of using a Ziegler catalyst, instead of the ethylene copolymer, and changing the blending ratio. These results are shown in Table 8. As seen from the Table, this resulted in inferior optical characteristics (i.e., haze, clarity), film impact and low temperature heat sealability.

Comparative Example 17

Comparative Example 17 was conducted in the same manner as Example 14 with the exception of using a commercially available linear low density polyethylene (Brand name: J-Rex LL A820F, manufactured by Japan Polyolefins Co., Ltd.) obtained by means of using a Ziegler catalyst, instead of the ethylene copolymer, and changing the blending ratio. These results are shown in Table 8. As seen from the Table, this resulted in an inferior film impact and low temperature heat sealability.

TABLE 8

| | | Comparative Examples | | |
|---|---|---|---|---|
| | | 15 | 16 | 17 |
| Ethylene copolymer | Type | LLDPE | LLDPE | LLDPE |
| | Blending ratio (% by weight) | 60 | 30 | 95 |
| | Density (d) (g/cm³) | 0.929 | 0.929 | 0.929 |
| | MFR (g/10 min) | 1.8 | 1.8 | 1.8 |
| | Mw/Mn | 5.0 | 5.0 | 5.0 |
| | TREF (peak number) | 2 | 2 | 2 |
| | $T_{75}$–$T_{25}$ (° C.) | 17.8 | 17.8 | 17.8 |
| | (–300 × d + 285) | 6.3 | 6.3 | 6.3 |
| | (–670 × d + 644) | 21.6 | 21.6 | 21.6 |
| | $T_{ml}$ (° C.) | 125 | 125 | 125 |
| | (150 × d – 17) | 122.4 | 122.4 | 122.4 |
| | Melt tension (g) | 1.7 | 1.7 | 1.7 |
| | (logMT) | 0.23 | 0.23 | 0.23 |
| | (–0.572 × logMFR + 0.3) | 0.15 | 0.15 | 0.15 |
| | Chlorine concentration (ppm) | 120 | 120 | 120 |
| Other polyolefin | Type | HDPE | HDPE | PP |
| | Blending ratio (% by weight) | 40 | 70 | 5 |
| | Density (g/cm³) | 0.952 | 0.952 | — |
| | MFR (g/10 min) | 0.21 | 0.21 | 9.0 |
| Blown film | Haze (%) | 25.3 | 38.0 | 20.5 |
| | Clarity (%) | 45 | 20 | 82 |
| | Film impact (kg-cm/mm) | 30 | 30 | 60 |
| | Heat sealing temperature (° C.) | 138 | 140 | 135 |
| | High temperature retort resistance (110° C.) | ◎ | ◎ | ○ |
| | High temperature retort resistance (121° C.) | ○ | ○ | Δ |

Example 15 and Comparative Example 18

A film was formed by means of a T-die cast method using the ethylene copolymer of Example 2 (density 0.925 g/cm³, MFR 2.1 g/10 minutes). Subsequently, the aforementioned film was dry laminated under the following conditions to form a laminated sealant film. In addition, for the sake of comparison, a laminated sealant film was formed in a similar manner using a commercially available linear low density polyethylene (density 0.925 g/cm³, MFR 2.0 g/10 minutes) obtained by means of using a Ziegler catalyst.

[T-die film formation conditions]

Screw diameter: 30 mmφ

T-die: surface length 300 mm

Screw Revolution amount: 50 rpm

Lip gap: 1.2 mm

Take-up speed: 6.1~6.3 m/min

Processing temperature: 210~240° C.

Film thickness: 50 μm

Chilled roll temperature: 40° C.

Corona discharge treatment: approx. 45 dyne/cm

[Dry lamination conditions]

Substrate: biaxially-oriented nylon film (thickness 15 μm)

Lamination device: Test Coater MGC-180 manufactured by Labo Co, Ltd.

Anchor coat: Polyester 308A/B (blending ratio 1/1) manufactured by Toyo Morton, Ltd.

Pasting surface: Corona discharge treated surface

Aging: following lamination 2 days at 40° C.

[Evaluation method]

A bag was formed from aforementioned laminate, wherein the sealant surface of the laminate is the inner surface of the bag. Subsequently, this bag was filled with distilled water, heat-sealed and then evaluated using a thermal resistance test at a predetermined temperature (Boil test: 20 bags). These results are shown in Table 9.

TABLE 9

|  | Example 15 | | Comparative Example 18 | |
|---|---|---|---|---|
| Boiling condition | Evaluation | Observation | Evaluation | Observation |
| Boiling water at 100° C., for 30 min | ◎ | No change | ◎ | No change |
| Retort at 110° C., for 30 min | ○ | All bags with no abnormality; water with favorable clarity | Δ | 9 bags with abnormality; water with some milky suspension |
| Retort at 120° C., for 30 min | Δ | 8 bags with abnormality; water with milky suspension | × | All bags burst; water with thick milky suspension |

As seen from the Table, the laminates formed by using the ethylene copolymer of the present invention displayed a high heat sealing strength and little transference to the inner contents.

(Test method for the release member)

[Neck-in (NI)]

The test material was coated onto a substrate after setting the processing conditions of the extrusion device to a film thickness of 30 μm, and a take-up speed of 60 m/min. The difference (mm) between the width of the web (W) and the die width ($W_0$) was then measured.

$$NI = W_0 - W.$$

[Draw down (DD)]

The rotation speed of the extrusion device was set to 30 rpm, and while gradually increasing the take-up speed, the maximum take-up speed at which the web did not crack was measured.

[Glossiness after heating (%)]

A4-sized test sheets were cut from the laminated test sample, exposed inside an oven to temperatures of 130° C., 135° C., 140° C., 145° C., 150° C., 155° C. and 160° C. for 30 seconds at each respective temperature, and then removed. The glossiness was measured after returning the sample to room temperature. A glossiness of at least 50% was considered good.

(Preparation of the ethylene copolymer of the present invention)

Using the catalyst prepared in Example 1, gas-phase polymerization was performed in the same manner as in Example 1 to yield an ethylene copolymer (I-1, I-2, I-3). The characteristics of these ethylene copolymers are shown in Table 10. In addition, the following compounds were used as the other polyolefin resins of the Comparative Examples. Their characteristics are shown in Table 11.

MLL: linear low density polyethylene obtained by means of using a metallocene catalyst ZLL: linear low density polyethylene obtained by means of using a Ziegler catalyst HD: high density polyethylene obtained by means of using a Ziegler catalyst LDPE: low density polyethylene obtained by means of a high pressure radical polymerization

TABLE 10

| Test sample | I-1 | I-2 | I-3 |
|---|---|---|---|
| Density (d) (g/cm³) | 0.925 | 0.932 | 0.943 |
| MFR (g/10 min) | 15 | 17 | 20 |
| Mw/Mn | 2.6 | 2.6 | 2.9 |
| TREF (peak number) | 1 | 1 | 1 |
| $T_{75}-T_{25}$ (° C.) | 20.8 | 16.0 | 5.7 |
| (−300 × d + 285) | 7.5 | 5.4 | 2.1 |
| (−670 × d + 644) | 24.3 | 20.0 | 12.2 |
| $T_{ml}$ (° C.) | 123 | 125.4 | 128.2 |
| (150 × d −17) | 121.8 | 122.8 | 124.5 |
| Melt tension (g) | 0.3≦ | 0.3≦ | 0.3≦ |
| Chlorine concentration (ppm) | ND | ND | ND |

TABLE 11

| Test samples | IIa-1 | IIa-2 | I-4 | IIb-1 | IIb-2 |
|---|---|---|---|---|---|
| Catalyst | ZLL | HD | MLL | LDPE | LDPE |
| Density (d) (g/cm³) | 0.923 | 0.948 | 0.912 | 0.922 | 0.918 |
| MFR (g/10 min) | 20 | 9 | 10 | 7 | 7 |
| Mw/Mn | 4.6 | 5.3 | 2.4 | — | — |
| TREF (peak number) | 2 | 2 | 2 | — | — |
| $T_{75}-T_{25}$ (° C.) | 21.5 | 6.1 | 9.6 | — | — |
| (−300 × d + 285) | 8.1 | 0.6 | 11.4 | — | — |
| (−670 × d + 644) | 25.6 | 8.8 | 33.0 | — | — |
| $T_{ml}$ (° C.) | 124.1 | 128.2 | 106 | — | — |
| (150 × d − 17) | 121.5 | 125.2 | 119.8 | — | — |
| Melt tension (g) | 0.3≦ | 0.3≦ | 0.3≦ | — | — |
| Chlorine concentration (ppm) | 130 | 130 | ND | — | — |

Example 16

0.09 parts by weight of an anti-oxidant and 0.1 parts by weight of calcium stearate were added to 100 parts by weight of a resin composition formed from 70% by weight of an ethylene-1-hexane copolymer (I-1) according to the present invention and 30% by weight of a low density polyethylene obtained by means of a high pressure radical polymerization, and the contents were uniformly mixed for approximately 30 seconds. The mixture was then kneaded using a φ 50 mm twin-screw extruder rotated in the same direction and pelleted to yield a resin composition.

Using an extrusion laminator (90 mmφ, die width: 800 mm, manufactured by Modern Machinery Co., Ltd.), the aforementioned resin composition was coated onto wood-free paper to form a thickness of 30 μm at a resin temperature of 315° C. to yield a release member. The neck-in, draw down and glossiness after heating at this time were then measured. These results are shown in Table 12. The adhesiveness to the paper substrate was excellent, and the paper surface was well filled. In addition, the glossiness after heating was excellent, even at a temperature considered to far exceed the melting point of the resin composition.

Example 17

A release member was formed and evaluated in the same manner as in Example 16 with the exception of using an ethylene copolymer (I-2) instead of the ethylene-1-hexene copolymer (I-1) according to the present invention. These results are shown in Table 12.

Example 18

A release member was formed and evaluated in the same manner as in Example 16 with the exception of using an ethylene-1-hexene copolymer (I-3) according to the present invention and a low-density polyethylene (IIb-2) obtained by means of a high pressure radical polymerization. These results are shown in Table 12.

Example 19

A release member was formed and evaluated in the same manner as in Example 16 with the exception of using an ethylene-1-hexene copolymer (I-3) according to the present invention and a low density polyethylene (IIb-1) obtained by means of a high pressure radical polymerization. These results are shown in Table 12.

Example 20

A release member was formed and evaluated in the same manner as in Example 19 with the exception of substituting kraft paper for the woodfree paper used as the substrate for Example 19. These results are shown in Table 12.

TABLE 12

| | Examples | | | | |
|---|---|---|---|---|---|
| Test sample | 16 | 17 | 18 | 19 | 20 |
| I-1 | 70 | | | | |
| I-2 | | 70 | | | |
| I-3 | | | 70 | 70 | 70 |
| IIa-1 | | | | | |
| IIa-2 | | | | | |
| I-4 | | | | | |
| IIb-1 | 30 | 30 | | 30 | 30 |
| IIb-2 | | | 30 | | |
| Substrate | Woodfree paper | Woodfree paper | Woodfree paper | Woodfree paper | Kraft paper |
| Laminating moldability | | | | | |
| NI: Neck-in (20 μm, 100 m) | 77 | 79 | 80 | 82 | 78 |
| DD (75 rpm) | >250 | >250 | 210 | >250 | >250 |
| Glossiness after heating (%) (exposed for 30 sec) | | | | | |
| 130° C. | 79.6 | 82.5 | 88.5 | 94.5 | 92.3 |
| 135° C. | 75.4 | 79.6 | 76.3 | 82.2 | 80.1 |
| 140° C. | 69.5 | 71.2 | 70.0 | 75.5 | 73.2 |
| 145° C. | 56.7 | 58.5 | 57.3 | 61.0 | 59.5 |
| 150° C. | 48.2 | 47.5 | 51.2 | 53.2 | 53.0 |
| 155° C. | 32.5 | 33.5 | 35.5 | 47.8 | 43.3 |
| 160° C. | 31.5 | 29.8 | 25.5 | 28.8 | 31.2 |

When less than 50%, the appearance deteriorates.

Comparative Example 19

A release member was formed and evaluated in the same manner as in Example 16 with the exception of using 70% by weight of a linear low density polyethylene obtained by means of using a Ziegler catalyst (IIa-1) instead of the ethylene-1-hexene copolymer (I-1) according to the present invention, and 30% by weight of a low-density polyethylene (IIb-1) obtained by means of a high pressure radical polymerization. These results are shown in Table 13.

Comparative Example 20

A release member was formed and evaluated in the same manner as in Comparative Example 19 with the exception of using a high density polyethylene (IIa-2) instead of the linear low density polyethylene (IIa-1) used in Example 19, and a low density polyethylene (IIb-2) obtained by means of a high pressure radical polymerization. These results are shown in Table 13.

Comparative Example 21

A release member was formed and evaluated in the same manner as in Comparative Example 19 with the exception of using a high density polyethylene (IIa-2) instead of the linear low density polyethylene (IIa-1) used in Example 19. These results are shown in Table 13.

Comparative Example 22

25 L of purified toluene were added to a 50 L pressure reactor equipped with a stirrer and substituted with nitrogen. Subsequently, 183 g of 1-butene was added thereto followed by the addition of a mixture (Al/Zr mol ratio=500) comprising bis(n-butylcyclopentadienyl) zirconium chloride and methyl aluminoxane [MAO] to achieve a Zr concentration of 0.33 mmol. After the mixture was heated to 80° C., ethylene was fed thereto until a pressure of 9 kg/cm$^2$G was reached, at which time the polymerization was commenced. The ethylene was continuously polymerized for one hour while maintaining a total pressure of 9 kg/cm$^2$G to form an ethylene copolymer (I-4). The characteristics of the ethylene copolymer (I-4) are shown in Table 11. A release member was formed and evaluated in the same manner as in Example 19 using a resin composition comprising 70% by weight of this ethylene copolymer (I-4) and 30% by weight of a low density polyethylene (IIb-2) obtained by means of a high pressure radical polymerization. These results are shown in Table 13.

TABLE 13

| | Comparative Examples | | | |
|---|---|---|---|---|
| Test sample | 19 | 20 | 21 | 22 |
| I-1 | | | | |
| I-2 | | | | |
| I-3 | | | | |
| II-1 | 70 | | | |
| IIa-2 | | 70 | 70 | |
| I-4 | | | | 70 |
| IIb-1 | 30 | | 30 | |
| IIb-2 | | 30 | | 30 |
| Substrate | Woodfree paper | Woodfree paper | Woodfree paper | Woodfree paper |
| Laminating moldability | | | | |
| NI: Neck-in (20 μm, 100 m) | 78 | 83 | 97 | 69 |
| DD (75 rpm) | >250 | >250 | 230 | 230 |
| Glossiness after heating (%) (exposed for 30 sec) | | | | |
| 130° C. | 52.5 | 79.9 | 83.2 | 78.8 |
| 135° C. | 24.5 | 78.2 | 78.3 | 76.5 |
| 140° C. | 22.5 | 48.5 | 59.6 | 65.2 |
| 145° C. | — | 29.8 | 43.2 | 49.9 |
| 150° C. | — | — | 23.5 | 43.1 |
| 155° C. | — | — | — | — |
| 160° C. | — | — | — | — |

When less than 50%, the appearance deteriorates.

(Examples of a medical container)
[Ethylene copolymers of the present invention]
Ethylene copolymers (I) of the present invention were formed according to the same method described in Example 1 to yield the ethylene copolymers (PE1, PE2, PE3) shown below. The characteristics of these ethylene copolymers are shown in Table 14.

TABLE 14

| Test sample | PE1 | PE2 | PE3 |
|---|---|---|---|
| Density (d) (g/cm$^3$) | 0.930 | 0.935 | 0.940 |
| MFR (g/10 min) | 3.5 | 3.5 | 3.5 |
| Mw/Mn | 2.6 | 2.7 | 2.7 |
| TREF (peak number) | 1 | 1 | 1 |
| $T_{75}$–$T_{25}$ (° C.) | 12.4 | 8.0 | 5.2 |
| (–300 × d + 285) | 7.5 | 5.4 | 3.0 |
| (–670 × d + 644) | 24.3 | 20.0 | 14.2 |
| $T_{ml}$(° C.) | 124 | 126 | 128 |
| (150 × d –17) | 122.5 | 123.4 | 124 |
| Melt tension (g) | 0.3≦ | 0.3≦ | 0.6 |
| Chlorine concentration (ppm) | ND | ND | ND |

[Other resins used]

PE4: 25 L of purified toluene were added to a 50 L pressure reactor equipped with a stirrer and substituted with nitrogen. Subsequently, 183 g of 1-butene was added thereto followed by the addition of a mixture (Al/Zr mol ratio=500) comprising bis(n-butylcyclopentadienyl) zirconium chloride and methyl aluminoxane [MAO] to achieve a Zr concentration of 0.33 mmol. After the mixture was heated to 80° C., ethylene was fed thereto until a pressure of 9 kg/cm$^2$G was reached, at which time the polymerization was commenced. The ethylene was continuously polymerized for one hour while maintaining a total pressure of 9 kg/cm$^2$G to form an ethylene copolymer (PE4): The density of the ethylene copolymer (PE4) was 0.905 g/cm$^3$, and the MFR was 3.5 g/10 min.

PE5: A commercially available LLDPE obtained by means of using a Ziegler catalyst (density: 0.920 g/cm$^3$; MFR: 3.5 g/10 min)

PE6: A commercially available HDPE obtained by means of using a Ziegler catalyst (density: 0.950 g/cm$^3$; MFR: 4.0 g/10 min)

PE7: A commercially available MDPE obtained by means of using a Ziegler catalyst (density: 0.935 g/cm$^3$; MFR: 3.5 g/10 min)

PE8: Produced by means of blending 40% by weight of the HDPE of PE6 with the LLDPE of PE5 to form a density of 0.932 g/cm$^3$.

PE9: A commercially available low density polyethylene obtained by means of a high pressure radical polymerization. (density: 0.928 g/cm$^3$; MFR: 1.2 g/10 min)

Examples 21 to 25 and Comparative Examples 23 to 27

Using the aforementioned resins, 3-layered co-extrusion films comprising the structures shown in Table 15 were prepared and formed into bags. After undergoing retort processing at 150° C. for 30 minutes, the film characteristics thereof were evaluated. These results are shown in Table 16.

TABLE 15

| | Total thickness (μm) | Inner layer | | Intermediate layer | | Outer layer | |
|---|---|---|---|---|---|---|---|
| | | Resin | Thickness (μm) | Resin | Thickness (μm) | Resin | Thickness (μm) |
| Example 21 | 250 | PE2 | 25 | PE4 | 200 | PE2 | 25 |
| Example 22 | 250 | PE2 | 10 | PE4 | 230 | PE2 | 10 |
| Example 23 | 250 | PE3 | 25 | PE4 | 200 | PE3 | 25 |
| Example 24 | 250 | PE3 | 10 | PE4 | 230 | PE3 | 10 |
| Example 25 | 250 | PE1 | 25 | PE4 | 200 | PE1 | 25 |
| Comparative Example 23 | 250 | PE5 | 25 | PE4 | 200 | PE5 | 25 |
| Comparative Example 24 | 250 | PE7 | 25 | PE4 | 200 | PE7 | 25 |
| Comparative Example 25 | 250 | PE8 | 25 | PE4 | 200 | PE8 | 25 |
| Comparative Example 26 | 250 | PE6 | 25 | PE4 | 200 | PE6 | 25 |
| Comparative Example 27 | 250 | PE2 | 25 | PE4 | 200 | PE9 | 25 |

TABLE 16

| | Heat sealing strength (g/10 mm width) | Clarity (haze %) | Elasticity (kg/cm$^2$) | Appearance (observation) |
|---|---|---|---|---|
| Example 21 | 4100 | 9.8 | 1320 | ○ |
| Example 22 | 3800 | 8.1 | 1180 | ○ |
| Example 23 | 3900 | 10.2 | 1440 | ○ |
| Example 24 | 3600 | 9.3 | 1230 | ○ |
| Example 25 | 4200 | 8.2 | 1090 | ○ |
| Comparative Example 23 | 2800 | 25.1 | 1250 | Δ |
| Comparative Example 24 | 2600 | 21.2 | 1460 | ○ |
| Comparative Example 25 | 2700 | 23.4 | 1650 | ○ |
| Comparative Example 26 | 2300 | 28.1 | 1830 | ○ |
| Comparative Example 27 | — | 45.1 | — | X (surface melted) |

As seen from Table 16, compared with Comparative Examples 23 to 27, Examples 21 to 25 displayed a superior clarity (haze) and heat sealing strength following retort processing (115° C., 30 minutes).

(Electrical properties of the electrical insulating material)
[Measurement of the volume resistivity]

Figure 2B:
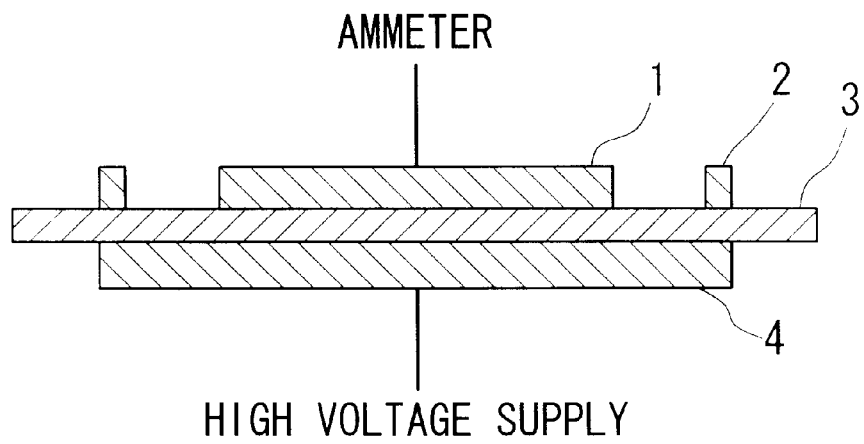
FIG. 2B shows a side cross-sectional view.

The electrode system shown in FIG. 2 was used to measure the volume resistivity. This electrode system for measuring the volume resistivity comprises a disc-shaped main electrode 1 and a ring-shaped guard electrode 2 surrounding the main electrode 1 in a concentric circle, provided on the surface of the plate-shaped test sample 3; and a disc-shaped high voltage electrode 4 provided on the undersurface of test sample 3. The electrode material was made of a stainless steel plate, the surface of the electrode material which lies in contact with the test sample 3 has been polished by means of a buffing machine to a mirror-like appearance.

The measurement was performed at room temperature (20° C.) and at 90° C. under a nitrogen atmosphere. In addition, the aforementioned measurement was performed after positioning the test sample in the electrode system, and short-circuiting the test sample between the main electrode 1 and high voltage electrode 4 for 5 minutes to remove the electric charge imparted to the surface of the test sample 3. The 90° C. measurement was performed by means of short-circuiting the test sample for 7 minutes such that the test sample reached a uniform temperature of 90° C.

The applied voltage consisted of a direct current of 3300 V applied by means of a battery. A vibrating reed ammeter (TR8411 manufactured by Advantest Corporation) was used as the measuring apparatus. A pipe cable was used as the cable linking the measuring apparatus and the electrodes, by means of which external noise was removed. According to this measuring system, it was possible to measure up to $3 \times 10^{17}$ Ω at room temperature, and $3 \times 10^{16}$ Ω at 90° C. in a stable manner. The thickness of the test sample was approximately 0.3 mm, and the thickness of each test sample was measured to two decimal places. The polar electrode surface area was 19.6 cm$^2$. From studying the current-time properties, it takes approximately 10 minutes after voltage application for the electric current reductions caused by the absorption current to dissipate such that the electric current can be stably measured. As a result, the electric current value 10 minutes after voltage application was measured; however, in cases when the electric current did not stabilize after 10 minutes, an additional five minutes were allowed for current stabilization and measurement. Those measurements which did not stabilize within this additional five minutes were thrown out. The volume resistivity was then calculated based on the measured value of the electric current. The measurements were conducted 10 times, and the average value thereof was used as data.

[Electrical activation energy]

The electrical activation energy (U) was calculated by means of the Arrhenius' equation below based on the electric current value obtained at the time of measuring the volume resistivity.

$$I \propto \exp(-U/kT)$$

(wherein I represents the electric current, k is the Boltzmann's constant, and T is the absolute temperature).

(Electric wire and cable properties)
[Electric wire covering properties]

After covering the electrical insulating material onto a copper wire, the surface of the electric wire was evaluated by observation. The electric wire covering properties were determined with an X indicating wire surfaces containing obvious defects or wire that were not fit for processing, and an ○ indicating surfaces which showed no obvious defects.

[Cable manufacturability]

During the processing of the cable insulating layer, the cable manufacturability was determined using an X to indicate those samples that were not fit for processing due to increases in the extrusion pressure and/or inclination of thickness, and an ○ to indicate cables showing excellent manufacturability without the appearance of defects in the interface of insulating layer and semi-conducting layer, and inclination of thickness.

[Water-treeing measurement]

Figure 3:
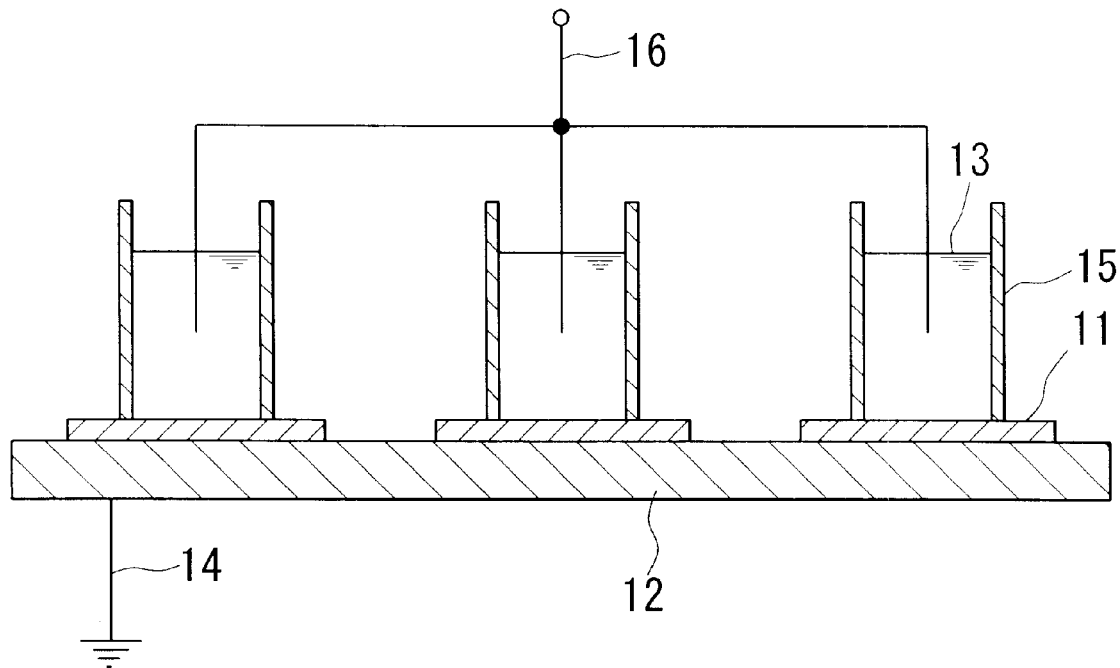
FIG. 3 is a diagram showing a side cross-sectional view of the measuring equipment for water-treeing.

Using the apparatus shown in FIG. 3, the water-treeing was measured at room temperature over 30 days with the application of 10 kV and 10 kHz of voltage. After the completion of voltage application, with regard to the generation and/or development of water-treeing, the samples were dyed and viewed under a microscope. The water-treeing properties were determined by means of indicating samples which displayed generation and/or development of water-treeing with an X, and representing samples in which water-treeing did not develop with an ○. The apparatus for measuring the water-treeing shown in FIG. 3 comprises a semiconductor board 12 provided on the lower side of the test sample 11 for water-treeing measurement; a container 15 filled with water 13, which is provided on the upper side of the test sample 11 for water-treeing measurement; an earth electrode 14 installed in the aforementioned semiconductor board 12; and an application electrode 16 which lies in contact with the water 13 in container 15. In addition, the bottom portion of container 15 comprises the test sample 11.

Examples 26 to 30

According to the polymerization method of Example 1, various ethylene-1-hexene copolymers were formed (PE11 to 15). The characteristics of each ethylene copolymer were then measured using the tests described above. These results are shown in Table 17.

[Preparation of a test sample for measuring the volume resistivity]

The ethylene copolymer was first molded into a sheet comprising a thickness of 0.3 mm by means of hot-press processing. This sheet was subsequently placed in between aluminum sheets, pre-heated for 5 minutes at 140° C., pressurized for 5 minutes at 100 kg/cm$^2$ and 140° C., and then cooled from 140° C. to 30° C. over 5 minutes under pressure to prepare a sample for measuring the volume resistivity. The volume resistivity was then measured for each sample, and these results are shown in Table 17.

[Manufacture of an electric wire]

A 0.9 mmφ copper wire was covered by the ethylene copolymer to form an electric wire. The covering properties of the electric wire were then evaluated, and these results are shown in Table 17 (covering conditions: die diameter 2.5 mm; nipple diameter 0.95 mm; die nipple clearance 5.3 mm; finished external diameter 2.45 mm; take-up speed 100 m/min).

[Manufacture of an electric cable]

Figure 4:
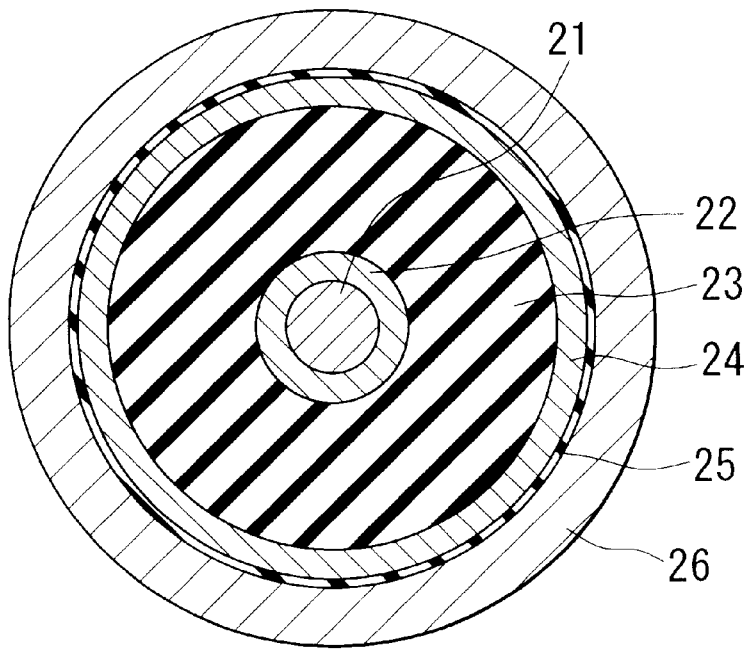
FIG. 4 is a diagram showing a cross-sectional view of an example of an electric cable of the present invention.

The ethylene copolymer was used as an insulating material to form an electric cable shown in FIG. 4. The manufacturability of the electric cable was then evaluated. These results are shown in Table 17. The electric cable shown in FIG. 4 comprises, in order from the inner side, a conducting member 21 formed from an aggregate wire of conductive metal; an internal semi-conductive layer 22; an insulating layer 23 formed from an ethylene copolymer; an external semi-conductive layer 24; aluminum foil 25; and a protective material 26 (a polyolefin containing an inorganic flame retardant), which are shaped into a concentric circle.

TABLE 17

|  | Examples | | | | |
| --- | --- | --- | --- | --- | --- |
|  | 26 | 27 | 28 | 29 | 30 |
| Ethylene copolymer | PE11 | PE12 | PE13 | PE14 | PE15 |
| Density d (g/cm$^3$) | 0.926 | 0.925 | 0.930 | 0.936 | 0.934 |
| MFR (g/10 min) | 3.9 | 2.1 | 3.5 | 4.2 | 2.6 |
| Mw/Mn | 2.6 | 2.6 | 2.6 | 2.7 | 2.6 |
| TREF (peak number) | 1 | 1 | 1 | 1 | 1 |
| $T_{75}$–$T_{25}$ (° C.) | 17.7 | 13.2 | 12.4 | 8.0 | 7.8 |
| (−300 × d + 285) | 7.2 | 7.5 | 6.0 | 4.2 | 4.8 |
| (−670 × d + 644) | 23.6 | 24.3 | 20.9 | 16.9 | 18.2 |
| $T_{ml}$ (° C.) | 123 | 124 | 124 | 126 | 125 |
| (150 × d − 17) | 121.9 | 121.8 | 122.5 | 123.4 | 123.1 |
| Melt tension (g) | 0.5 | 0.8 | 0.6 | 0.4 | 0.8 |
| (logMT) | −0.30 | −0.10 | −0.22 | −0.40 | −0.10 |
| (−0.572 × logMFR + 0.3) | −0.04 | 0.12 | −0.01 | −0.06 | 0.06 |
| Chlorine concentration (ppm) | ND | ND | ND | ND | ND |
| Volume resistivity (Ωcm) at room temperature | 2.8 × 10$^{18}$ | 2.6 × 10$^{18}$ | 3.5 × 10$^{18}$ | 4.0 × 10$^{18}$ | 3.5 × 10$^{18}$ |
| Volume resistivity (Ωcm) at 90° C. | 4.0 × 10$^{17}$ | 4.1 × 10$^{17}$ | 5.6 × 10$^{17}$ | 6.0 × 10$^{17}$ | 6.0 × 10$^{17}$ |
| Electrical activation energy (eV) | 0.25 | 0.24 | 0.24 | 0.25 | 0.23 |
| Wire covering properties | ○ | ○ | ○ | ○ | ○ |
| Cable manufacturability | ○ | ○ | ○ | ○ | ○ |
| Resistance to water-treeing | ○ | ○ | ○ | ○ | ○ |

Comparative Examples 28 to 34

The ethylene (co)polymers (PE16 to 22) used in the Comparative Examples are as shown below. The characteristics of each of these (co)polymers are shown in Tables 18 and 19.

PE16: Ethylene and 1-hexene were polymerized according to a gas-phase process using a catalyst formed from titanium tetrachloride and triethyl aluminum to yield a linear low density polyethylene.

PE17: Ethylene and 4-methyl-1-pentene were polymerized according to a solution polymerization using a catalyst formed from titanium tetrachloride and diethyl aluminum chloride to yield a linear low density polyethylene.

PE18: Ethylene and 4-methyl-1-pentene were polymerized according to a solution polymerization using a catalyst formed from titanium tetrachloride and diethyl aluminum chloride to yield a linear low density polyethylene.

PE19: Ethylene and 4-methyl-1-pentene were polymerized according to a solution polymerization using a catalyst formed from titanium tetrachloride and diethyl aluminum chloride to yield a linear low density polyethylene.

PE20: A commercially available linear low density polyethylene (Brand name: Affinity HF1030, manufactured by Dow Chemicals, Ltd.) obtained by means of using a metallocene catalyst.

PE21: A commercially available linear low density polyethylene (Brand name: AM1720, manufactured by Japan Polyolefins Co., Ltd.).

PE22: A commercially available low density polyethylene (Brand name: W3300, manufactured by Japan Polyolefins Co., Ltd.) obtained by means of a high pressure process.

These ethylene (copolymers (PE16 to 22) were then used to form test samples for measuring volume resistivity, in addition to electric wires and cables, in the same manner as Examples 26–30. The properties of each were evaluated as described above, and these results are shown in Tables 18 and 19.

TABLE 18

|  | Comparative Examples | | | |
| --- | --- | --- | --- | --- |
|  | 28 | 29 | 30 | 31 |
| Ethylene (co)polymer | PE16 | PE17 | PE18 | PE19 |
| Density d (g/cm$^3$) | 0.927 | 0.944 | 0.932 | 0.926 |
| MFR (g/10 min) | 2.0 | 32 | 2.0 | 2.1 |
| Mw/Mn | 4.5 | 3.2 | 2.7 | 2.7 |
| TREF (peak number) | 2 | 1 | 2 | 2 |
| $T_{75}$–$T_{25}$ (° C.) | 19.5 | 10.1 | 10.4 | 14.6 |
| (−300 × d + 285) | 6.9 | 1.8 | 5.4 | 7.2 |
| (−670 × d + 644) | 22.9 | 11.5 | 19.6 | 23.6 |
| $T_{ml}$(° C.) | 125 | 128 | 125 | 124 |
| (150 × d − 17) | 122.1 | 124.6 | 122.8 | 121.9 |
| Melt tension (g) | 1.5 | Unmeasuarable | 1 | 1 |
| (logMT) | 0.18 | — | 0 | 0 |
| (−0.572 × logMFR + 0.3) | 0.13 | — | 0.13 | 0.12 |
| Chlorine concentration (ppm) | 120 | 20 | 13 | 15 |

TABLE 18-continued

| | Comparative Examples | | | |
|---|---|---|---|---|
| | 28 | 29 | 30 | 31 |
| Volume resistivity (Ωcm) at room temperature | $1.0 \times 10^{18}$ | $2.8 \times 10^{18}$ | $1.0 \times 10^{18}$ | $1.2 \times 10^{18}$ |
| Volume resistivity (Ωcm) at 90° C. | $8.0 \times 10^{14}$ | $2.0 \times 10^{15}$ | $6.0 \times 10^{15}$ | $7.8 \times 10^{14}$ |
| Electrical activation energy (eV) | 0.93 | 0.94 | 0.67 | 0.95 |
| Wire covering properties | X | X | X | X |
| Cable manufacturability | X | X | X | X |
| Resistance to water-treeing | X | X | X | X |

TABLE 19

| | Comparative Examples | | |
|---|---|---|---|
| | 32 | 33 | 34 |
| Ethylene (co)polymer | PE20 | PE21 | PE22 |
| Density d (g/cm³) | 0.935 | 0.935 | 0.925 |
| MFR (g/10 min) | 2.1 | 0.8 | 3.3 |
| Mw/Mn | 2.2 | 7.7 | 3.9 |
| TREF (peak number) | 1 | — | — |
| $T_{75}$–$T_{25}$ (° C.) | 3.0 | — | — |
| (−300 × d + 285) | 4.5 | — | — |
| (−670 × d + 644) | 17.6 | — | — |
| $T_{ml}$ (° C.) | 121 | — | — |
| (150 × d − 17) | 123.3 | — | — |
| Melt tension (g) | 2.1 | — | — |
| (logMT) | 0.32 | — | — |
| (−0.572 × logMFR + 0.3) | 0.20 | — | — |
| Chlorine concentration (ppm) | 15 | — | — |
| Volume resistivity (Ωcm) at room temperature | $4.0 \times 10^{17}$ | $1.6 \times 10^{18}$ | $2.0 \times 10^{17}$ |
| Volume resistivity (Ωcm) at 90° C. | $5.0 \times 10^{14}$ | $9.2 \times 10^{15}$ | $2.0 \times 10^{15}$ |
| Electrical activation energy (eV) | 0.87 | 0.67 | 0.60 |
| Wire covering properties | X | ◯ | ◯ |
| Cable manufacturability | X | ◯ | ◯ |
| Resistance to water-treeing | X | X | X |

Example 31

An ethylene copolymer (PE14) and an ethylene (co)polymer (PE18) as the other polyolefin were prepared and kneaded for 5 minutes at 160° C. in the blending ratio shown in Table 20 using a plast mill to yield a resin composition for the electric insulating material. The characteristics of this composition were then evaluated. These results are shown in Table 20.

Example 32

Example 32 was conducted in the same manner as Example 31 with the exception of using an ethylene (co)polymer (PE21) as the other polyolefin resin. The results are shown in Table 20.

Example 33

Example 33 was conducted in the same manner as Example 31 with the exception of using an ethylene (co)polymer (PE22) as the other polyolefin resin. The results are shown in Table 20.

TABLE 20

| | Examples | | |
|---|---|---|---|
| | 31 | 32 | 33 |
| Ethylene copolymer | PE14 | PE14 | PE14 |
| Blending ratio (% by weight) | 10 | 10 | 10 |
| Other polyolefin | PE18 | PE21 | PE22 |
| Blending ratio (% by weight) | 90 | 90 | 90 |
| Volume resistivity (Ωcm) at room temperature | $3.6 \times 10^{18}$ | $2.6 \times 10^{18}$ | $3.2 \times 10^{18}$ |
| Volume resistivity (Ωcm) at 90° C. | $1.0 \times 10^{17}$ | $4.1 \times 10^{17}$ | $1.0 \times 10^{17}$ |
| Wire covering properties | ◯ | ◯ | ◯ |
| Cable manufacturability | ◯ | ◯ | ◯ |
| Resistance to water-treeing | ◯ | ◯ | ◯ |

As seen from Examples 26 to 30, the electrical insulating material of the present invention has a high volume resistivity, and a low temperature dependence. In addition, the electric wire covering properties, and cable manufacturability are excellent, while also possessing a superior resistance to water-treeing.

As seen from Examples 31 to 30, even when blending the other polyolefin, the electrical insulating material of the present invention displays a high volume resistivity, in addition to excellent electric wire covering properties and cable manufacturability, while also possessing a superior resistance to water-treeing.

On the ocher hand, the electrical insulating material of Comparative Examples 28 to 31 have a high chlorine concentration in addition to a high temperature dependence of the volume resistivity, such that the volume resistivity at 90° C. is low. In addition, the electric wire covering properties, cable manufacturability, and resistance to water-treeing were inferior. Furthermore, the electrical insulating material of Comparative Example 32 also displayed an inferior volume resistivity, electric wire covering properties, cable manufacturability, and resistance to water-treeing.

The electrical insulating material of Comparative Examples 33 and 34 displayed favorable electric wire covering properties and cable manufacturability, but possessed an inferior volume resistivity and resistance to water-treeing.

(Polar group-containing resin material)
(Blown film processing)

The resultant polar group-containing resin material was then granulated, and formed into a film possessing a thickness of 30 μm, using a 50 mmφ LLDPE film-specific processing apparatus equipped with a die having a 2mm lip gap, under the processing conditions of a blow ratio of 1.9, a take-up speed of 20 m/min, and a processing temperature of 200° C.

(Evaluation of the blown film properties)
[Film impact]

A film impact tester manufactured by Toyo Seiki Seisaku-Sho Co., Ltd, was used to test the film impact. The surface of ball head for impact was set to ½"φ.

[Low temperature heat sealability]

Using a heat sealing tester manufactured by Tester Sangyo Co., Ltd. the samples were heat sealed at appropriately selected temperature points under the conditions of a pressure of 2 kg/cm², seal bar width of 1 mm, and sealing time of 1 second. The sealed portions were then cut into strips of 15 mm width, and then placed into a tensile fester at 300 mm/min to perform the separating test on the sealed portion. The temperature at the separating strength of 500 g was calculated by interpolation from the separating strength of each temperature points, and the heat sealing temperature was expressed using said calculated temperature. Lower temperatures indicate superior tow temperature heat sealability.

[High temperature retort resistance]

The high temperature retort resistance was evaluated by manufacturing a container by means of heat sealing one end of a film; filling the interior of this container with distilled water; heat sealing the other end of the film; and then autoclaving for 20 minutes at predetermined temperatures (110° C., 121° C). The presence of an opening, in addition to the cloudiness of the film were then evaluated by observation: ◎ indicates the absence of both an opening and film cloudiness; ○ indicates a small amount of cloudiness without an opening; Δ indicates a small amount of cloudiness with an opening; and X indicates severe cloudiness with an opening.

(Measurement of adhesive strength)
[Adhesive strength to the ethylene-vinyl acetate copolymer saponification product]

Using a small scale multi-layer T-die, a laminate was formed possessing a thickness of 100 μm wherein the thickness ratio of the inner layer/adhesive layer/intermediate layer/adhesive layer/outer layer was 35/10/10/10/35, under the conditions of a processing temperature of 230° C., a chilled roll temperature of 25° C., and a take-up speed of 11 m/min. Here, the inner and outer layers comprised an LLDPE (density 0.935 g/cm³, MFR 2 g/10 min); the adhesive layers comprised an adhesive resin material; and the intermediate layer comprised an ethylene-vinyl acetate copolymer saponification product (Brand name: F101B, manufactured by Kuraray Co., Ltd.).

The resultant laminate was then cut into strips having a width of 15 mm, and the adhesive and intermediate layers were separated by 90° at 300 mm/min. The load at this time was then measured.

[Adhesive strength to nylon 6]

Using a small scale multi-layer T-die, a laminate was formed possessing a thickness of 60 μm, wherein the thickness ratio of the inner layer/adhesive layer/outer Layer was 30/15/15, under the conditions of a processing temperature of 230° C., a chilled roll temperature of 25° C., and a take-up speed of 13 m/min. Here, the inner layer comprised an LLDPE (density 0.935 g/cm³, MFR 2 g/10 min); the adhesive layers comprised an adhesive resin material; and the outer layer comprised nylon 6 (Brand name: CM1021, manufactured by Toray).

The resultant laminate was then cut into strips having a width of 15 mm, and the adhesive and outer layers were separated by 90° at 300 mm/min. The load at this time was then measured.

(Preparation of an ethylene copolymer of the present invention)

According to the polymerization method of Example 1, various ethylene copolymers were formed (PE31 to 33). The characteristics of each ethylene copolymer were then measured using the tests described above. These results are shown in Table 21.

TABLE 21

| Ethylene copolymer | PE31 | PE32 | PE33 |
|---|---|---|---|
| Density d (g/cm³) | 0.926 | 0.930 | 0.934 |
| MFR (g/10 min) | 3.9 | 3.5 | 2.6 |
| Mw/Mn | 2.6 | 2.6 | 2.6 |
| TREF (peak number) | 1 | 1 | 1 |
| $T_{75}-T_{25}$(° C.) | 17.7 | 12.4 | 7.8 |
| (−300 × d + 285) | 7.2 | 6.0 | 4.8 |
| (−670 × d + 644) | 23.6 | 20.9 | 18.2 |
| $T_{ml}$(° C.) | 123 | 124 | 125 |
| (150 × d −17) | 121.9 | 122.5 | 123.1 |
| Melt tension (g) | 0.5 | 0.6 | 0.8 |
| (logMT) | −0.30 | −0.22 | −0.10 |
| (−0.572 × logMFR + 0.3) | −0.04 | −0.01 | 0.06 |
| Chlorine concentration (ppm) | ND | ND | ND |

(Other ethylene copolymers)

In addition, the characteristics of the ethylene copolymers obtained under the conditions described below are shown in Table 22.

Ethylene copolymer (PE34)

Ethylene and 1-hexene were polymerized according to a gas-phase process using a catalyst formed from titanium tetrachloride and triethyl aluminum to yield a linear low density polyethylene (LLDPE).

Ethylene copolymer (PE35)

Ethylene and 4-methyl-1-pentene were polymerized according to a solution polymerization using a catalyst formed from titanium tetrachloride and diethyl aluminum chloride to yield a linear low density polyethylene (LLDPE).

Ethylene copolymer (PE36)

A commercially available linear low density polyethylene (Brand name: Affinity HF1030, manufactured by Dow Chemical Japan, Ltd.) produced by means of using a metallocene catalyst was used.

TABLE 22

| Ethylene copolymer | PE34 | PE35 | PE36 |
|---|---|---|---|
| Density d(g/cm³) | 0.927 | 0.932 | 0.935 |
| MFR (g/10 min) | 2.0 | 2.0 | 2.1 |
| Mw/Mn | 4.5 | 2.7 | 2.2 |
| TREF (peak number) | 2 | 2 | 1 |
| $T_{75}-T_{25}$(° C.) | 19.5 | 10.4 | 3.0 |
| (−300 × d + 285) | 6.9 | 5.4 | 4.5 |
| (−670 × d + 644) | 22.9 | 19.6 | 17.6 |
| $T_{ml}$(° C.) | 125 | 125 | 121 |
| (150 × d −17) | 122.1 | 122.8 | 123.3 |
| Melt tension (g) | 1.5 | 1.0 | 2.1 |
| (logMT) | 0.18 | 0 | 0.32 |
| (−0.572 × logMFR + 0.3) | 0.13 | 0.13 | 0.20 |
| Chlorine concentration (ppm) | 120 | 13 | 15 |

Example 34

0.005 parts by weight of 2,5-dimethyl-2,5-di-(t-butylperoxy)hexane were added to 100 parts by weight of an ethylene copolymer (PE31), and dry-blended for 2 minutes using a Henschel mixer. 0.1 parts by weight of maleic anhydride were added thereto, and further dry blended for 2 minutes. The resultant mixture was then melted and kneaded using a single-screw 50 mm kneading machine set to a temperature of 250° C. to yield a polar group-containing ethylene copolymer. The amount of maleic anhydride added to the resultant polar group-containing ethylene copolymer was 6×10⁻⁶ mol per 1 gram of resin; and the MFR of the polar group-containing ethylene copolymer was 3.2 g/10 minutes.

Using this polar group-containing ethylene copolymer, blown film processing was performed, and the resultant film properties were evaluated. These results are shown in Table 23.

Comparative Example 35

A polar group-containing ethylene copolymer was obtained in the same manner as in Example 34, modified only by the use of an ethylene copolymer (PE34). The amount of maleic anhydride added to the resultant polar group-containing ethylene copolymer was $6\times10^{-6}$ mol per 1 gram of resin; and the MFR of the polar group-containing ethylene copolymer was 1.4 g/10 minutes. Using this polar group-containing ethylene copolymer, blown film processing was performed, and the resultant film properties were evaluated. These results are shown in Table 23.

The resultant polar group-containing ethylene copolymer modified by means of grafting an ethylene copolymer (PF34) having two peaks in an elution temperature-eluted amount curve according to TREF method, possessed both an inferior film impact and low temperature heat sealability when compared with the film of Example 34.

Comparative Example 36

A polar group-containing ethylene copolymer was obtained in the same manner as in . Example 35, modified only by the use of an ethylene copolymer (PE35). The amount of methyl acrylate added to the resultant polar group-containing ethylene copolymer was $9\times10^{-6}$ mol per 1 gram of resin; and the MFR of the polar group-containing ethylene copolymer was 1.5 g/10 minutes. Using this polar group-containing ethylene copolymer, blown film processing was performed in the same manner as in Example 35, and the resultant film properties were evaluated. These results are shown in Table 24.

The resultant polar group-containing ethylene copolymer modified by means of grafting an ethylene copolymer (PE35) having two peaks in an elution temperature-eluted amount curve according to TREF method, possessed both an inferior film impact, low temperature heat sealability, and retort resistance when compared with the film of Example 35.

TABLE 23

| | | Example 34 | Comparative Example 35 |
|---|---|---|---|
| Polar-group containing ethylene copolymer | Raw material resin | PE31 | PE34 |
| | Polar-group containing monomer | Maleic anhydride | |
| | Amount of monomer (phr)* | 0.1 | |
| | Radical initiator | 2,5-dimethyl-2,5-di-(t-butylperoxy)hexane | |
| | Amount of radical initiator (phr)* | 0.005 | |
| | Monomer content (mol/1 g of resin) | $6 \times 10^{-6}$ | $6 \times 10^{-6}$ |
| | MFR (g/10 min) | 3.2 | 1.4 |
| Film properties | Film impact (kg-cm/mm) | 240 | 90 |
| | Heat sealing temperature (° C.) | 122 | 135 |
| | High temperature retort resistance (110° C.) | ○ | ○ |
| | High temperature retort resistance (121° C.) | X | X |
| | Chlorine concentration (ppm) | ND | 120 |

(a) Amount of monomer or radical initiator relative to raw material resin.

Example 35

0.005 parts by weight of 2,5-dimethyl-2,5-di-(t-butylperoxy) hexane were added to 100 parts by weight of an ethylene copolymer (PE32), and dry-blended for 2 minutes using a Henschel mixer. 0.1 parts by weight of methyl acrylate were added thereto, and further dry blended for 2 minutes. The resultant mixture was then melted and kneaded using a single-screw 50 mm kneading machine set to a temperature of 250° C. to yield a polar group-containing ethylene copolymer. The amount of methyl acrylate added to

TABLE 24

| | | Example 35 | Comparative Example 36 |
|---|---|---|---|
| Polar-group containing ethylene copolymer | Raw material resin | PE32 | PE35 |
| | Polar-group containing monomer | Methyl acrylate | |
| | Amount of monomer (phr)* | 0.1 | |
| | Radical initiator | 2,5-dimethyl-2,5-di-(t-butylperoxy)hexane | |
| | Amount of radical initiator (phr)* | 0.005 | |
| | Monomer content (mol/1 g of resin) | $9 \times 10^{-6}$ | $9 \times 10^{-6}$ |
| | MFR (g/10 min) | 2.9 | 1.5 |
| Film properties | Film impact (kg-cm/mm) | 220 | 120 |
| | Heat sealing temperature (° C.) | 122 | 135 |
| | High temperature retort resistance (110° C.) | ○ | Δ |

TABLE 24-continued

|  | Example 35 | Comparative Example 36 |
|---|---|---|
| High temperature retort resistance (121° C.) | X | X |
| Chlorine concentration (ppm) | ND | 10 |

*Amount of monomer or radical initiator relative to raw material resin.

Example 36

0.005 parts by weight of 2,5-dimethyl-2,5-di-(t-butylperoxy) hexane were added to 100 parts by weight of an ethylene copolymer (PE33), and dry-blended for 2 minutes using a Henschel mixer. 0.1 parts by weight of 2-hydroxyethylacrylate were added thereto, and further dry-blended for 2 minutes. The resultant mixture was then melted and kneaded using a single-screw 50 mm kneading machine set to a temperature of 250° C. to yield a polar group-containing ethylene copolymer. The amount of 2-hydroxyethylacrylate added to the resultant polar group-containing ethylene copolymer was $8 \times 10^{-6}$ mol per 1 gram of resin; and the MFR of the polar group-containing ethylene copolymer was 3.0 g/10 minutes.

Using this polar group-containing ethylene copolymer, blown film processing was performed, and the resultant film properties were evaluated These results are shown in Table 25.

Comparative Example 37

A polar group-containing ethylene copolymer was obtained in the same manner as in Example 36, modified only by the use of an ethylene copolymer (PE36). The amount of 2-hydroxyethylacrylate added to the resultant polar group-containing ethylene copolymer was $8 \times 10^{-6}$ mol per 1 gram of resin; and the MFR of the polar group-containing ethylene copolymer was 1.6 g/10 minutes. Using this polar group-containing ethylene copolymer, blown film processing was performed in the same manner as in Example 36, and the resultant film properties were evaluated. These results are shown in Table 25.

The resultant polar group-containing ethylene copolymer modified by means of grafting an ethylene copolymer (PE36) wherein the relationship between $T_{75}$–$T_{25}$ and density d did not satisfy the aforementioned relationships shown by the formulae a and b, possessed both an inferior film impact, and low temperature heat sealability when compared with the film of Example 36.

TABLE 25

|  |  | Example 36 | Comparative Example 37 |
|---|---|---|---|
| Polar-group containing ethylene copolymer | Raw material resin | PE33 | PE36 |
|  | Polar-group containing monomer | 2-hydroxyethyl acrylate | |
|  | Amount of monomer (phr)* | 0.1 | |
|  | Radical initiator | 2,5-dimethyl-2,5-di-(t-butylperoxy) hexane | |
|  | Amount of radical initiator (phr)* | 0.005 | |
|  | Monomer content (mol/1 g of resin) | $8 \times 10^{-6}$ | $8 \times 10^{-6}$ |
|  | MFR (g/10 min) | 3.0 | 1.6 |
| Film properties | Film impact (kgcm/mm) | 215 | 120 |
|  | Heat sealing temperature (° C.) | 123 | 135 |
|  | High temperature retort resistance (110° C.) | ○ | ○ |
|  | High temperature retort resistance (121° C.) | X | X |
|  | Chlorine concentration (ppm) | ND | 10 |

*Amount of monomer or radical initiator relative to raw material resin.

Example 37

0.005 parts by weight of 2,5-dimethyl-2,5-di-(t-butylperoxy) hexane were added to 100 parts by weight of an ethylene copolymer (PE34), and dry-blended for 2 minutes using a Henschel mixer. 0.1 parts by weight of maleic anhydride were added thereto as a monomer, and further dry-blended for 2 minutes. The resultant mixture was then melted and kneaded using a single-screw 50 mm kneading machine set to a temperature of 250° C. to yield another polyolefin containing a polar group. The amount of maleic anhydride added to the resultant other polyolefin containing a polar group was $6 \times 10^{-6}$ mol per 1 gram of resin; and the MFR of the other polyolefin containing a polar group was 0.6 g/10 minutes.

35% by weight of the resultant other polyolefin containing a polar group, 40% by weight of the ethylene copolymer (PE31), and 25% by weight of the EPR rubber (containing 22% by weight of propylene, and possessing an MFR of 2.1 g/10 minutes) were kneaded together to yield a polar group-containing resin material. Using this polar group-containing resin material, the adhesive strength was measured according to the aforementioned method for measuring adhesive strength. These results ate shown in Table 26.

Comparative Example 38

35% by weight of the other polyolefin containing a polar group obtained in Example 37, 40% by weight of an ethylene copolymer (PE34), and 25% by weight of a EPR rubber (containing 22% by weight of propylene, and possessing an MFR of 2.1 g/10 minutes) were kneaded to yield a polar group-containing resin material. Using this polar group-containing resin material, the adhesive strength was measured according to the aforementioned method for measuring adhesive strength. These results are shown in Table 26.

The resultant polar group-containing resin material, which did not contain a ethylene copolymer (I) satisfying the above specific conditions, possessed an inferior adhesive strength when compared with the resin material of Example 37.

of resin; and the MFR of the other polyolefin containing a polar group was 1.2 g/10 minutes.

60% by weight of this polar group-containing composition, and 40% by weight of an ethylene copolymer (PE31) were subsequently kneaded to yield a polar group-containing resin material. Using this polar group-containing resin material, the adhesive strength was measured according to the aforementioned method for measuring adhesive strength. These results are shown in Table 27.

TABLE 26

|  |  | Example 37 | Comparative Example 38 |
|---|---|---|---|
| Other polyolefin containing a polar group | Raw material resin | PF34 | |
| | Polar-group containing monomer | Maleic anhydride | |
| | Amount of monomer (phr)* | 0.1 | |
| | Radical initiator | 2,5-dimethyl-2,5-di-(t-butylperoxy) hexane | |
| | Amount of radical initiator (phr)* | 0.005 | |
| | Monomer content (mol/1 g of resin) | $6 \times 10^{-6}$ | |
| | MFR (g/10 min) | 0.6 | |
| | Blending amount (% by weight) | 35 | |
| Ethylene copolymer | Type | PE31 | PE34 |
| | Blending amount (% by weight) | 40 | 40 |
| Rubber | Blending amount (% by weight) | 25 | |
| Polar-group containing resin material | Adhesive strength to ethylene-vinyl acetate copolymer saponification compound (g) | 820 | 780 |

*Amount of monomer or radical initiator relative to raw material resin.

Example 38

0.02 parts by weight of 2,5-dimethyl-2,5-di-(t-butylperoxy)hexine were added to a mixture comprising 70 parts by weight of an ethylene copolymer (PE34) and 30 parts by weight of a EPR rubber (containing 22% by weight of propylene, and possessing an MFR of 2.1 g/10 minutes), and dry-blended for 2 minutes using a Henschel mixer. 0.25 parts by weight of maleic anhydride were added thereto as a monomer, and further dry-blended for 2 minutes. The resultant mixture was then melted and kneaded using a single-screw 50 mm kneading machine set to a temperature of 230° C. to yield a polar group-containing composition. The amount of maleic anhydride added to the resultant polar group-containing composition was $2 \times 10^{-5}$ mol per 1 gram Comparative Example 39

40% by weight of the polar group-containing composition obtained in Example 38, and 40% by weight of an ethylene copolymer (PF34) were kneaded together to yield a polar group-containing resin material. Using this polar group-containing resin material, the adhesive strength was measured according to the aforementioned method for measuring adhesive strength. These results are shown in Table 27.

The resultant polar group-containing resin material, which did not contain a ethylene copolymer (I) satisfying the above specific conditions, possessed an inferior adhesive strength when compared with the resin material of Example 38.

TABLE 27

|  |  | Example 38 | Comparative Example 39 |
|---|---|---|---|
| Polar-group containing composition | Raw material resin | PE34: 70% by weight EPR rubber: 30% by weight | |
| | Polar-group containing monomer | Maleic anhydride | |
| | Amount of monomer (phr)* | 0.25 | |
| | Radical initiator | 2,5-dimethyl-2,5-di-(t-butylperoxy) hexine | |
| | Amount of radical initiator (phr)* | 0.02 | |
| | Monomer content (mol/1 g of resin) | $2 \times 10^{-5}$ | |
| | MFR (g/10 min) | 1.2 | |
| | Blending amount (% by weight) | 60 | |
| Ethylene copolymer | Type | PE31 | PE34 |
| | Blending amount (% by weight) | 40 | 40 |
| Polar-group containing resin material | Adhesive strength to an ethylene-vinyl acetate copolymer saponification compound (g) | 800 | 770 |

*Amount of monomer or radical initiator relative to raw material resin.

Example 39

0.005 parts by weight of 2,5-dimethyl-2,5-di-(t-butylperoxy)hexane were added to 100 parts by weight of an ethylene copolymer (PE34), and dry-blended for 2 minutes using a Henschel mixer. 0.1 parts by weight of methyl acrylate were added thereto as a monomer, and further dry-blended for 2 minutes. The resultant mixture was then melted and kneaded using a single-screw 50 mm kneading machine set to a temperature of 250° C. to yield another polyolefin containing a polar group. The amount of methyl acrylate added to the resultant other polyolefin containing a polar group was $9 \times 10^{-6}$ mol per 1 gram of resin; and the MFR of the other polyolefin containing a polar group was 1.3 g/10 minutes.

25% by weight of the resultant other polyolefin containing a polar group, and 75% by weight of an ethylene copolymer (PE31) were then kneaded together to yield a polar group-containing resin material. The film properties of this resultant polar group-containing resin material were then measured. These results are shown in Table 28.

Comparative Example 40

25% by weight of the other polyolefin containing a polar group obtained in Example 39, and 75% by weight of the ethylene copolymer (PE34) were kneaded together to yield a polar group-containing resin material. The film properties of this polar group-containing resin material were evaluated. These results are shown in Table 28.

The resultant polar group-containing resin material, which did not contain an ethylene copolymer (I) satisfying the above specific conditions, possessed inferior film properties when compared with the resin material of Example 39.

Example 40

0.005 parts by weight of 2,5-dimethyl-2,5-di(t-butylperoxy)hexane were added to 100 parts by weight of an ethylene copolymer (PE34), and dry-blended for 2 minutes using a Henschel mixer. 0.15 parts by weight of glycidyl methacrylate were added thereto as a monomer, and further dry-blended for 2 minutes. The resultant mixture was then melted and kneaded using a single-screw 50 mm kneading machine set to a temperature of 250° C. to yield another polyolefin containing a polar group. The amount of glycidyl methacrylate added to the resultant other polyolefin containing a polar group was $7 \times 10^{-6}$ mol per 1 gram of resin; and the MFR of the other polyolefin containing a polar group was 1.2 g/10 minutes.

25% by weight of the resultant other polyolefin containing a polar group, and 75% by weight of the ethylene copolymer (PE31) were kneaded together to yield a polar group-containing resin material. The film properties of this resultant polar group-containing resin material were then measured. These results are shown in Table 29.

Comparative Example 41

25% by weight of the other polyolefin containing a polar group obtained in Example 40, and 75% by weight of the ethylene copolymer (PE34) were kneaded together to yield a polar group-containing resin material. The film properties of this resultant polar group-containing resin material were then evaluated. These results are shown in Table 29.

The resultant polar group-containing resin material, which did not contain an ethylene copolymer (I) satisfying the above specific conditions, possessed inferior film properties when compared with the resin material of Example 40.

TABLE 28

|  |  | Example 39 | Comparative Example 40 |
|---|---|---|---|
| Other polyolefin containing a polar group | Raw material resin | PE34 | |
| | Polar-group containing monomer | Methyl acrylate | |
| | Amount of monomer (phr)* | 0.1 | |
| | Radical initiator | 2,5-dimethyl-2,5-di-(t-butylperoxy)hexane | |
| | Amount of radical initiator (phr)* | 0.005 | |
| | Monomer content (mol/1 g of resin) | $9 \times 10^{-6}$ | |
| | MFR (g/10 min) | 1.3 | |
| | Blending amount (% by weight) | 25 | |
| Ethylene copolymer | Type | PE31 | PE34 |
| | Blending amount (% by weight) | 75 | 75 |
| Polar-group containing resin material | Monomer content (mol/1 g of resin) | $2 \times 10^{-6}$ | $2 \times 10^{-6}$ |
| | Film impact (kg-cm/mm) | 180 | 90 |
| | Heat sealing temperature (° C.) | 127 | 135 |

*Amount of monomer or radical initiator relative to raw material resin.

TABLE 29

|  |  | Example 40 | Comparative Example 41 |
|---|---|---|---|
| Other polyolefin containing a | Raw material resin | PE34 | |
| | Polar-group containing monomer | Glycidyl methacrylate | |
| | Amount of monomer (phr)* | 0.15 | |

TABLE 29-continued

|  |  | Example 40 | Comparative Example 41 |
|---|---|---|---|
| polar group | Radical initiator | 2.5-dimethyl-2.5-di-(t-butylperoxy)hexane | |
|  | Amount of radical initiator (phr)* | 0.005 | |
|  | Monomer content (mol/1 g of resin) | $7 \times 10^{-6}$ | |
|  | MFR (g/10 min) | 1.2 | |
|  | Blending amount (% by weight) | 25 | |
| Ethylene copolymer | Type | PE31 | PE34 |
|  | Blending amount (% by weight) | 75 | 75 |
| Polar-group containing resin material | Monomer content (mol/1 g of resin) | $1.7 \times 10^{-6}$ | $1.7 \times 10^{-6}$ |
|  | Film impact(kg-cm/mm) | 185 | 85 |
|  | Heat sealing temperature (° C.) | 126 | 135 |

*Amount of monomer or radical initiator relative to raw material resin.

Example 41

0.005 parts by weight of 2,5-dimethyl-2,5-di-(t-butylperoxy)hexane were added to 100 parts by weight of an ethylene copolymer (PE34), and dry-blended for 2 minutes using a Henschel mixer. 0.13 parts by weight of 2-hydroxyethylmethacrylate were added thereto as a monomer, and further dry-blended for 2 minutes. The resultant mixture was then melted and kneaded using a single-screw 50 mm kneading machine set to a temperature of 250° C. to yield another polyolefin containing a polar group. The amount of 2-hydroxyethylmethacrylate added to the resultant other polyolefin containing a polar group was $8 \times 10^{-6}$ mol per 1 gram of resin; and the MFR of the other polyolefin containing a polar group was 1.1 g/10 minutes.

25% by weight of the resultant other polyolefin containing a polar group, and 75% by weight of the ethylene copolymer (PE31) were kneaded together to yield a polar group-containing resin material. The film properties of this resultant polar group-containing resin material, were measured. These results are shown in Table 30.

Comparative Example 42

25% by weight of the other polyolefin containing a polar group obtained in Example 41, and 75% by weight of the ethylene copolymer (PE34) were kneaded together to yield a polar group-containing resin material. The film properties of this resultant polar group-containing resin material were then evaluated. These results are shown in Table 30.

The resultant polar group-containing resin material, which did not contain an ethylene copolymer (I) satisfying the above specific conditions, possessed inferior film properties when compared with the resin material of Example 41.

TABLE 30

|  |  | Example 41 | Comparative Example 42 |
|---|---|---|---|
| Other polyolefin containing a polar group | Raw material resin | PE34 | |
|  | Polar-group containing monomer | 2-hydroxyethyl acrylate | |
|  | Amount of monomer (phr)* | 0.13 | |
|  | Radical initiator | 2,5-dimethyl-2,5-di-(t-butylperoxy)hexane | |
|  | Amount of radical initiator (phr)* | 0.005 | |
|  | Monomer content (mol/1 g of resin) | $8 \times 10^{-6}$ | |
|  | MFR (g/10 min) | 1.1 | |
|  | Blending amount (% by weight) | 25 | |
| Ethylene copolymer | Type | PE31 | PE34 |
|  | Blending amount (% by weight) | 75 | 75 |
| Polar-group containing resin material | Monomer content (mol/1 g of resin) | $2 \times 10^{-6}$ | $2 \times 10^{-6}$ |
|  | Film impact (kg-cm/mm) | 180 | 85 |
|  | Heat sealing temperature (° C.) | 126 | 130 |

*Amount of monomer or radical initiator relative to raw material resin.

Example 42

0.01 parts by weight of 2,5-dimethyl-2,5-di-(t-butylperoxy)hexane were added to 100 parts by weight of an ethylene copolymer (PE31), and dry-blended for 2 minutes using a Henschel mixer. 0.4 parts by weight of maleic anhydride were added thereto, and further dry blended for 2 minutes. The resultant mixture was then melted and kneaded using a single-screw 50 mm kneading machine set to a temperature of 290° C. to yield a modified ethylene copolymer. The amount of maleic anhydride added to the resultant modified ethylene copolymer was 0.30% by weight; and the MFR of the modified ethylene copolymer was 2.1 g/10 minutes.

30% by weight of this modified ethylene copolymer, 40% by weight of a LLDPE manufactured using a conventional Ziegler catalyst (possessing a density of 0.922 g/cm$^3$, and a MFR of 15 g/10 minutes), and 30% by weight of an EPR rubber (containing 22% by weight of propylene, and possessing an MFR of 2.1 g/10 minutes), were kneaded together to yield a polar group-containing resin material. Using this polar group-containing resin material, the adhesive strength to an ethylene-vinyl acetate copolymer saponification compound was measured according to the aforementioned method for measuring adhesive strength. These results are shown in Table 31.

Comparative Example 43

A modified ethylene copolymer was obtained in the same manner as in Example 42, modified only by the use of an ethylene copolymer (PE34). The amount of maleic anhydride added to the resultant modified ethylene copolymer was 0.30% by weight; and the MFR of the modified ethylene copolymer was 1.2 g/10 minutes. Using this modified ethylene copolymer, a polar group-containing resin material was prepared in the same manner as in Example 42, and the adhesive strength to an ethylene-vinyl acetate copolymer saponification compound was measured. These results are shown in Table 31.

The resultant polar group-containing resin material mixed with an ethylene copolymer modified by means of grafting an ethylene copolymer (PE34) having two peaks in an elution temperature-eluted amount curve according to TREF method, possessed an inferior adhesive strength when compared with the polar group-containing resin material of Example 42.

Comparative Example 44

A modified ethylene copolymer was obtained in the same manner as in Example 43 with the exception of using another ethylene copolymer (PE35). The amount of maleic anhydride added to the resultant modified ethylene copolymer was 0.50% by weight; and the MFR of the modified ethylene copolymer was 0.8 g/10 minutes. Using this modified ethylene copolymer, a polar group-containing resin material was prepared in the same manner as in Example 43, and the adhesive strength to an ethylene-vinyl acetate copolymer saponification compound was measured. These results are shown in Table 32.

The resultant polar group-containing resin material mixed with an ethylene copolymer, modified by means of grafting an ethylene copolymer (PE35) having two peaks in an elution temperature-eluted amount curve according to TREF method, possessed an inferior adhesive strength when compared with the polar group-containing resin material of Example 43.

TABLE 31

|  |  | Example 42 | Comparative Example 43 |
|---|---|---|---|
| Modified ethylene copolymer | Raw material resin | PE31 | PE34 |
|  | Graft modification method | Melt modification method | |
|  | Amount of maleic anhydride (phr)* | 0.4 | |
|  | Radical initiator | 2,5-dimethyl-2,5-di-(t-butylperoxy) hexane | |
|  | Amount of radical initiator (phr)* | 0.01 | |
|  | Addition amount of maleic anhydride (% by weight) | 0.30 | 0.30 |
| MFR (g/10 min) | | 2.1 | 1.2 |
|  | Blending amount (% by weight) | 30 | |
| Other polyolefin | Blending amount (% by weight) | 40 | |
| Rubber | Blending amount (% by weight) | 30 | |
| Polar-group containing resin material | Adhesive strength to ethylene-vinyl acetate copolymer saponification compound (g) | 950 | 870 |

*Amount of maleic anhydride or radical initiator relative to raw material resin.

Example 43

910 g of the ethylene copolymer (PE32), along with 7L of toluene, was placed into an autoclave equipped with a stirrer and possessing a capacity of 15 L, and the temperature was increased while stirring. Upon reaching a temperature of 127° C., 27.3 g of maleic anhydride dissolved in 400 ml of toluene, and 2.4 g of di-t-butylperoxide dissolved in 375 ml of toluene, were added in a dropwise manner from separate openings, for 6 hours. Upon completion of the aforementioned dropwise addition, the reaction was allowed to proceed for 1 hour, followed by cooling to 105° C., at which point 7L of acetone was added in order to precipitate and recover the product. The resultant product was washed several times using acetone to yield a modified ethylene copolymer. The amount of maleic anhydride added to the resultant modified ethylene copolymer was 0.50% by weight; and the MFR of the modified ethylene copolymer was 1.5 g/10 minutes.

5% by weight of this modified ethylene copolymer, 70% by weight of LLDPE manufactured using a conventional Ziegler catalyst (possessing a density of 0.922 g/cm$^3$, and an MFR of 15 g/10 minutes), and 25% by weight of an EPR rubber (containing 22% by weight of propylene, and possessing an MFR of 2.1 g/10 minutes), were kneaded together to yield a polar group-containing resin material. Using this polar group-containing resin material, the adhesive strength to an ethylene-vinyl acetate copolymer saponification compound was measured according to the aforementioned method for measuring adhesive strength. These results are shown in Table 32.

TABLE 32

|  |  | Example 43 | Comparative Example 44 |
|---|---|---|---|
| Modified ethylene copolymer | Raw material resin | PE32 | PE35 |
|  | Graft modification method | Solution modification method | |
|  | Amount of maleic anhydride (phr)* | 3 | |
|  | Radical initiator | di-t-butylperoxide | |
|  | Amount of radical initiator (phr)* | 0.26 | |
|  | Addition amount of maleic anhydride (% by weight) | 0.50 | 0.50 |
|  | MFR (g/10 min) | 1.5 | 0.8 |
|  | Blending amount (% by weight) | 5 | |
| Other polyolefin | Blending amount (% by weight) | 70 | |
| Rubber | Blending amount (% by weight) | 25 | |
| Polar-group containing resin material | Adhesive strength to ethylene-vinyl acetate copolymer saponification compound (g) | 880 | 790 |

*Amount of maleic anhydride or radical initiator relative to raw material resin.

Example 44

910 g of the ethylene copolymer (PE32) and 7L of toluene were placed into an autoclave equipped with a stirrer possessing a capacity of 15 L, and the temperature was increased while stirring. Upon reaching a temperature of 127° C., 27.3 g of maleic anhydride dissolved in 400 ml of toluene, and 2.4 g of dicumylperoxide dissolved in 375 ml of toluene, were then added in a dropwise manner from separate openings over 6 hours. Upon completion of the dropwise addition, the reaction was allowed to proceed for 1 hour, followed by cooling to 105° C., at which point 7L of acetone was added to precipitate and recover the product. The resultant product was washed several times using acetone to yield a modified ethylene copolymer. The amount of maleic anhydride added to the resultant modified ethylene copolymer was 0.45% by weight; and the MFR of the modified ethylene copolymer was 1.7 g/10 minutes.

5% by weight of this modified ethylene copolymer, and 95% by weight of a LLDPE manufactured using a conventional Ziegler catalyst (possessing a density of 0.922 g/cm³, and an MFR of 15 g/10 minutes), were kneaded together to yield a polar group-containing resin material. Using this polar group-containing resin material, the adhesive strength to nylon 6 was measured according to the aforementioned method for measuring adhesive strength. These results are shown in Table 33.

Comparative Example 45

A modified ethylene copolymer was obtained in the same manner as in Example 44 with the exception of using another ethylene copolymer (PE35). The amount of maleic anhydride added to the resultant modified ethylene copolymer was 0.44% by weight; and the MFR of the modified ethylene copolymer was 0.8 g/10 minutes. Using this modified ethylene copolymer, a polar group-containing resin material was prepared in the same manner as in Example 44, and the adhesive strength to nylon 6 was measured. These results are shown in Table 33.

The resultant polar group-containing resin material mixed with an ethylene copolymer, modified by means of grafting an ethylene copolymer (PE35) having two peaks in an elution temperature-eluted amount curve according to TREF method, possessed an inferior adhesive strength when compared with the polar group-containing resin material of Example 44.

Comparative Example 46

A modified ethylene copolymer was obtained in the same manner as in Example 44 with the exception of using another ethylene copolymer (PE32). The amount of maleic anhydride added to the resultant modified ethylene copolymer was 0.45% by weight; and the MFR of the modified ethylene copolymer was 1.7 g/10 minutes.

0.5% by weight of the modified ethylene copolymer, and 99.5% by weight of LLDPE manufactured using a conventional Ziegler catalyst (possessing a density of 0.922 g/cm³, and an MFR of 15 g/10 minutes), were kneaded together to yield a polar group-containing resin material. Using this polar-containing resin material, the adhesive strength to nylon 6 was measured. These results are shown in Table 33.

As seen from the table, the resultant polar group-containing resin material in which the blending amount of the modified ethylene copolymer was 1% by weight or less possessed an inferior adhesive strength.

TABLE 33

|  | Example 44 | Comparative Example 45 | Comparative Example 46 |
|---|---|---|---|
| Modified ethylene copolymer |  |  |  |
| Raw material resin | PE32 | PE35 | PE32 |
| Graft modification method | Solution modification method | | |
| Amount of maleic anhydride (phr)* | 3 | | |
| Radical initiator | Dicumylperoxide | | |
| Amount of radical initiator (phr)* | 0.01 | | |
| Addition amount of maleic anhydride (% by weight) | 0.45 | 0.44 | 0.45 |
| MFR (g/10 min) | 1.7 | 0.8 | 1.7 |
| Blending amount (% by weight) | 5 | 5 | 0.5 |
| Other polyolefin |  |  |  |
| Blending amount (% by weight) | 95 |  | 99.5 |
| Rubber |  |  |  |
| Blending amount (% by weight) Polar-group containing resin material | — | — |  |
| Adhesive strength to nylon 6 (g) | 800 | 740 | 230 |

*Amount of maleic anhydride or radical initiator relative to raw material resin.

Example 45

0.015 parts by weight of 2,5-dimethyl-2,5-di-(t-butylperoxy)hexane were added to 100 parts by weight of an ethylene copolymer (PE32), and dry-blended for 2 minutes using a Henschel mixer. 0.8 parts by weight of maleic anhydride were added thereto, and further dry-blended for 2 minutes. The resultant mixture was then melted and kneaded using a single-screw 50 mm kneading machine set to a temperature of 290° C. to yield a modified ethylene copolymer. The amount of maleic anhydride added to the resultant modified ethylene copolymer was 0.51% by weight; and the MFR of the modified ethylene copolymer was 1.7 g/10 minutes.

20% by weight of this modified ethylene copolymer, 55% by weight of a LLDPE manufactured using a conventional Ziegler catalyst (possessing a density of 0.922 g/cm³, and a MFR of 15 g/10 minutes), and 25% by weight of an EPR rubber (containing 22% by weight of propylene, and possessing an MFR of 2.1 g/10 minutes), were kneaded together to yield a polar group-containing resin material. Using this polar group-containing resin material, the adhesive strength to an ethylene-vinyl acetate copolymer saponification compound was measured according to the aforementioned method for measuring adhesive strength. These results are shown in Table 34.

Comparative Example 47

A modified ethylene copolymer was obtained in the same manner as in Example 45 with the exception of using another ethylene copolymer (PE35). The amount of maleic anhydride added to the resultant modified ethylene copolymer was 0.50% by weight; and the MFR of the modified ethylene copolymer was 0.9 g/10 minutes. Using this modified ethylene copolymer, a polar group-containing resin material was prepared in the same manner as in Example 45, and the adhesive strength to an ethylene-vinyl acetate copolymer saponification compound was measured. These results are shown in Table 34.

The resultant polar group-containing resin material mixed with an ethylene copolymer, modified by means of grafting an ethylene copolymer (PE35) having two peaks in an elution temperature-eluted amount curve according to TREF method, possessed an inferior adhesive strength when compared with the polar group-containing resin material of Example 45.

pound was measured according to the aforementioned method for measuring adhesive strength. These results are shown in Table 35.

TABLE 34

|  |  | Example 45 | Comparative Example 47 |
|---|---|---|---|
| Modified ethylene copolymer Radical initiator | Raw material resin | PE32 | PE35 |
|  | Graft modification method | Melt modification method | |
|  | Amount of maleic anhydride (phr)* | 0.8 | |
|  | 2,5-dimethyl-2,5-di-(t-butylperoxy) hexane | | |
|  | Amount of radical initiator (phr)* | 0.015 | |
|  | Addition amount of maleic anhydride (% by weight) | 0.51 | 0.50 |
|  | MFR (g/10 min) | 1.7 | 0.9 |
|  | Blending amount (% by weight) | 20 | |
| Other polyolefin | Blending amount (% by weight) | 55 | |
| Rubber | Blending amount (% by weight) | 25 | |
| Polar-group containing resin material | Adhesive strength to ethylene-vinyl acetate copolymer saponification compound (g) | 900 | 830 |

*Amount of maleic anhydride or radical initiator relative to raw material resin.

Example 46

0.01 parts by weight of 2,5-dimethyl-2,5-di-(t-butylperoxy)hexane were added to 100 parts by weight of an ethylene copolymer (PE33), and dry-blended for 2 minutes using a Henschel mixer. 0.4 parts by weight of maleic anhydride were added thereto, and further dry-blended for 2 minutes. The resultant mixture was then melted and kneaded using a single-screw 50 mm kneading machine set to a temperature of 290° C. to yield a modified ethylene copolymer. The amount of maleic anhydride added to the resultant modified ethylene copolymer was 0.30% by weight; and the MFR of the modified ethylene copolymer was 1.5 g/10 minutes.

20% by weight of this modified ethylene copolymer, 55% by weight of LLDPE manufactured using a conventional Ziegler catalyst (possessing a density of 0.922 g/cm³, and a MFR of 15 g/10 minutes), and 25% by weight of an EPR rubber (containing 22% by weight of propylene, and possessing an MFR of 2.1 g/10 minutes), were kneaded together to yield a polar group-containing resin material. Using this polar group-containing resin material, the adhesive strength to an ethylene-vinyl acetate copolymer saponification com-

Comparative Example 48

A modified ethylene copolymer was obtained in the same manner as in Example 46 with the exception of using another ethylene copolymer (PE36). The amount of maleic anhydride added to the resultant modified ethylene copolymer was 0.31% by weight; and the MFR of the modified ethylene copolymer was 1.3 g/10 minutes. Using this modified ethylene copolymer, a polar group-containing resin material was prepared in the same manner as in Example 46, and the adhesive strength to an ethylene-vinyl acetate copolymer saponification compound was measured. These results are shown in Table 35.

The resultant polar group-containing resin material mixed with an ethylene copolymer, modified by means of grafting an ethylene copolymer (PE36) wherein the relationship between $T_{75}$–$T_{25}$ and density d did not satisfy the aforementioned relationships shown by the formulae a and b, possessed an inferior adhesive strength when compared with the polar group-containing resin material of Example 46.

TABLE 35

|  |  | Example 46 | Comparative Example 48 |
|---|---|---|---|
| Modified ethylene copolymer Radical initiator | Raw material resin | PE33 | PE36 |
|  | Graft modification method | Melt modification method | |
|  | Amount of maleic anhydride (phr)* | 0.4 | |
|  | 2,5-dimethyl-2,5-di-(t-butylperoxy) hexane | | |
|  | Amount of radical initiator (phr)* | 0.01 | |
|  | Addition amount of maleic anhydride (% by weight) | 0.30 | 0.31 |
|  | MFR (g/10 min) | 1.5 | 1.3 |
|  | Blending amount (% by weight) | 20 | |
| Other polyolefin | Blending amount (% by weight) | 55 | |
| Rubber | Blending amount (% by weight) | 25 | |
| Polar-group containing resin material | Adhesive strength to ethylene-vinyl acetate copolymer saponification compound (g) | 850 | 770 |

*Amount of maleic anhydride or radical initiator relative to raw material resin.

Industrial Applicability

As explained in the aforementioned, the ethylene-α-olefin copolymer of the present invention satisfies the aforementioned specific conditions, and thus exhibits superior mechanical properties, and thermal resistance, and the like, when compared to a LLDPE manufactured using a Ziegler catalyst. In addition, the ethylene-α-olefin copolymer of the present invention possesses a superior thermal resistance, heat sealing strength, and processability compared to the conventional ethylene-α-olefin copolymer manufactured using a metallocene catalyst, while exhibiting an equally favorable low temperature heat sealability and clarity as the ethylene-α-olefin copolymer manufactured using a metallocene catalyst.

The ethylene-α-olefin copolymer of the present invention is suitable, in particular, for various packaging films, and films for lamination, (such as sealant film, and the like), which are manufactured according to a T-die technique, inflation technique, or the like. Furthermore, the ethylene-α-olefin copolymer of the present invention is suitable for a container for mayonnaise; tube container for horseradish and the like; thin interior containers for cardboard boxes, and the like; hollow molded products such as containers for liquid soap; injection molded products such as plugs, caps, lids for containers, ski shoes, and the like; coverings for wires, cables, steel pipes; and the like. Additionally, the ethylene-α-olefin copolymer of the present invention may be used for various multi-layer films, or laminated sheets, according to a dry lamination method, co-ejection method, or extrusion lamination method.

The film according to the present invention possesses impact resistance, tensile strength, transparency, low temperature heat sealability, hot tacking properties, thermal resistance, and the like. Accordingly, it is suitable for various packing films such as standard bags, sugar sacks, oil product packaging, liquid packaging, and the like; agricultural material; inner bags for bag-in-box use; and the like.

The release member according to the present invention exhibits a superior thermal resistance, resistance to pinholes, glossiness after heating, and the like. Accordingly, it may be used as an adhesive sheet or tape, which is coated with a pressure sensitive adhesive, heat sensitive adhesive, prepreg adhesive, and the like.

The retort container according to the present invention exhibits a superior thermal resistance, and heat sealing strength. Accordingly, it may be used as a container, or bag for retort-packed foods, medical containers for blood, pharmaceutical solutions, and the like, medical bags, and the like.

The electric insulating material according to the present invention possesses a superior processability and mechanical strength, in addition to superior electrical insulating properties. Accordingly, it may be used as an insulating material for wires, cables, and condensers, insulating material and distributing cords for high voltage portion of an X-ray generating machine, and the like.

The polar-containing resin material according to the present invention exhibits a favorable adhesive strength, and a superior low temperature heat sealability and film impact. Accordingly, it may be used for various uses including an adhesive resin; adhesive layer of a multi-layered film; sealant layer of a multi-layered film; functional resin films such as chemical reactive film, anti-static film, and the like; compatibility agents; containers comprising laminated products, wherein a polar group-containing resin material comprises an adhesive layer such as fuel tank, kerosene can, electric agent can, and the like.

What is claimed is:

1. An ethylene-α-olefin copolymer which is obtained by means of polymerizing an ethylene and a $C_{4-12}$ α-olefin, and satisfying the following conditions (A) to (E):

(A) a density in the range of 0.92 to 0.96 g/cm$^3$;
   (B) a melt flow rate (MFR) in the range of 0.01 to 200 g/10 min;
   (C) a molecular weight distribution (Mw/Mn) in the range of 1.5 to 5.0;
   (D) possessing only one peak in terms of the number of peaks observed in an elution temperature-eluted amount curve as measured by the continuous temperature raising elution fractionation (TREF) method, and from the integrated elution curve obtained by said elution temperature-eluted amount curve, the temperature difference $T_{75}-T_{25}$ and said density d both satisfy the relationships shown by formula a and formula b, wherein $T_{25}$ is the temperature at which 25% of the total elution is obtained, and $T_{75}$ is the temperature at which 75% of the total elution is obtained; and $T_{75}-T_{25} \geq -300 \times d+285$ (for $d<0.950$ g/cm$^3$)

$T_{75}-T_{25} \geq 0$ (for $d \geq 0.950$ g/cm$^3$)     (Formula a)

$T_{75}-T_{25} \geq -670 \times d+644$     (Formula b)

(E) possessing one or two melting point peaks, and among these the highest melting point $T_{m1}$ and said density d satisfy the relationship shown by formula c:

$T_{m1} \geq 150 \times d-17$     (Formula c).

2. An ethylene-α-olefin copolymer according to claim 1 which further satisfies the following condition (F):

(F) the melt tension (MT) and said melt flow rate (MFR) satisfy the relationship shown by formula d:

$\log MT \leq -0.572 \times \log MFR+0.3$     (Formula d).

3. An ethylene-α-olefin copolymer according to claim 1, wherein the halogen concentration within said ethylene-α-olefin copolymer is no greater than 10 ppm.

4. An ethylene-α-olefin copolymer according to claim 1, wherein said ethylene-α-olefin copolymer is obtained by means of copolymerizing ethylene and a $C_{4-12}$ α-olefin under the presence of a catalyst containing an organic cyclic compound having at least a conjugated double bond, and a compound containing a transition metal from group IV of the period table.

5. An ethylene-α-olefin copolymer according to claim 1, wherein said ethylene-α-olefin copolymer is obtained by means of copolymerizing ethylene and a $C_{4-12}$ α-olefin under the presence of a catalyst formed from compounds a1 to a4:

a1: a compound represented by the general formula of $Me^1R^1_p R^2_q (OR^3)_r X^1_{4-p-q-r}$ (wherein, $Me^1$ represents zirconium, titanium, or hafnium; $R^1$ and $R^3$ each respectively represent a $C_{1-24}$ hydrocarbon group; $R^2$ represents a 2,4-pentanedionate ligand or derivative thereof, a benzoylmethanate ligand, a benzoylacetonate ligand or derivative thereof; $X^1$ represents a halogen atom; and p, q and r each represent integers satisfying the ranges of $0 \leq p \leq 4$, $0 \leq q \leq 4$, and $0 \leq r \leq 4$, respectively such that $0 \leq p+q+r \leq 4$);

a2: a compound represented by the general formula of $Me^2R^4_m (OR^5)_n X^2_{z-m-n}$ (wherein, $Me^2$ represents an element from groups I to III of the periodic table; $R^4$ and $R^5$ each represent a $C_{1-24}$ hydrocarbon group; $X^2$ represents a halogen atom or a hydrogen atom (with the proviso that when $X^2$ represents a hydrogen atom, $Me^2$ is limited to an element from group III of the periodic table); z represents the valence of $Me^2$; and m and n each represent integers satisfying the ranges of $0 \leq m \leq z$, and $0 \leq n \leq z$, respectively, such that $0 \leq m+n \leq z$);

a3: an organic cyclic compound having conjugated double bonds; and a4: a modified organoaluminumoxy compound containing an Al—O—Al bond and/or a boron compound.

6. A resin composition comprising 1 to 99% by weight of an ethylene-α-olefin copolymer according to claim 1, and 1 to 99% by weight of another polyolefin.

7. A molded product comprising an ethylene-α-olefin copolymer according to claim 1.

8. A molded product comprising a resin composition according to claim 6.

9. A film comprising an ethylene-α-olefin copolymer according to claim 1.

10. A film comprising a resin composition according to claim 6.

11. A laminate comprising a film formed from an ethylene-α-olefin copolymer according to claim 1.

12. A laminate comprising a film formed from a resin composition according to claim 6.

13. A laminate comprising a film layer formed from an ethylene-α-olefin copolymer according to claim 1, and a barrier layer and/or another polyolefin layer.

14. A laminate comprising a film layer formed from a resin composition according to claim 6, and a barrier layer and/or another polyolefin layer.

15. A release member comprising a substrate, a film layer formed from an ethylene-α-olefin copolymer according to claim 1, and a release agent layer.

16. A release member comprising a substrate, a film layer formed from a resin composition according to claim 6, and a release agent layer.

17. A container using an ethylene-α-olefin copolymer according to claim 1.

18. A container using a resin composition according to claim 6.

19. A retort container using an ethylene-α-olefin copolymer according to claim 1.

20. A retort container using a resin composition according to claim 6.

21. A medical container using an ethylene-α-olefin copolymer according to claim 1.

22. A medical container using a resin composition according to claim 6.

23. A paper container comprising paper and a layer formed from an ethylene-α-olefin copolymer according to claim 1.

24. A paper container comprising paper and a layer formed from a resin composition according to claim 6.

25. An electrical insulating material comprising an ethylene-α-olefin copolymer according to claim 1.

26. An electrical insulating material according to claim 25, wherein said ethylene-α-olefin copolymer further satisfies the following condition (G):

(G) possessing an electrical activation energy of no greater than 0.4 eV.

27. An electrical insulating material comprising a resin composition comprising 1 to 99% by weight of an ethylene-α-olefin copolymer according to claim 1, and 1 to 99% by weight of another polyolefin.

28. An electrical insulating material according to claim 27, wherein an ethylene-α-olefin copolymer further satisfies the following condition (G):

(G) possessing an electrical activation energy of no greater than 0.4 eV.

29. An electric wire and cable using an electrical insulating material according to claim 25.

30. An electrical insulating material according to claim 27, wherein said other polyolefin comprises a low density polyethylene obtained by means of high pressure radical polymerization.

31. An electric wire and cable using an electrical insulating material according to claim 27.

32. A polar group-containing resin material comprising one type of monomer unit selected from among (a) to (e) below in the resin component comprising an ethylene-α-olefin copolymer according to claim 1, wherein the concentration of the monomer unit ranges from $10^{-8}$ to $10^{-3}$ mol per one gram of resin component:

(a) a carbonic acid group or acid anhydride group-containing monomer;

(b) an epoxy group-containing monomer;

(c) a hydroxyl group-containing monomer;

(d) an amino group-containing monomer; and (e) a silane group-containing monomer.

33. A polar group-containing resin material comprising 0.5 to 100% by weight of an ethylene-α-olefin copolymer according to claim 1 which has been modified by means of grafting (a) a carbonic acid group or acid anhydride group-containing monomer, or (b) an epoxy group-containing monomer; 0 to 99.5% by weight of another polyolefin; and 0 to 40% by weight of rubber.

34. A laminate comprising a layer formed from a polar group-containing resin material according to claim 32, and a layer formed from a substrate.

35. A laminate comprising a layer formed from a polar group-containing resin material according to claim 33, and a layer formed from a substrate.

36. A laminate comprising a layer formed from a polar group-containing resin material according to claim 32; a layer formed from a substrate; a layer formed from an ethylene-α-olefin copolymer; and a barrier layer and/or another polyolefin layer.

37. A laminate comprising a layer formed from a polar group-containing resin material according to claim 33; a layer formed from a substrate; a layer formed from an ethylene-α-olefin copolymer; and a barrier layer and/or another polyolefin layer.

* * * * *